US007601095B2

(12) United States Patent
Hasegawa et al.

(10) Patent No.: US 7,601,095 B2
(45) Date of Patent: Oct. 13, 2009

(54) VEHICLE

(75) Inventors: Toshiyuki Hasegawa, Amagasaki (JP);
Tomoyuki Ebihara, Amagasaki (JP);
Hideki Kanenobu, Amagasaki (JP);
Kazunari Koga, Amagasaki (JP)

(73) Assignee: Kanzaki Kokyukoki Mfg. Co., Ltd.,
Hyogo (JP)

( * ) Notice: Subject to any disclaimer, the term of this patent is extended or adjusted under 35 U.S.C. 154(b) by 382 days.

(21) Appl. No.: 11/488,665

(22) Filed: Jul. 19, 2006

(65) Prior Publication Data

US 2007/0017309 A1 Jan. 25, 2007

(30) Foreign Application Priority Data

Jul. 20, 2005 (JP) ............................. 2005-209975
Jul. 20, 2005 (JP) ............................. 2005-210637
Mar. 16, 2006 (JP) ............................. 2006-071929

(51) Int. Cl.
*B60W 10/02* (2006.01)
*F16H 3/08* (2006.01)
*F16H 57/04* (2006.01)

(52) U.S. Cl. ........................... 477/180; 74/331; 74/467

(58) Field of Classification Search ................ 477/180, 477/74, 143, 124; 74/330, 331, 335, 339, 74/340, 467, 665 G, 665 GA
See application file for complete search history.

(56) References Cited

U.S. PATENT DOCUMENTS

| 4,485,687 | A | * | 12/1984 | Burke et al. | .................. 74/358 |
| 5,079,965 | A | * | 1/1992 | Leber et al. | .................... 74/331 |
| 5,385,064 | A | * | 1/1995 | Reece | .......................... 74/331 |
| 5,390,560 | A | * | 2/1995 | Ordo | ........................... 74/329 |
| 5,599,247 | A | * | 2/1997 | Matsufuji | ................... 475/128 |
| 5,890,392 | A | * | 4/1999 | Ludanek et al. | ............... 74/331 |
| 6,793,604 | B2 | * | 9/2004 | Kobayashi | .................. 475/220 |

(Continued)

FOREIGN PATENT DOCUMENTS

EP 0029711 A2 * 6/1981

(Continued)

OTHER PUBLICATIONS

U.S. Appl. No. 12/261,802 to Hasegawa et al., filed Oct. 30, 2008.

*Primary Examiner*—Roger Pang
(74) *Attorney, Agent, or Firm*—Sterne, Kessler, Goldstein & Fox P.L.L.C.

(57) ABSTRACT

A vehicle has an engine, an accelerator for controlling the rotary speed of the engine, an axle and a multi-speed transmission for transmitting power from the engine to the axle. The multi-speed transmission includes an odd-numbered speed drive train for an odd-numbered speed level, a first clutch for the odd-numbered speed drive train, an even-numbered speed drive train for an even-numbered speed level, and a second clutch for the even-numbered speed drive train. In correspondence to operation of the accelerator and an actual speed of the axle, either the odd-numbered speed drive train or the even-numbered speed drive train is selected so as to transmit power from the engine to the axle. A shift-up or shift-down timing between the odd-numbered speed level and the even-numbered speed level relative to variation of the actual speed of the axle is changed according to detection of a tilt angle of the vehicle or a weight of the vehicle.

11 Claims, 36 Drawing Sheets

U.S. PATENT DOCUMENTS

| | | | |
|---|---|---|---|
| 7,066,043 B2 * | 6/2006 | Kim et al. | 74/330 |
| 7,080,567 B2 * | 7/2006 | Hatakeyama | 74/331 |
| 7,127,961 B2 * | 10/2006 | Braford et al. | 74/340 |
| 7,225,696 B2 * | 6/2007 | Gitt | 74/340 |
| 2005/0000307 A1 * | 1/2005 | Gumpoltsberger | 74/331 |

FOREIGN PATENT DOCUMENTS

| | | |
|---|---|---|
| JP | 2000038042 | 2/2000 |

* cited by examiner

VEHICLE

BACKGROUND OF THE INVENTION

1. Field of the Invention

The invention relates to a vehicle such as a utility vehicle equipped with a cargo, and especially relates to a power transmission system of the vehicle.

2. Related Art

Conventionally, as disclosed in Japanese Laid Open Gazette No. 2000-38042, there is a well-known utility vehicle equipped with a cargo, under which an engine and an axle are disposed and drivingly connected to each other through a power transmission system consisting of a belt-type continuously variable transmission (hereinafter, "CVT") and a gear-type sub transmission. Due to the CVT, the power transmission system is advantageous for speed change while continuously (not intermittently) transmitting power from the engine to the axle.

However, the CVT has peculiar disadvantages, such as slipping of the belt when wet, short durability of the belt, and inability of engine braking. Further, the gear-type sub transmission requires an onerous clutch-off operation before its gearshift operation.

To solve the problems, it has been suggested that an alternative multi-speed (i.e., discontinuously variable) transmission, such as a gear transmission, solely replace the conventional combination of the CVT and the gear-type sub transmission. However, there still exists the problem that the alternative multi-speed transmission cannot ensure a proper sufficient traveling performance for a vehicle because disengagement of its clutch for gearshift causes a cut-off of the power transmission to the axle, which may cause unexpected movement of a vehicle traveling on a slope.

Further, it has been suggested that the gearshift of the multi-speed transmission be automatically controlled corresponding to an accelerator operation. However, if the gearshift timing relative to an actual traveling speed of the vehicle, i.e., an actual rotary speed of the axle, is simply fixed, a vehicle ascending a slope or having a heavy weight may have an engine stop because a shift-up timing occurs too early to ensure acceleration of the vehicle, or a vehicle descending a slope may be unexpectedly accelerated because a shift-down timing occurs too late to prevent acceleration of the vehicle so as to void an engine braking, i.e., cause an inertial gravity force of the descending vehicle to overcome the engine braking force.

SUMMARY OF THE INVENTION

A first object of the invention is to provide a utility vehicle equipped with a multi-speed (discontinuously variable) transmission, replacing the conventional combination of the belt-type continuously variable transmission (i.e., CVT) and the gear-type sub transmission, wherein the multi-speed transmission ensures continuous power transmission to the axle regardless of disengagement of a clutch for speed shift.

To attain the first object, according to a first aspect of the invention, a vehicle comprises: an engine; an accelerator for controlling the rotary speed of the engine; an axle; and a multi-speed transmission for transmitting power from the engine to the axle. The multi-speed transmission includes an odd-numbered speed drive train for an odd-numbered speed level, a first clutch for the odd-numbered speed drive train, an even-numbered speed drive train for an even-numbered speed level, and a second clutch for the even-numbered speed drive train. In correspondence to operation of the accelerator and an actual speed of the axle, one of the first and second clutches is engaged and the other of the first and second clutches is disengaged so as to select either the odd-numbered speed drive train or the even-numbered speed drive train to transmit power from the engine to the axle. While the speed level of the multi-speed transmission is shifted between the odd-numbered speed level and the even-numbered speed level, the engagement process of the one of the first and second clutches is timely overlapped with the disengagement process of the other of the first and second clutches.

Alternatively, according to a second aspect of the invention, a vehicle comprises: a cargo; an engine disposed under the cargo; an axle disposed under the cargo; and a multi-speed transmission disposed under the cargo so as to transmit power from the engine to the axle. The multi-speed transmission includes multi-speed drive trains, a sub drive train, a main clutch for the multi-speed drive trains, and a sub clutch for the sub drive train. Unless the multi-speed transmission is operated for speed changing, one of the multi-speed drive trains is selected to drive the axle. When the multi-speed transmission is operated for speed changing, the main clutch is disengaged for selecting one of the multi speed drive trains, and simultaneously, the sub clutch is engaged for transmitting power from the engine to the axle through the sub drive train.

Due to either the first or second aspect of the invention, the multi-speed transmission ensures performance of a smooth speed change (gearshift) without cease of power transmission from the engine to the axle. Therefore, the multi-speed transmission does not require the conventional CVT, so that the multi-speed transmission is safe from the problems peculiar to the CVT. That is, the multi-speed transmission has no problem of the belt slipping when wet, has satisfactory durability, and enables an effective engine braking action. Further, the sole multi-speed transmission does not have to be combined with another transmission mechanism, thereby being simple and inexpensive and facilitating maintenance.

Preferably, in either the first or second aspect, the engine includes a crankshaft extended in the fore-and-aft direction of the vehicle. The multi-speed transmission includes an input portion for receiving power from the crankshaft of the engine, an output for outputting power to the axle, and transmission shafts interposed between the input portion and the output portion. The transmission shafts are extended in the fore-and-aft direction of the vehicle, and juxtaposed laterally of the vehicle. Therefore, a casing incorporating the multi-speed transmission is vertically minimized so as to be easily disposed below a cargo or driver's seat of the vehicle without lowering of a ground clearance of the vehicle.

Preferably, in the first aspect, the multi-speed transmission further includes: a plurality of odd-numbered speed drive trains; a first shifter shaft for selecting one of the plurality of odd-numbered speed drive trains; a plurality of even-numbered speed drive trains; and a second shifter shaft for selecting one of the plurality of even-numbered speed drive trains. The first and second shifter shafts are juxtaposed horizontally. Alternatively, preferably, in the second aspect, the multi-speed transmission includes a plurality of shifter shafts for selecting one of the multi-speed drive trains, and the plurality of shifter shafts are juxtaposed horizontally. Therefore, a casing incorporating the multi-speed transmission is vertically minimized so as to be easily disposed below a cargo or driver's seat of the vehicle without lowering of a ground clearance of the vehicle.

Preferably, in either the first or second aspect, the vehicle further comprises: a transmission casing incorporating the multi-speed transmission; and a tank fluidly connected to the transmission casing so as to store fluid serving as lube for the first and second clutches and the multi-speed transmission. The tank absorbs fluid from the transmission casing so that a level of fluid in the transmission casing becomes lower than a predetermined height during activation of the engine. Therefore, the level of fluid accumulated in the transmission casing is so lowered as to reduce resistance of the fluid against agitation by a high-speed rotating gear in the transmission casing, thereby reducing power loss, and thereby ensuring an economic high-speed traveling of the vehicle.

Further preferably, in either the first or second aspect, the clutches (if the first aspect, the first and second clutches, or if the second aspect, the main and sub clutches) and the shifter shafts are hydraulically controlled, and the fluid stored in the tank also serves as hydraulic pressure fluid for the clutches and the shifter shafts. Therefore, the vehicle requires no additional device for supplying the hydraulic pressure fluid to the hydraulically controlled elements in the multi-speed transmission, thereby being simplified.

Further preferably, in either the first or second aspect, the quantity of fluid recovered from the transmission casing into the tank is increased according to increase of the rotary speed of the engine, and larger than the quantity of fluid supplied from the tank into the transmission casing such as to serve as the lube and the hydraulic pressure fluid. Therefore, the level of the fluid sump in the transmission casing is kept constant, so as to ensure the above-mentioned advantageous reduction of power loss.

Preferably, in the first aspect, either the first or second clutch also serves as a start-up clutch to be engaged during start of the vehicle. Alternatively, preferably, in the second aspect, the main clutch also serves as the start-up clutch to be engaged during start of the vehicle. Therefore, the vehicle requires no additional start-up device such as a torque converter, thereby being simplified and reducing costs.

Alternatively, preferably, in the second aspect, the multi-speed transmission further includes: a reverse drive train, which can drivingly connect the axle to the engine through the second clutch, and both the first and second clutches serve as a start-up clutch. Therefore, both the first and second clutches are start-up clutches and forward or backward traveling direction of the vehicle can be previously determined before the either the forward or backward travel occurs by engaging the appropriate clutch A second object of the invention is to provide the vehicle according to the first aspect, equipped with the multi-speed transmission in which the first clutch for the odd-numbered speed drive train and the second clutch for the even-numbered speed drive train are automatically controlled for speed shift (gear change) in association with the accelerator operation, wherein the speed shift timing of the multi-speed transmission is optimized so as to prevent the vehicle engine, while the vehicle is ascending a slope or heavily loaded, from stalling, and to effect an engine braking onto the vehicle when descending a slope.

To attain the second object, according to a third aspect of the invention, a vehicle comprises: an engine; an accelerator for controlling the rotary speed of the engine; an axle; and a multi-speed transmission for transmitting power from the engine to the axle. The multi-speed transmission includes an odd-numbered speed drive train for an odd-numbered speed level, a first clutch for the odd-numbered speed drive train, an even-numbered speed drive train for an even-numbered speed level, and a second clutch for the even-numbered speed drive train. In correspondence to operation of the accelerator and an actual speed of the axle, either the odd-numbered speed drive train or the even-numbered speed drive train is selected so as to transmit power from the engine to the axle. A shift-up or shift-down timing between the odd-numbered speed level and the even-numbered speed level relative to variation of the actual speed of the axle is changed according to detection of a tilt angle of the vehicle and/or detection of a weight of the vehicle. Therefore, due to the control of the first and second clutches, the multi-speed transmission ensures smooth perform speed change (gearshift) without cease of power transmission from the engine to the axle regardless of the tilt condition of the vehicle and/or variation of the weight of the vehicle (load on the vehicle).

Preferably, in the third aspect, when a tilt angle of the vehicle ascending a slope is detected, the actual speed of the axle corresponding to the shift-up timing is larger than that when a tilt angle of the vehicle traveling on a flat land is detected. Therefore, when the vehicle ascends a slope, the engine rotary speed arises to a sufficient value before the shift-up of the multi-speed transmission, thereby preventing stalling of the engine.

Preferably, in the third aspect, when a tilt angle of the vehicle descending a slope is detected, the actual speed of the axle corresponding to the shift-down timing is larger than that when a tilt angle of the vehicle traveling on a flat land is detected. Therefore, when the vehicle descends a slope, the shift-down of the multi-speed transmission is performed early enough for deceleration of the engine, thereby ensuring an effective engine braking.

Preferably, in the third aspect, when a large weight of the vehicle is detected, the actual speed of the axle corresponding to the shift-up timing is larger than that when a small weight of the vehicle is detected. Therefore, when the vehicle is heavily weighed (loaded), the engine rotary speed arises to a sufficient value before the shift-up of the multi-speed transmission, thereby preventing stalling of the engine.

Preferably, in the third aspect, when at least one of a tilt angle of the vehicle ascending a slope and a large weight of the vehicle is detected, the actual speed of the axle corresponding to the shift-up timing is larger than that when both the vehicle traveling on a flat land and a small weight of the vehicle are detected. Therefore, when the vehicle ascends a slope or when the vehicle is heavily weighed (loaded), the engine rotary speed surely arises to a sufficient value before the shift-up of the multi-speed transmission, thereby preventing stalling of the engine.

Preferably, in the third aspect, when both a tilt angle of the vehicle ascending a slope and a large weight of the vehicle are detected, the actual speed of the axle corresponding to the shift-up timing is further larger than that when one of a tilt angle of the vehicle ascending a slope and a large weight of the vehicle is detected. Therefore, even when the heavily weighed (loaded) vehicle ascends a slope, the engine rotary speed surely arises to a sufficient value before the shift-up of the multi-speed transmission, thereby preventing stalling of the engine.

Preferably, in the third aspect, when a tilt angle of the vehicle descending a slope is detected, the actual speed of the axle corresponding to the shift-down timing is larger than that when both a tilt angle of the vehicle traveling on a flat land and a small weight of the vehicle are detected. Therefore, when the vehicle descends a slope, the shift-down of the multi-speed transmission is performed early enough for deceleration of the engine, thereby ensuring an effective engine braking.

A third object of the invention is to provide the vehicle according to the first aspect, equipped with the multi-speed transmission including the first clutch for the odd-numbered speed drive train and the second clutch for the even-numbered speed drive train, wherein the vehicle, ascending a slope or heavily loaded, can start without stalling of the engine, and wherein the vehicle descending a slope can start with an effective engine braking.

To attain the third object, according to a fourth aspect of the invention, a vehicle comprises: an engine; an axle; and a multi-speed transmission for transmitting power from the engine to the axle. The multi-speed transmission includes one or more clutches for shifting a speed level. One of the clutches for shifting a speed level also serves as a start-up clutch to be engaged during start of the vehicle. An increased rate of a clutch pressure of the start-up clutch to a time passage is changed according to detection of a tilt angle of the vehicle and/or detection of a weight of the vehicle. Therefore, due to the control of the start-up clutch, the vehicle can creep in correspondence to the tilt condition of the vehicle and/or the weight of the vehicle (load on the vehicle), or the vehicle can be smoothly accelerated to a target speed set by an accelerator operation without cease of power transmission from the engine to the axle.

Preferably, in the fourth aspect, when a tilt angle of the vehicle ascending a slope is detected, the increased rate of the clutch pressure is larger than that when a tilt angle of the vehicle traveling on a flat land is detected. Therefore, when the vehicle ascends a slope, the clutch pressure of the start-up clutch and the driving force of the axle are increased quickly enough to prevent delay of the start of the vehicle or slip of the vehicle caused by the slope.

Preferably, in the fourth aspect, when a tilt angle of the vehicle descending a slope is detected, the increased rate of the clutch pressure is smaller than that when a tilt angle of the vehicle traveling on a flat land is detected. Therefore, when the vehicle descends a slope, the clutch pressure of the start-up clutch and the driving force of the axle are increased slowly so as to prevent sudden acceleration of the vehicle.

Preferably, in the fourth aspect, when a large weight of the vehicle is detected, the increased rate of the clutch pressure is larger than that when a small weight of the vehicle is detected. Therefore, when the vehicle is heavily weighed (loaded), the clutch pressure of the start-up clutch and the driving force of the axle are increased quickly enough to prevent delay of the start of the vehicle.

Preferably, in the fourth aspect, when at least one of a tilt angle of the vehicle ascending a slope and a large weight of the vehicle is detected, the increased rate of the clutch pressure is larger than that when both a tilt angle of the vehicle traveling on a flat land and a small weight of the vehicle are detected. Therefore, when the vehicle ascends a slope or when the vehicle is heavily weighed (loaded), the clutch pressure of the start-up clutch and the driving force of the axle are increased quickly enough to prevent delay of the start of the vehicle or slip of the vehicle.

Preferably, in the fourth aspect, when both a tilt angle of the vehicle ascending a slope and a large weight of the vehicle are detected, the increased rate of the clutch pressure is further larger than that when one of a tilt angle of the vehicle traveling on a flat land and a small weight of the vehicle is detected. Therefore, even when the heavily weighed (loaded) vehicle ascends a slope, the clutch pressure of the start-up clutch and the driving force of the axle are increased quickly enough to prevent delay of the start of the vehicle or slip of the vehicle.

Preferably, when a tilt angle of the vehicle descending a slope is detected, the increased rate of the clutch pressure is smaller than that when both a tilt angle of the vehicle traveling on a flat land and a small weight of the vehicle are detected. Therefore, when the vehicle descends a slope, the clutch pressure of the start-up clutch and the driving force of the axle are increased slowly so as to prevent sudden acceleration of the vehicle.

Preferably, in the fourth aspect, the vehicle further comprises a brake shiftable between a braking state for braking the axle and an unbraking state for unbraking the axle. The increased rate of the clutch pressure is changed according to detection of the tilt angle of the vehicle immediately after a shift of the brake from the braking state to the unbraking state is confirmed. Since the unbraking operation for shifting the brake from the braking state to the unbraking state is indispensable just before the start of the vehicle, the control of the start-up clutch associated with the unbraking operation is surely associated with the start of the vehicle.

These, other and further objects, features and advantages will appear more fully from the following description with reference to the accompanying drawings.

DETAILED DESCRIPTION OF THE INVENTION

Figure 1:
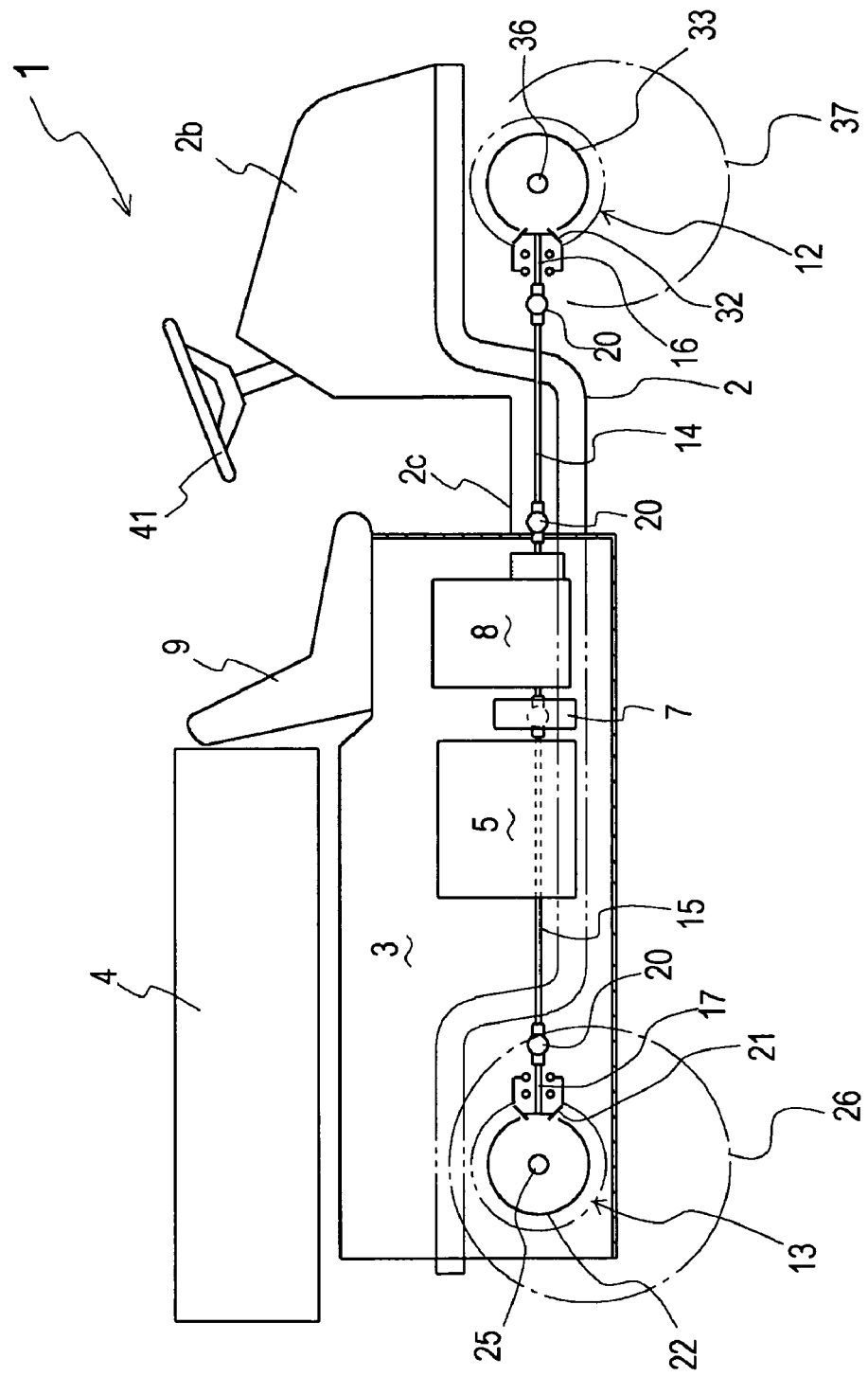
FIG. 1 is a side view of a utility vehicle according to a first embodiment of the invention.

Referring to FIGS. 1 to 9, a utility vehicle according to a first embodiment will be described. Hereinafter, the position and direction of each element is stated on the basis of the traveling direction of the vehicle.

A general structure of a utility vehicle 1 will be described with reference to FIGS. 1 and 2. A front frame 2 and a rear frame 3 joined to each other constitute an entire body frame of utility vehicle 1. Rear frame 3 consists of a horizontal bottom plate, which is substantially rectangular when viewed in plan, and vertical side plates erected on front, rear, left and right end edges of the bottom plate. A cargo 4 is disposed above rear frame 3. Preferably, cargo 4 is vertically rotatable. Rear frame 3 serves as a base for supporting cargo 4. A pair of left and right seats 9 are mounted on a downwardly stepped front portion of rear frame 3. One seat 9 (in this embodiment, left seat 9) is a driver's seat 9a, and the other seat 9 (in this embodiment, right seat 9) is a partner's seat 9b. A steering wheel 41 is disposed in front of driver's seat 9a.

An engine 5 including a crankshaft (not shown) disposed in the fore-and-aft direction of vehicle 1 is disposed inside rear frame 3 under seats 9. Engine 5 is disposed laterally opposite to driver's seat 9a (i.e., laterally eccentrically toward partner's seat 9b) because it is considered that a driver necessarily sits on driver's seat 9a during travel of vehicle 1 and that heavy components including steering wheel 41 are disposed around driver's seat 9a. Therefore, when a driver sits on driver's seat 9a, the weight of vehicle 1 is laterally distributed, i.e., vehicle 1 is laterally balanced so as to stabilize its traveling and traction performance.

A transmission casing 8 is disposed in front of engine 5. An input shaft 18 projects rearward from a right rear portion of transmission casing 8 (laterally toward engine 5). An output shaft 6 of engine 5 projects forward so as to be substantially coaxially connected to input shaft 18 through a flywheel 7 which can absorb vibration of engine 5.

Transmission casing 8 incorporates a later-discussed multi-speed (discontinuously variable) transmission 19 including a plurality of gear trains. A front output shaft 10 projects forward from a front surface of transmission casing 8, and a rear output shaft 11 projects rearward from a rear surface of transmission casing 8. Multi-speed transmission 19 controls speed changes in the forward traveling direction (and directionally reverse when it is set for backward traveling) in correspondence to the rotary force of input shaft 18 driven by power from engine 5, and distributes it between front output shaft 10 and rear output shaft 11.

A rear transaxle 13 is disposed behind transmission casing 8. An input shaft 17 projects forward from a front surface of rear transaxle 13, and is connected to rear output shaft 11 through a slightly laterally slanted horizontal propeller shaft 15 and joints (universal joints) 20. Rear output shaft 11 projects rearward from a left rear portion of transmission casing 8 (laterally opposite to engine 5 and input shaft 18) so that propeller shaft 15 among other members interposed between rear output shaft 11 and input shaft 17 is laterally offset from engine 5.

On the other hand, a front transaxle 12 having a rearwardly projecting input shaft 16 is disposed in front of transmission casing 8. Input shaft 16 is connected to front output shaft 10 through a propeller shaft 14 and joints (universal joints) 20. The fact that no element to be considered about interference with propeller shaft 14 and joints 20 exists between transmission casing 8 and front transaxle 12 enables substantially fore-and-aft coaxial arrangement of front output shaft 10, propeller shaft 14 and input shaft 16, thereby reducing stress on joints 20 and silencing the rotation of joints 20. If it is better, joints 20 can be inexpensive, simple cylindrical couplings, instead of expensive universal joints.

Rear transaxle 13 is disposed at the substantially laterally middle position under a rear portion of rear frame 3, stepped upward from the front portion thereof. A bracket (not shown) is extended from rear frame 3 so as to support rear transaxle 13 through vibration-isolating means (such as rubber). A rear differential gear unit 27 is disposed in rear transaxle 13. Differential gear unit 27 includes a differential cage 23. A bull gear 22 is integrally provided on differential cage 23 and meshes with a bevel gear 21 formed (or fixed) on a rear end of input shaft 17. Left and right first axles 25 are inserted at proximal ends thereof into differential cage 23. In differential cage 23, beveled differential side gears fixed on the proximal ends of first axles 25 mesh with a beveled pinion so as to constitute a rear bevel gear train 35 through which left and right first axles 25 are differentially rotatably connected to each other. Left and right rear wheels 26 are disposed on left and right outsides of the rear portion of rear frame 3. Each first axle 25 is drivingly connected to a rear wheel shaft 26a serving as a center shaft of each rear wheel 26 through universal joints 28 and a propeller shaft 29.

In rear bevel gear train 35, when first axles 25 are substantially evenly loaded by a ground surface, the rotary force of differential cage 23 is transmitted to both first axles 25 so as to drive both rear wheels 26. First axles 25 differentially rotate in correspondence to the differential load between rear wheels 26. Rear bevel gear train 35 is provided with a limited slip differential (LSD) mechanism 35a, through which the rotary force of one axle 25 is transmitted to the other axle 25 loaded less than the one axle 25 when the differential load exceeds a predetermined value. In LSD mechanism 35a, friction disks engaged to one axle 25 and friction disks engaged to differential cage 23 are alternately arranged so as to cause a pressure among them through a pressure plate and an electric actuator 35b, thereby optimizing the rotary speed difference between left and right axles 25 for improving cornering of vehicle 1 and corresponding to any ground condition.

Left and right stays 3a project distally leftward and rightward from the left and right sides of the rear portion of rear frame 3. A suspension mechanism 30, including a coiled spring or another shock absorber, is interposed between each stay 3a and each rear wheel 26.

A front portion of front frame 2 is stepped upward from the rear portion thereof. Front transaxle 12 is disposed at the substantially lateral middle position under the front portion of front frame 2. A bracket (not shown) is extended from front frame 2 so as to support front transaxle 12 through vibration-isolating means (such as rubber). A front differential gear unit 31 is disposed in front transaxle 12. Differential gear unit 31 includes a differential cage 34. A bull gear 33 is integrally provided on differential cage 34 and meshes with a bevel gear 32 formed (or fixed) on a front end of input shaft 16. Left and right second axles 36 are inserted at proximal ends thereof into differential cage 34. In differential cage 34, beveled differential side gears fixed on the proximal ends of second axles 36 mesh with a beveled pinion so as to constitute a front bevel gear train 35 through which left and right second axles 36 are differentially rotatably connected to each other. Left and right front wheels 37 are disposed on left and right outsides of the front portion of front frame 2. Each second axle 36 is drivingly connected to a front wheel shaft 37a serving as a center shaft of each front wheel 37 through universal joints 38 and a propeller shaft 39.

With respect to front bevel gear train 35 in front transaxle 12, when second axles 36 are substantially evenly loaded by a ground surface, the rotary force of differential cage 34 is transmitted to both second axles 36 so as to drive both front wheels 37. Second axles 36 differentially rotate in correspondence to the differential load between front wheels 37. Similar to rear bevel gear train 35 in rear transaxle 13, front bevel gear train 35 is provided with a limited slip differential (LSD) mechanism 35a, through which the rotary force of one axle 36 is transmitted to the other axle 36 loaded less than the one axle 36 when the differential load exceeds a predetermined value, thereby optimizing the rotary speed difference between left and right axles 36 for improving cornering of vehicle 1 and corresponding to any ground condition. Further, a later-discussed center differential gear unit 101 is mechanically connected to second axles 36 so as to surely apply engine braking onto second axles 36 as well as first axles 25.

Left and right stays 2a project distally leftward and rightward from the left and right sides of the front portion of front frame 2. A suspension mechanism 40, including a coiled spring or another shock absorber, is interposed between each stay 2a and each front wheel 37.

An upright front cover 2b is mounted on the front portion of front frame 2, and provided at an upper rear end portion thereof with a control and indicator panel, above which steering wheel 41 is disposed. A horizontal platform 2c, serving as a footrest, is spread behind the rear end of front cover 2b and extended out leftward and rightward.

Figure 9:
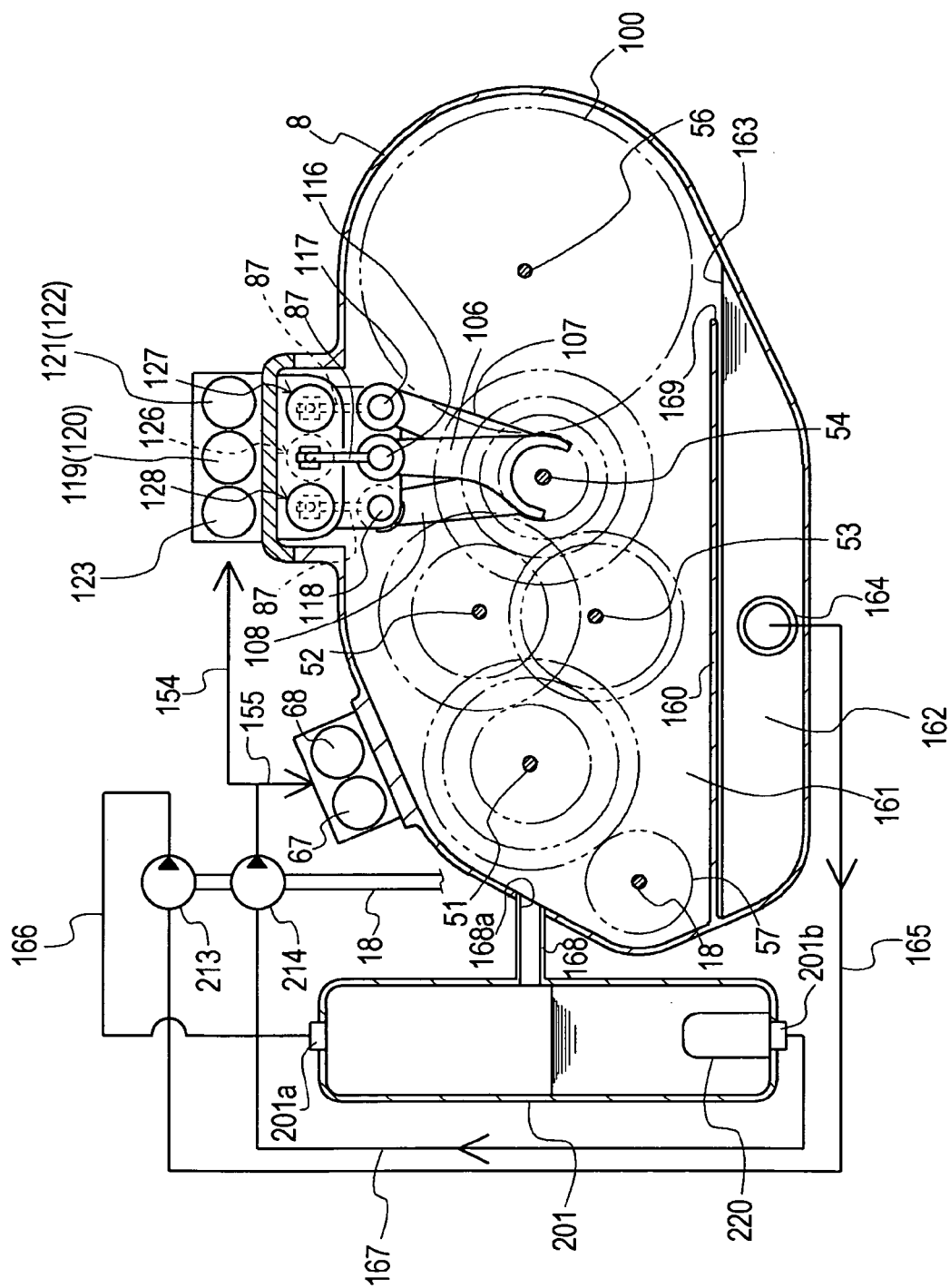
FIG. 9 is a front view partly in section of the transmission casing according to the first embodiment, showing a circulation system of lube therein.

Multi-speed transmission 19 will be described with reference to FIGS. 3, 6 and 9. In transmission casing 8, input shaft 18, a clutch input shaft 51, a first traveling gearshift shaft 52, a second traveling gearshift shaft 53, a traveling output shaft 54, a counter shaft 55 and a traveling PTO shaft 56, are disposed in the fore-and-aft direction of vehicle 1 and in parallel to one another, so as to serve as a group of transmission shafts of multi-speed transmission 19.

In this regard, in multi-speed transmission 19, input shaft 18 serves as an input portion for receiving the output force of engine 5, and traveling PTO shaft 56 serves as an output portion for distributing power between first axles 25 and second axle 36. In connection with the fore-and-aft crankshaft of engine 5, the group of the transmission shafts of multi-speed transmission 19, ordered in the power transmission course from input shaft 18 to traveling PTO shaft 56, are extended in the fore-and-aft direction of vehicle 1, so as to be juxtaposed laterally of vehicle 1, thereby minimizing transmission casing 8 incorporating multi-speed transmission 19. Such vertically minimized transmission casing 8 can be easily disposed under cargo 4 or seats 9 without reduction of the ground clearance of vehicle 1 or heightening of vehicle 1.

Input shaft 18 is fixedly provided on a rear portion thereof with a gear 57, and projects out at a front portion thereof forward from transmission casing 8 so as to be provided thereon with pumps 213 and 214. Therefore, pumps 213 and 214 are driven together by input shaft 18.

Clutch input shaft 51 is disposed upwardly leftward from input shaft 18, and provided thereon with multi friction disk type first and second clutches 58 and 59. Second clutch 59 is disposed behind first clutch 58, and a gear 60 is fixed on clutch input shaft 51 behind second clutch 59. Gear 60 meshes with gear 57 so as to constantly transmit the rotary force of input shaft 18 to clutch input shaft 51.

A first clutch output gear 61 is relatively rotatably provided on clutch input shaft 51 in front of first clutch 58. When first clutch 58 is engaged, first clutch output gear 61 is relatively unrotatably connected to clutch input shaft 51 through engaged first clutch 58. A first clutch hydraulic cylinder 71 is provided for the selective engagement and disengagement of first clutch 58. A second clutch output gear 66 is relatively rotatably provided on clutch input shaft 51 behind second clutch 59. When second clutch 59 is engaged, second clutch output gear 66 is relatively unrotatably connected to clutch input shaft 51 through engaged second clutch 59. A second clutch hydraulic cylinder 72 is provided for the selective engagement and disengagement of second clutch 59. A later-discussed clutch control mechanism controls hydraulic cylinders 71 and 72 so as to gradually continuously change the transmitted torque between shafts 51 and 52 while the speed level of multi-speed transmission 19 is shifted by disengaging one clutch 58 or 59 having been engaged and engaging the other clutch 59 or 58 having been disengaged.

First traveling gearshift shaft 52 is disposed upwardly leftward from clutch input shaft 51. First traveling gearshift shaft 52 is fixedly provided on a front portion thereof with a first speed normal drive gear 81, a third speed normal drive gear 83 disposed in front of first speed normal drive gear 81, an input gear 76 disposed in front of second speed normal drive gear 83, and a reverse drive gear 85 disposed in front of input gear 76. Input gear 76 meshes with first clutch output gear 61 so as to transmit the rotary force of clutch input shaft 51 to first traveling gearshift shaft 52 through engaged first clutch 58.

Second traveling gearshift shaft 53 is disposed downwardly leftward from clutch input shaft 51. Second traveling gearshift shaft 53 is fixedly provided on a rear portion thereof with an input gear 77, a second speed normal drive gear 82 disposed in front of input gear 77, and a fourth speed normal drive gear 84 disposed in front of second speed normal drive gear 82. Input gear 77 meshes with second clutch output gear 66 so as to transmit the rotary force of clutch input shaft 51 to second traveling gearshift shaft 53 through engaged second clutch 59.

Traveling output shaft 54 is disposed downwardly leftward from first traveling gearshift shaft 52 and upwardly leftward from second traveling gearshift shaft 53. Traveling output shaft 54 is relatively rotatably provided thereon with a second speed normal driven gear 92, a fourth speed normal driven gear 94 disposed in front of second speed normal driven gear 92, a first speed normal driven gear 91 disposed in front of fourth speed normal driven gear 94, a third speed normal driven gear 93 and a reverse driven gear 95. First and third speed normal driven gears 91 and 93 mesh with respective first and third speed normal drive gears 81 and 83 fixed on first traveling gearshift shaft 52. Second and fourth speed normal driven gears 92 and 94 mesh with respective second and fourth speed normal drive gears 82 and 84 fixed on second traveling gearshift shaft 53. Fore-and-aft extended counter shaft 55 is disposed between first traveling gearshift shaft 52 and traveling output shaft 54, and an idle gear 86 is provided on counter shaft 55 so as to mesh with reverse drive gear 85 and reverse driven gear 95.

In this arrangement, gears 81 and 91 constitute a first speed normal (forward traveling) gear train, gears 82 and 92 constitute a second speed normal (forward traveling) gear train, gears 83 and 93 constitute a third speed normal (forward traveling) gear train, gears 84 and 94 constitute a fourth speed normal (forward traveling) gear train, and gears 85, 86 and 95 constitute a reverse (backward traveling) gear train.

Traveling output shaft 54 is relatively unrotatably provided thereon with splined hubs 96, 97 and 98 through respective synchronizers. Splined hub 96 is disposed between first speed normal driven gear 91 and third speed normal driven gear 93, splined hub 97 is disposed between second speed normal driven gear 92 and fourth speed normal driven gear 94, and splined hub 98 is disposed behind reverse driven gear 95 (in front of third speed normal driven gear 93). Shifters 96a, 97a and 98a are axially slidably and relative unrotatably fitted on respective splined hubs 96, 97 and 98.

First and third speed normal driven gears 91 and 93 are formed with respective clutch teeth portions 91a and 93a facing splined hub 96. Third and fourth speed normal driven gears 92 and 94 are formed with respective clutch teeth portions 92a and 94a facing splined hub 97. Reverse driven gear 95 is formed with a clutch teeth portion 95a facing splined hub 98.

Due to the arrangement, one of clutch teeth portions 91a, 92a, 93a, 94a and 95a is selected to mesh with corresponding one of shifters 96a, 97a and 98a through the corresponding synchronizer, so as to relatively unrotatably connect the corresponding driven gear 91, 92, 93, 94 or 95 to traveling output shaft 54, thereby smoothly transmitting the rotary force of one of first and second traveling gearshift shafts 52 and 53 to traveling output shaft 54 through the selected gear train.

A gear 99 is fixed on traveling output shaft 54 behind second speed normal driven gear 92, and meshes with a bull gear 100 of a center differential gear unit 101. Center differential gear unit 101 includes a differential cage 102 incorporating a center bevel gear train 35 for differentially distributing the rotary force of traveling output shaft 54 forward and rearward.

Traveling PTO shaft 56 is extended forward from center differential gear unit 101 so as to project outward from a left front surface of transmission casing 8. A gear 104 is fixed on a front end of traveling PTO shaft 56 and meshes with a gear 105 fixed on front output shaft 10, so as to transmit the rotary force of traveling output shaft 54 to front output shaft 10 through center differential gear unit 101. Further, propeller shaft 14 transmits the rotary force of front output shaft 10 to front transaxle 12.

Rear output shaft 11 is extended rearward from center differential gear unit 101 and connected to propeller shaft 15 so as to transmit the rotary force of traveling output shaft 54 to rear transaxle 13 through center differential gear unit 101 and propeller shaft 15. Center bevel gear train 35 in center differential gear unit 101 is provided with an LSD mechanism 35a, similar to bevel gear trains 35 in respective front and rear differential gear units 27 and 31.

Due to this arrangement, vehicle 1 starts traveling forward at the first speed level established by the first speed normal gear train when first clutch 58 is engaged in a precondition that the first speed normal gear train is selected. Namely, first clutch 58 serves as a start-up clutch to be engaged for the starting of vehicle 1. If the second speed normal gear train is previously selected and then second clutch 59 is engaged, vehicle 1 starts forward at the second speed level established by the second speed normal gear train. In this case, second clutch 59 serves as a start-up clutch to be engaged for the starting of vehicle 1. The clutch pressure of either clutch 58 or 59 serving as the start-up clutch is set appropriately for establishing creep of vehicle 1 during its start.

In this way, first and second clutches 58 and 59 can be used as the start-up clutch to be engaged for starting of vehicle 1, instead of an additional device for starting of vehicle 1, e.g., a torque converter, thereby making simple and inexpensive vehicle 1.

A mechanism for controlling the shifters and clutches will be described with reference to FIGS. 3 to 6 and 9. A first fork 106, a second fork 107 and a third fork 108 are fitted onto respective shifters 96a, 97a and 98a, and are formed at basal ends thereof with respective bosses (relatively unrotatably and axially unslidably) fixed through respective pins 115 on a first shifter shaft 116, a second shifter shaft 117 and a third shifter shaft 118, respectively.

A shifter housing 125 is fixed at a bottom base portion thereof onto a top portion of transmission casing 8 so as to cover a top opening of transmission casing 8. A front bearing wall 109 and a rear bearing wall 110 are extended downward from shifter housing 125 into transmission casing 8. First, second and third shifter shafts 116, 117 and 118 are horizontally juxtaposed and fore-and-aft slidably supported between front and rear bearing walls 109 and 110, so that first, second and third forks 106, 107 and 108 are fore-and-aft slidably integral with respective first, second and third fork shafts 116, 117 and 118.

When first shifter shaft 116 is slid forward or rearward, first fork 106 moves shifter 96a, so that shifter 96a engages one of driven gears 91 and 93 with splined hub 96. Therefore, one of the odd-numbered (i.e., first and third) speed gear trains is selected to be drivingly connected to traveling output shaft 54. When second shifter shaft 117 is slid forward or rearward, second fork 107 moves shifter 97a, so that shifter 97a engages one of driven gears 92 and 94 with splined hub 97. Therefore, one of the even-numbered (i.e., second and fourth) speed gear trains is selected to be drivingly connected to traveling output shaft 54.

In this regard, while multi-speed transmission 19 includes the odd-numbered (i.e., first and third) speed gear trains and the even-numbered (i.e., second and fourth) speed gear trains, first shifter shaft 116 for selecting one of the odd-numbered speed gear trains and second shifter shaft 117 for selecting one of the even-numbered speed gear trains are horizontally juxtaposed as mentioned above so as to vertically minimize transmission casing 8 incorporating multi-speed transmission 19.

First shifter shaft 116 is formed on the outer peripheral surface thereof with a rear annular groove 116a for setting a third speed forward traveling position (for making shifter 96a engage driven gear 93 with splined hub 96), a fore-and-aft middle annular groove 116b for setting a neutral position (for making shifter 96a separate both driven gears 91 and 93 from splined hub 96), and a front annular groove 116c for setting a first speed forward traveling position (for making shifter 96a engage driven gear 91 with splined hub 96). Bearing wall 109 is bored therein with an upwardly vertical hole 109a from the bottom surface thereof. A spring 112 and a detent ball 113 are fitted into hole 109a so that detent ball 113 pressed by spring 112 can be engaged into one of grooves 116a, 116b and 116c, thereby constituting a detent mechanism 111 for locating shifter shaft 116.

Detent ball 113 biased by spring 112 is constantly pressed against first shifter shaft 116. When first shifter shaft 116 is fore-and-aft slid to one target position of the first and third speed forward traveling positions and the neutral positions, detent ball 113 is pressed into one of grooves 116a, 116b and 116c so as to hold first shifter shaft 116 at the target position. Second shifter shaft 117 is provided with a similar detent mechanism, so as to be held at one target position of a second speed forward traveling position (for making shifter 97a engage driven gear 92 with splined hub 97), a neutral position (for making shifter 97a separate both driven gears 92 and 94 from splined hub 97), and a fourth speed forward traveling position (for making shifter 96 engage driven gear 94 with splined hub 97). Third shifter shaft 118 is also provided with a similar detent mechanism, so as to be held at one target position of a backward traveling position (for making shifter 98a engage driven gear 95 with splined hub 98) and a neutral position (for making shifter 98a separate driven gear 95 from splined hub 98).

Shifter housing 125 is formed so as to incorporate a first hydraulic cylinder 126, a second hydraulic cylinder 127 and a third hydraulic cylinder 128 extended in the fore-and-aft direction of vehicle 1 and juxtaposed laterally in parallel. First, second and third cylinders 126, 127 and 128 include respective piston rods 129, 134 and 139 having outer ends from which respective connection arms 87 are extended downward and connected at bottom ends thereof to ends of first, second and third shifter shafts 116, 117 and 118, respectively.

In first hydraulic cylinder 126, a first piston 130 is fixed on an inner end of piston rod 129, so as to be selectively disposed at one of a first speed forward traveling position, a neutral position and a third speed forward traveling position. First piston 130 is shaped such as to include a diametrically large portion 130a and a diametrically small portion 130b. A cylindrical second piston 131, which is diametrically larger than diametrically large portion 130a, is axially slidably fitted on diametrically small portion 130b. First hydraulic cylinder 126 has a shoulder portion 125a, which is formed by stepping a wall of shifter housing 125 so as to correspond to the diametric difference between diametrically large portion 130a of first piston 130 and second piston 131. First and second pistons 130 and 131 constitute a piston 146. First hydraulic cylinder 126 includes fluid chambers 132 and 133, which are disposed fore-and-aft opposite to each other with respect to piston 146 and connected to respective electromagnetic valves 119 and 120.

Figure 4:
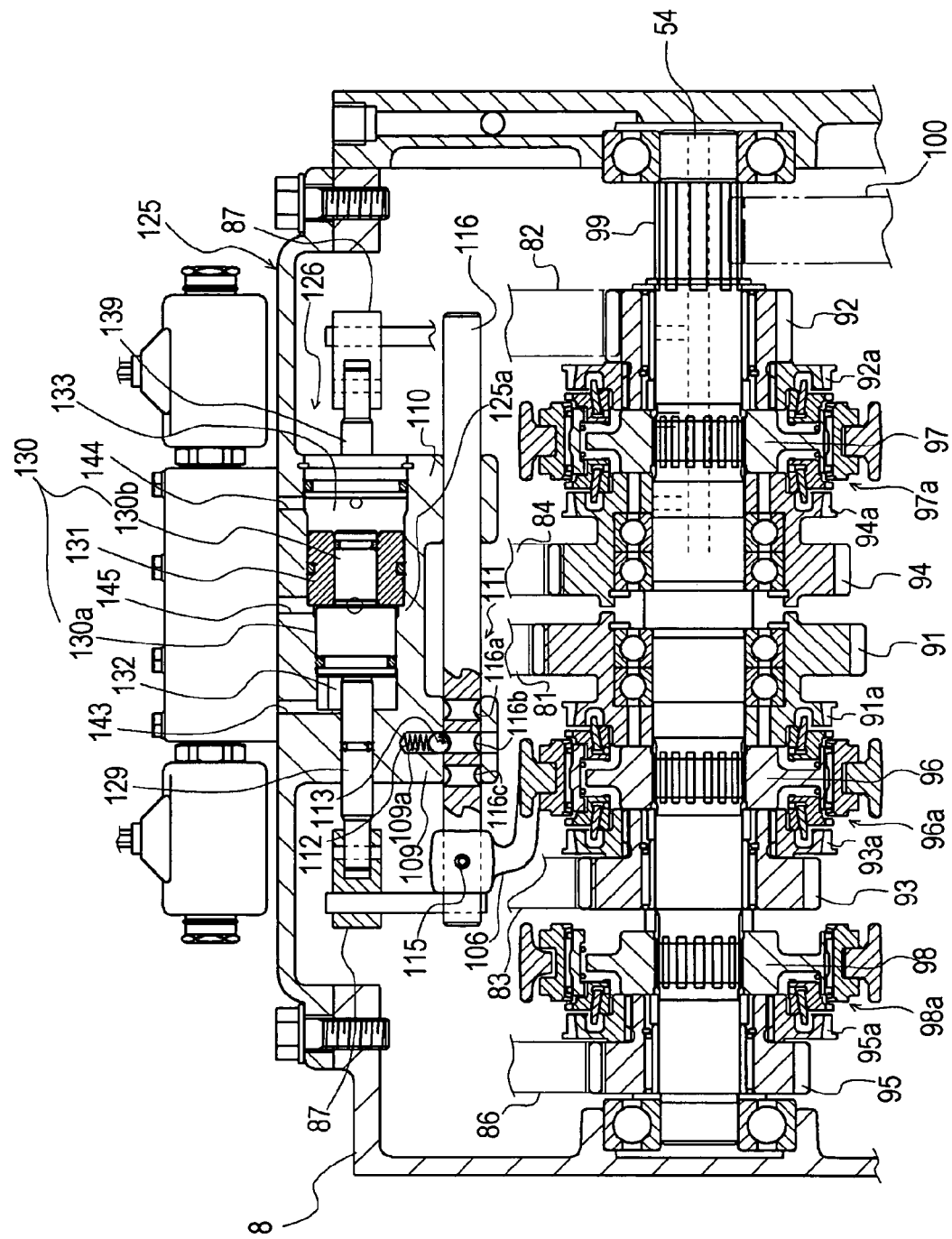
FIG. 4 is a side view partly in section of a transmission casing according to the first embodiment.
Figure 5:
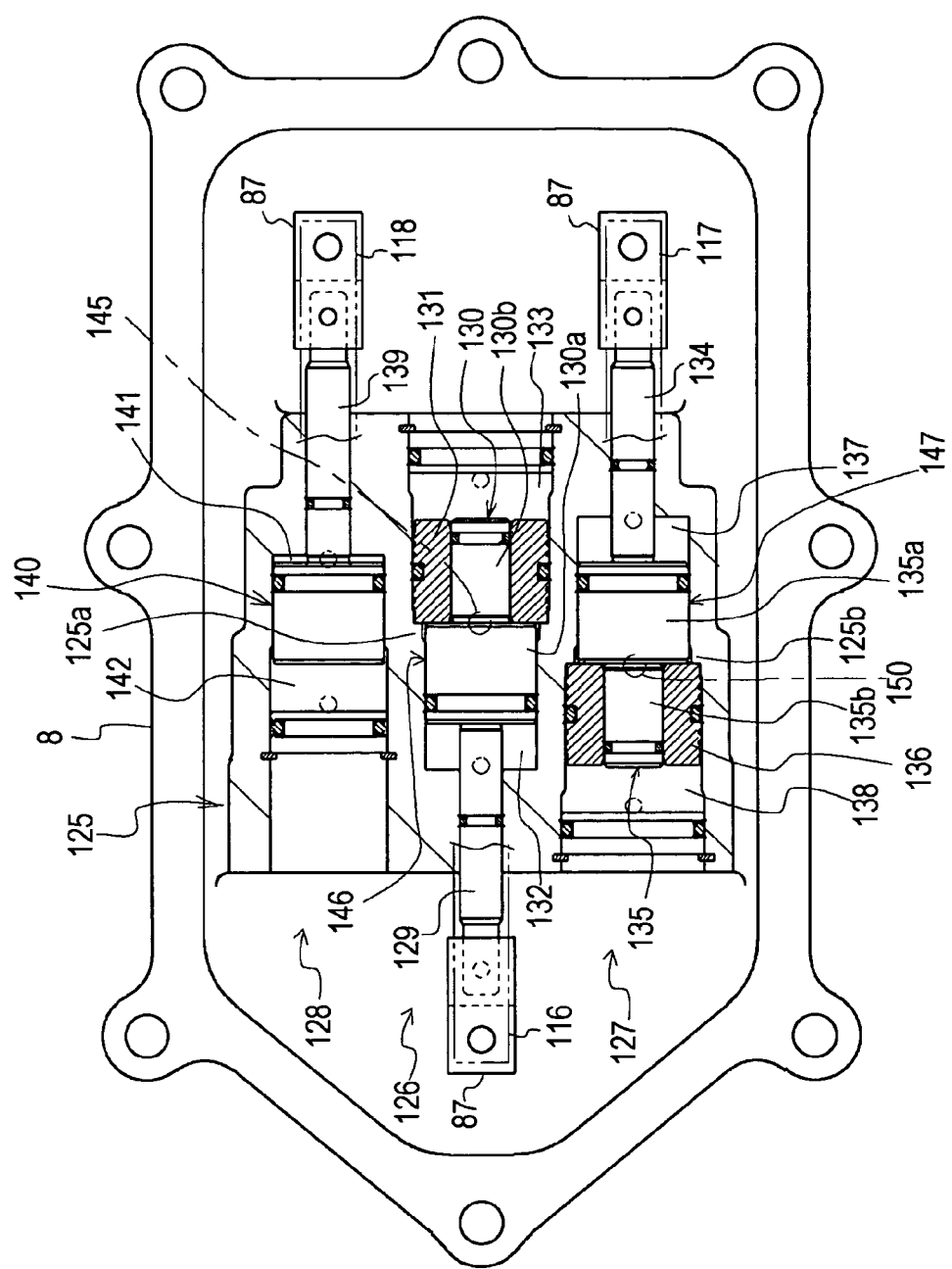
FIG. 5 is a bottom view partly in section of a cylinder chamber at an upper portion of the transmission casing according to the first embodiment.
Figure 6:
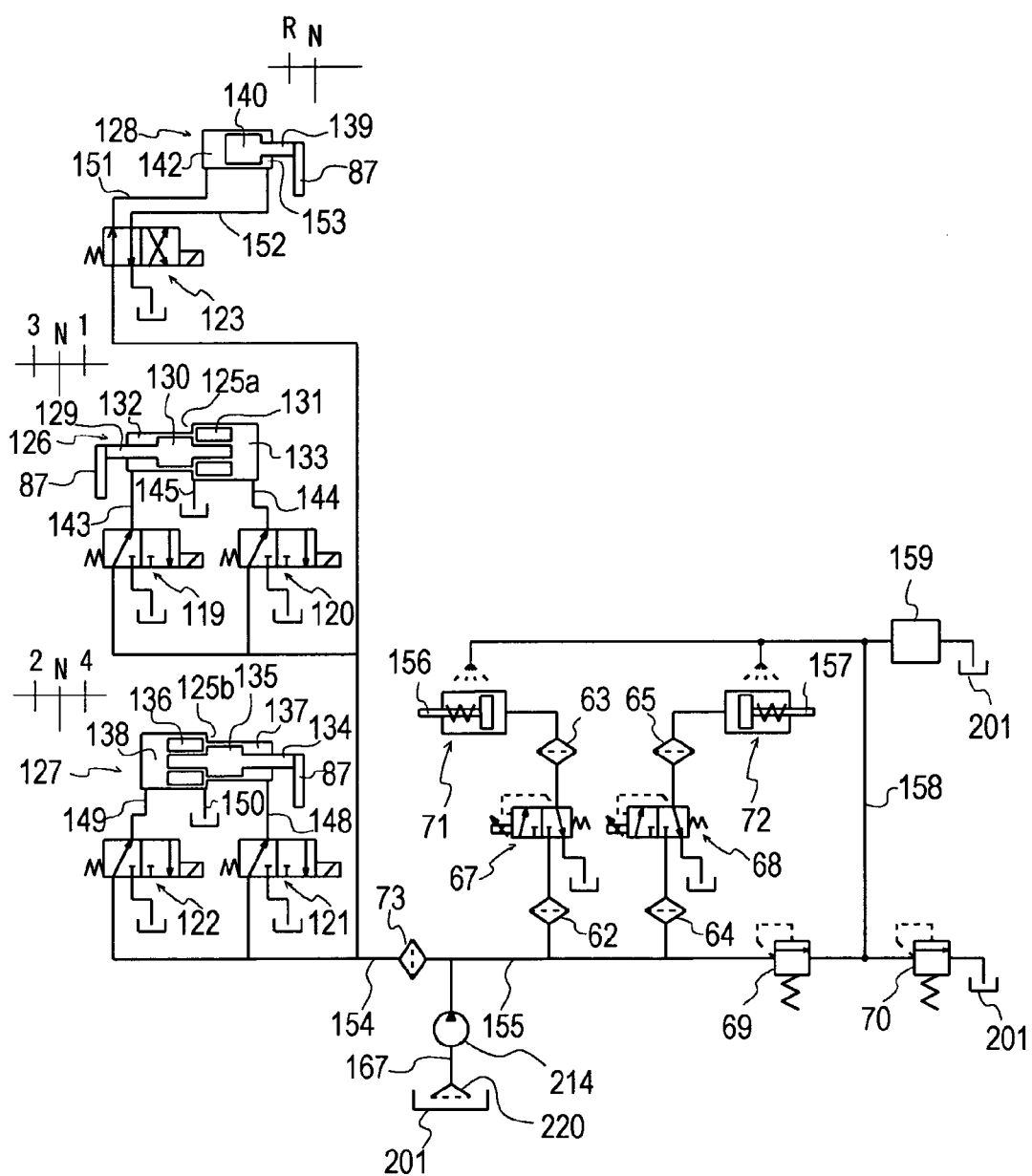
FIG. 6 is a diagram of a hydraulic circuit for gearshift and clutch operation according to the first embodiment.

When both electromagnetic valves 119 and 120 are unexcited for neutralizing first hydraulic cylinder 126 as shown in FIG. 6, electromagnetic valves 119 and 120 supply pressure fluid to respective chambers 132 and 133 through respective passages 143 and 144. However, a gap between first and second pistons 130 and 131 is opened to a drain passage 145 so as to move first piston 130 (rightward in FIGS. 4 to 6) and second piston 131 (leftward in FIGS. 4 to 6) toward each other. Consequently, first and second pistons 130 and 131 abut against each other, and second piston 131 abuts against shoulder portion 125a, as shown in FIGS. 4 and 5, because an area of second piston 131 pressed by fluid in chamber 133 is larger than an area of second piston 131 pressed by fluid in chamber 132. In this way, piston 146 is accurately retained at the neutral position.

When multi-speed transmission 19 is set for the first speed forward traveling, electromagnetic valve 119 is unexcited to supply fluid into chamber 132 and electromagnetic valve 120 is excited to stop supply fluid to chamber 133, so that the fluid in chamber 132 pushes piston 146 toward chamber 133 (rightward in FIGS. 4 to 6). Consequently, piston 146 abuts against a wall surface of shifter housing 125 serving as an outer end of chamber 133, thereby being retained at the first speed forward traveling position. When multi-speed transmission 19 is set for the third speed forward traveling, electromagnetic valve 120 is unexcited to supply fluid into chamber 133 and electromagnetic valve 119 is excited to stop supply fluid to chamber 132, so that the fluid in chamber 133 pushes piston 146 toward chamber 132 (leftward in FIGS. 4 to 6). Consequently, piston 146 abuts against a wall surface of shifter housing 125 serving as an outer end of chamber 132, thereby being retained at the third speed forward traveling position.

In second hydraulic cylinder 127, a first piston 135 is fixed on an inner end of piston rod 134, so as to be selectively disposed at one of a second speed forward traveling position, a neutral position and a fourth speed forward traveling position. First piston 135 is shaped such as to include a diametrically large portion 135a and a diametrically small portion 135b. A cylindrical second piston 136, which is diametrically larger than diametrically large portion 135a, is axially slidably fitted on diametrically small portion 135b. Second hydraulic cylinder 127 has a shoulder portion 125b, which is formed by stepping a wall of shifter housing 125 so as to correspond to the diametric difference between diametrically large portion 135a of first piston 135 and second piston 136. First and second pistons 135 and 136 constitute a piston 147. Second hydraulic cylinder 127 includes fluid chambers 137 and 138, which are disposed fore-and-aft opposite to each other with respect to piston 147 and connected to respective electromagnetic valves 121 and 122.

When both electromagnetic valves 121 and 122 are unexcited for neutralizing second hydraulic cylinder 127 as shown in FIG. 6, electromagnetic valves 121 and 122 supply pressure fluid to respective chambers 137 and 138 through respective passages 148 and 149. However, a gap between first and second pistons 135 and 136 is opened to a drain passage 150 so as to move first piston 135 (leftward in FIGS. 5 and 6) and second piston 136 (rightward in FIGS. 5 and 6) toward each other. Consequently, first and second pistons 135 and 136 abut against each other, and second piston 136 abuts against shoulder portion 125b, as shown in FIG. 5, because an area of second piston 136 pressed by fluid in chamber 138 is larger than an area of second piston 136 pressed by fluid in chamber 137. In this way, piston 147 is accurately retained at the neutral position.

When multi-speed transmission 19 is set for the second speed forward traveling, electromagnetic valve 121 is unexcited to supply fluid into chamber 137 and electromagnetic valve 122 is excited to stop supply fluid to chamber 138, so that the fluid in chamber 137 pushes piston 147 toward chamber 138 (leftward in FIGS. 5 and 6). Consequently, piston 147 abuts against a wall surface of shifter housing 125 serving as an outer end of chamber 138, thereby being retained at the second speed forward traveling position. When multi-speed transmission 19 is set for the fourth speed forward traveling, electromagnetic valve 122 is unexcited to supply fluid into chamber 138 and electromagnetic valve 121 is excited to stop supply fluid to chamber 137, so that the fluid in chamber 138 pushes piston 147 toward chamber 137 (rightward in FIGS. 5 and 6). Consequently, piston 147 abuts against a wall surface of shifter housing 125 serving as an outer end of chamber 137, thereby being retained at the fourth speed forward traveling position.

A gearshift fluid passage 154 is branched to electromagnetic valves 121 and 122, branched to electromagnetic valves 119 and 120 at the downstream of the branching point to electromagnetic valves 121 and 122, and connected to an electromagnetic valve 123 at the downstream of the branching point to electromagnetic valves 119 and 120. In third hydraulic cylinder 128, a piston 140 is fixed on an inner end of piston rod 139 so as to be selectively disposed at a neutral position and a backward traveling position. Third hydraulic cylinder 128 includes chambers 142 and 153, which are disposed fore-and-aft opposite to each other with respect to piston 140 and connected to electromagnetic valve 123 through respective passages 151 and 152.

When multi-speed transmission 19 is set for backward traveling or neutralized, electromagnetic valve 123 is unexcited as shown in FIG. 6, so as to supply fluid from gearshift fluid passage 154 into chamber 142, and to drain fluid from chamber 153, thereby retaining piston 140 and piston rod 139 at the neutral position. When multi-speed transmission 19 is set for backward traveling, electromagnetic valve 123 is excited so as to supply fluid from gearshift fluid passage 154 into chamber 153, and to drain fluid from chamber 142, thereby moving piston 140 and rod 139 (leftward in FIGS. 5 and 6) to the backward traveling position.

When engine 5 is started up, all electromagnetic valves 119, 120, 121, 122 and 123 are unexcited as shown in FIG. 6, so as to keep the neutral state of multi-speed transmission 19. When one traveling speed and direction mode of vehicle 1 is selected among the four forward traveling speeds and the backward traveling, corresponding one of electromagnetic valves 119, 120, 121, 122 and 123 is selectively excited, and any of pistons 146, 147 and 148 is moved together with corresponding piston rod 129, 134 or 139, corresponding connection arm 87, corresponding shifter shaft 116, 117 or 118, and corresponding fork 106, 107 or 108, so as to engage corresponding shifter 96a, 97a or 98a with one of driven gears 91, 92, 93, 94 and 95 corresponding to the selected traveling mode, thereby transmitting the rotary force of selected one of driven gears 91 to 95 to traveling output shaft 54. Then, center differential unit 101 distributes the rotary force of traveling output shaft 54 between front and rear output shafts 10 and 11, so as to drive front and rear transaxles 12 and 13, whereby vehicle 1 travels at the selected speed level and in the selected direction.

Pump 214 sucks fluid from a tank 201 through an oil filter 220, and distributes the fluid between gearshift fluid passage 154 and a clutch fluid passage 155. A relief valve 69 determines the maximum hydraulic pressure in clutch fluid passage 155 so as to protect a hydraulic circuit for supplying fluid to hydraulic cylinders 71 and 72. The fluid whose pressure is regulated by relief valve 69 is supplied to first clutch hydraulic cylinder 71 through a line filter 62, an electromagnetic proportional pressure reduction valve 67 and a line filter 63, and also supplied to second clutch hydraulic cylinder 72 through a line filter 64, an electromagnetic proportional pressure reduction valve 68 and a line filter 65.

Due to electromagnetic proportional pressure reduction valves 67 and 68, pistons 156 and 157 of respective hydraulic cylinders 71 and 72 are gradually and continuously moved, so as to continuously change the pressure among friction disks of respective first and second clutches 58 and 59. Therefore, each of clutches 58 and 59 can gradually and continuously change a torque transmitted therethrough when it is switched between the engagement state and the disengagement state.

A relief valve 70 is provided on a passage 158 on the downstream of relief valve 69 so as to determine the maximum pressure of fluid flowing therethrough. The fluid passed through relief valve 70 is supplied for lubricating a lubricated section 159 of multi-speed transmission 19 including various components and first and second clutches 58 and 59.

The gearshift of multi-speed transmission 19 is automatically controlled in correspondence to a relation between an accelerator operation degree (if the accelerator operation device is an accelerator pedal, a depression of the accelerator pedal) and an actual traveling speed of vehicle 1 (i.e., an actual rotary speed of axles 25 and 36). The automatic gearshift process will be described with reference to FIGS. 3 to 8.

Figure 7:
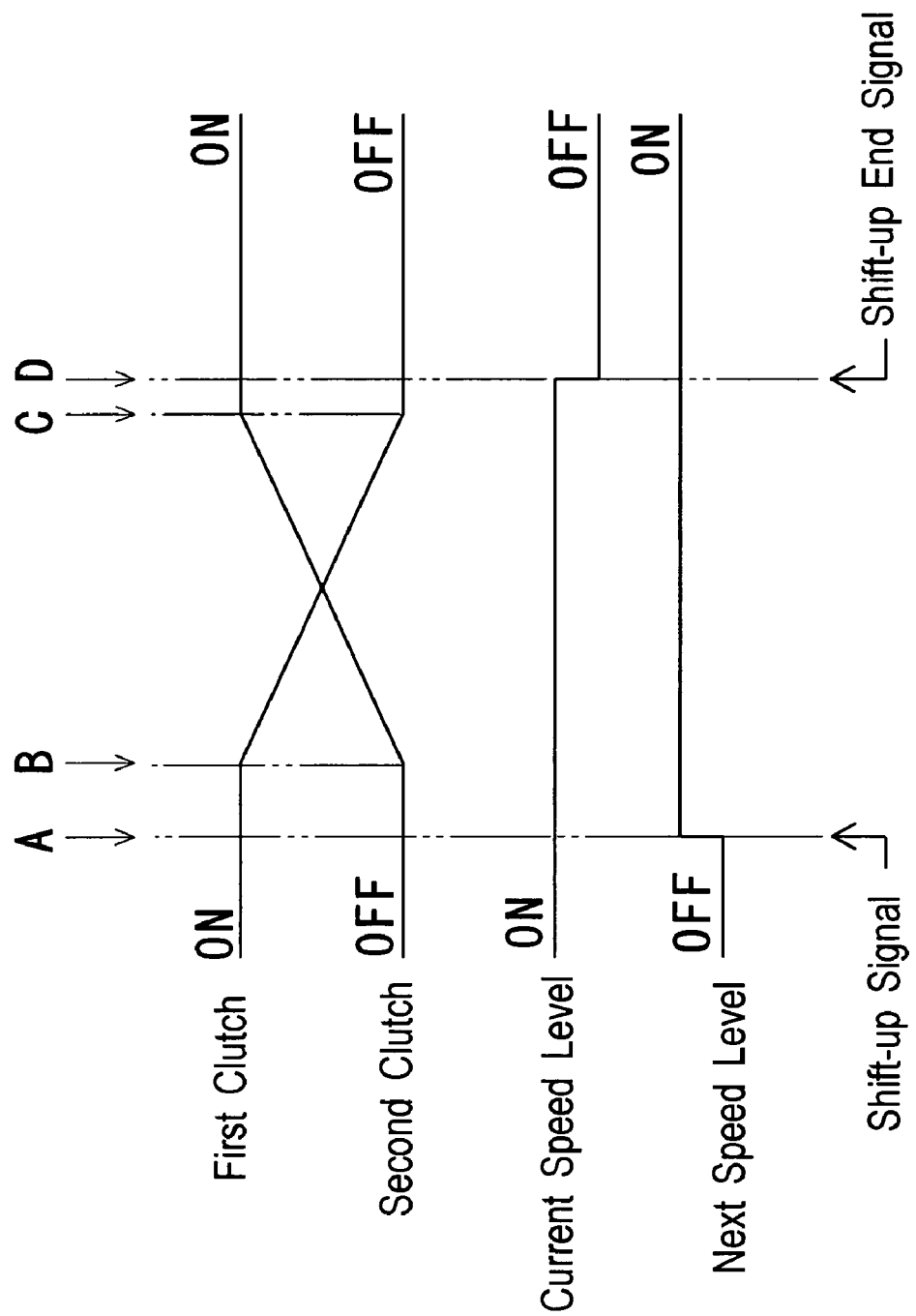
FIG. 7 is a time chart of gearshift control according to the first embodiment.

A gearshift (shift-up) pattern from the first forward traveling speed to the second forward traveling speed during traveling of vehicle 1 will be described as a respective gearshift pattern. As shown in FIG. 7, during the first speed forward travel of vehicle 1 (while the accelerator operation degree (e.g., depression of the accelerator pedal) corresponds to the first speed forward traveling), first clutch 58 is engaged (clutched on). In other words, first clutch hydraulic cylinder 71 keeps the proper clutch pressure of first clutch 58. At this time, electromagnetic valve 120 is excited (the other electromagnetic valves 119, 121, 122 and 123 are unexcited), so as to hold first shifter shaft 116 and first fork 106 at the first speed forward traveling position, so that shifter 96a engages with first speed normal driven gear 91, thereby drivingly connecting traveling output shaft 54 to first clutch 58 through the first speed normal gear train, i.e., gears 81 and 91. Therefore, the rotary force of first traveling gearshift shaft 52 driven by power from engine 5 through input shaft 18 and traveling input shaft 51 is transmitted to traveling output shaft 54 through engaged first clutch 58 and the first speed normal gear train (i.e., gears 81 and 91) essentially drivingly connected to first clutch 58. Simultaneously, second clutch 59 is disengaged (clutched off). In other words, second clutch hydraulic cylinder 72 keeps the minimum clutch pressure of second clutch 59. At this time, second shifter clutch shaft 117 and second fork 107 are disposed at the neutral position so as to disengage shifter 97a from driven gears 92 and 94.

When the accelerator operation device (e.g., the accelerator pedal) is operated at a timing A in FIG. 7, so as to increase the accelerator operation degree (e.g., depression of the accelerator pedal) for shift-up to the second speed forward traveling, a gearshift (shift-up) signal is inputted to a controller (not shown). Accordingly, the engagement of first clutch 58, the engagement of the first speed normal gear train (gears 81 and 91) with traveling output shaft 54, and the disengagement of second clutch 59 are kept as the state during the first speed forward traveling of vehicle 1, and the second speed gear train (i.e., gears 82 and 92) essentially connected to second clutch 59 is engaged with traveling output shaft 54. In this regard, unexcited electromagnetic valve 122 is excited so as to shift second shifter shaft 117 and second fork 107 to the second speed forward traveling position through piston rod 134 of second hydraulic cylinder 127, whereby shifter 97a having been disposed at the neutral position (separated from driven gears 92 and 94) slides to engage with second speed normal driven gear 92, thereby drivingly connecting traveling output shaft 54 to second clutch 59 through the second speed normal gear train (i.e., gears 82 and 92). However, at this time, second clutch 59 is still disengaged so as to prevent power from engine 5 from being transmitted to the second speed normal gear train, thereby reducing sudden stress caused by the engagement of the second speed normal gear train with traveling output shaft 54.

After the input of the gearshift (shift-up) signal, the controller confirms the engagement of the second speed normal gear train with traveling output shaft 54 before the process reaches a timing B shown in FIG. 7. At timing B, the controller issues a clutch-shift control signal for gradually disengaging first clutch 58 and for gradually engaging second clutch 59. Accordingly, electromagnetic proportional pressure reduction valves 67 and 68 are controlled so as to gradually and continuously move pistons 156 and 157 of hydraulic cylinders 71 and 72, respectively, so that, first clutch 58 is gradually transferred from the engagement state to the disengagement state (i.e., the clutch pressure of first clutch 58 is gradually reduced), and second clutch 59 is gradually transferred from the disengagement state to the engagement state (i.e., the clutch pressure of second clutch 59 is gradually increased). Therefore, the disengagement process of first clutch 58 and the engagement process of second clutch 59 timely overlap each other.

During a time passage from timing B to a timing C, the issue of the clutch-shift control signal from the controller is maintained. At timing C, first clutch 58 is completely disengaged (clutched off) and second clutch 59 is completely engaged (clutched on). In other words, during the issue of the clutch-shift control signal, both the first speed normal gear train and the second speed normal gear train are kept engaging with traveling output shaft 54, so that the power of engine 5 to the first speed normal gear train essentially connected to first clutch 58 is gradually reduced and the power of engine 5 to the second speed normal gear train essentially connected to second clutch 59 is gradually increased. Namely, the gearshift process absolutely involves a state that first and second clutches 58 and 59 are simultaneously half-clutched. Therefore, during the gearshift process since timing A till timing C, engine 5 keeps output of power, and with respect to the share of power transmission to traveling output shaft 54 between the first speed normal gear train and the second speed normal gear train, the power transmission share of the first speed normal gear train is gradually reduced and the power transmission share of the second speed normal gear train is increased compensatively, so that the power transmission share of the second speed normal gear train reaches 100% at timing C. When the variation of clutch pressures of first and second clutches 58 and 59 relative to time passage are graphed, a curve representing the gradual reduction of clutch pressure of first clutch 58 cross a curve representing the gradual increase of clutch pressure of second clutch 59. Hereinafter, such a clutch-shift control pattern using two clutches that a curve representing gradual reduction of clutch pressure of one clutch and a curve representing gradual increase of clutch pressure of the other clutch is referred to as "cross wave control", which is adaptable to later-discussed various gearshift patterns.

When the gearshift (shift-up) process shown in FIG. 7 reaches a timing D slightly after timing C, the controller issues a gearshift (shift-up) end signal. Accordingly, the engagement of second clutch 59, the engagement of the second speed normal gear train (gears 82 and 92) with traveling output shaft 54, and the disengagement of first clutch 58 are kept as the state during the second speed forward traveling of vehicle 1, and the first speed gear train (i.e., gears 81 and 91) essentially connected to first clutch 58 is disengaged from traveling output shaft 54. In this regard, excited electromagnetic valve 120 is unexcited so as to shift first shifter shaft 116 and first fork 106 to the first speed forward traveling position through piston rod 129 of first hydraulic cylinder 126, whereby shifter 96a having been disposed at the first speed forward traveling position (engaged with first speed normal driven gear 91) slides to disengage from both first and third speed normal driven gears 91 and 93, thereby drivingly disconnecting traveling output shaft 54 from the first speed normal gear train (i.e., gears 81 and 91). In this way, the gearshift (shift-up) from the first forward traveling speed to the second forward traveling speed is completed by the disengagement of the first speed normal gear train (essentially connected to first clutch 58) from traveling output shaft 54 after the clutch-shift of first and second clutches 58 and 59, i.e., disengagement of first clutch 58 and engagement of second clutch 59. Therefore, sudden stress onto the power transmission system caused by the disengagement of the first speed normal gear train from traveling output shaft 54 is reduced.

The other gearshift processes (e.g., shift-up from the second forward traveling speed to the third forward traveling speed, and shift-up from the third forward traveling speed to the fourth forward traveling speed) are performed similar to the shift-up process from the first forward traveling speed to the second forward traveling speed. To sum up, in vehicle 1 comprising: engine 5; the accelerator for controlling the rotary speed of engine 5; axles 25 and 36; and multi-speed transmission 19 for transmitting power from engine 5 to axles 25 and 36, multi-speed transmission 19 includes the odd-numbered speed drive trains (i.e., gears 81 and 91 and gears 83 and 93) for the odd-numbered (i.e., first and third) speed levels, first clutch 58 for the odd-numbered speed drive trains, even-numbered speed drive trains (i.e., gears 82 and 92 and gears 84 and 94) for the even-numbered (i.e., second and fourth) speed levels, and second clutch 59 for the even-numbered speed drive trains. In correspondence to operation of the accelerator and an actual speed of axles 25 and 36, one of first and second clutches 58 and 59 is engaged and the other of first and second clutches 59 and 58 is disengaged so as to select either the odd-numbered speed drive trains or the even-numbered speed drive trains to transmit power from engine 5 to axles 25 and 36. While the speed level of the multi-speed transmission is shifted between the odd-numbered speed level (e.g., first speed) and the even-numbered speed level (e.g., second speed), the engagement process of the one of first and second clutches 58 and 59 is timely overlapped with the disengagement process of the other of first and second clutches 59 and 58. Due to such a gearshift control, multi-speed transmission 19 ensures performance of a smooth speed change (gearshift) without cease of power transmission from engine 5 to axles 25 and 36. Multi-speed transmission 19 controlled in this way does not require the conventional CVT, thereby being safe from the problems peculiar to the CVT. That is, multi-speed transmission 19 has no problem of the belt slipping when wet, has satisfactory durability, and enables an effective engine braking action. Further, the sole multi-speed transmission 19 does not have to be combined with another transmission mechanism, thereby being simple and inexpensive and facilitating maintenance.

Hereinafter, it is assumed that the accelerator operation device is an accelerator pedal. With respect to the automatic gearshift control of multi-speed transmission 19 according to detection of depression of the accelerator pedal and detection of the actual traveling speed (i.e., the actual rotary speed of axles 25 and 36), timing A for issuing the gearshift signal and timing C for issuing the gearshift end signal are determined on the basis of a map of gearshift characteristic curves as shown in FIG. 8, detection of the actual throttle valve opening degree of engine 5 (corresponding to the depression of the accelerator pedal) by a sensor, and detection of the actual traveling speed of vehicle 1 (i.e., the rotary speed of axles 25 and 35) by a sensor.

Figure 8:
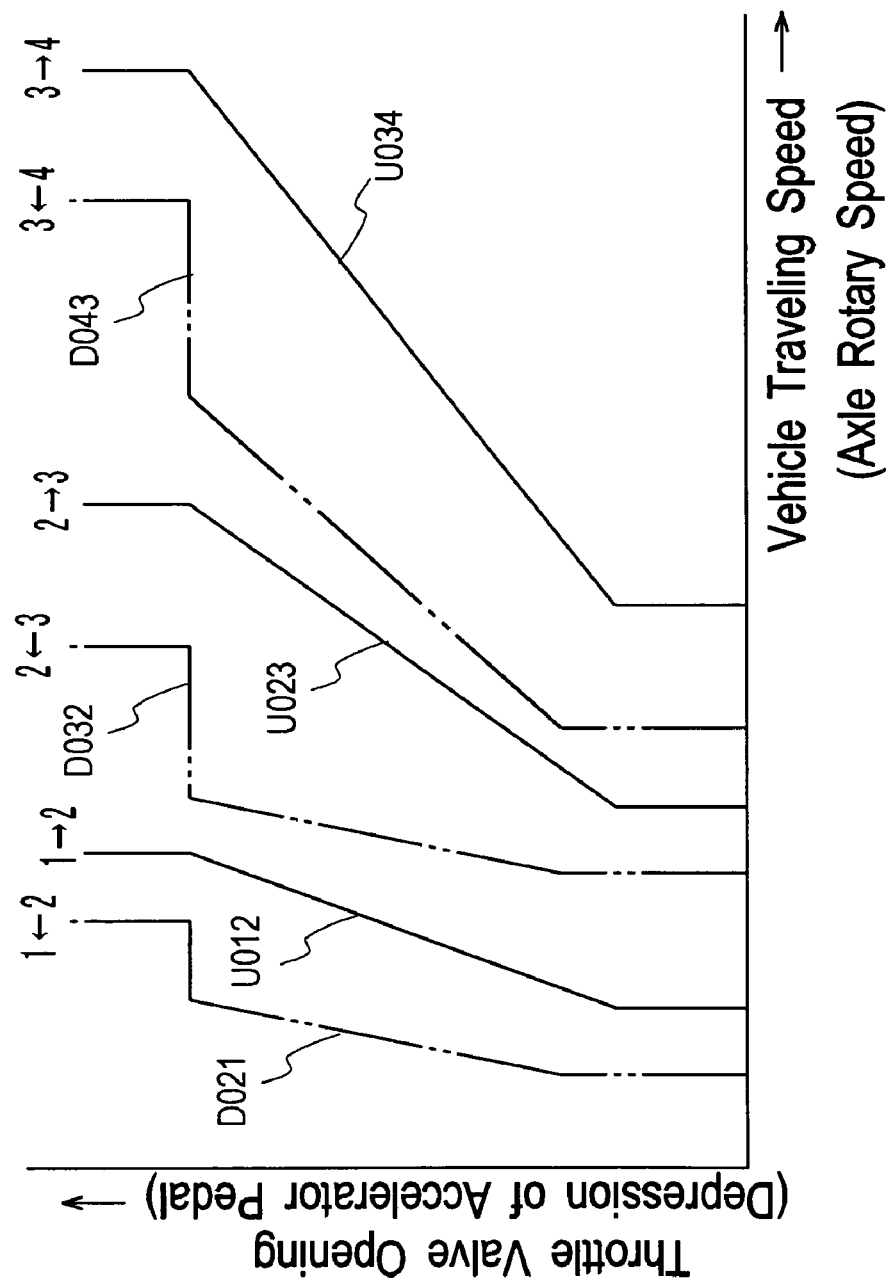
FIG. 8 is a map of characteristic curves for gearshift according to the first embodiment.

The gearshift based on the map of FIG. 8 is characteristic in that the variation rate of traveling speed by shift-down operation is smaller than that by shift-up operation. In this regard, a variation rate of a shift-down graph D021 is smaller than a variation rate of a shift-up graph U012, a variation rate of a shift-down graph D032 is smaller than a variation rate of a shift-up graph U023, and a variation rate of a shift-down graph D043 is smaller than a variation rate of a shift-up graph U034. Further, the larger the speed level is, the smaller the variation rate of vehicle traveling speed becomes. In this regard, variation rates of shift-down graph D021 and shift-up graph U012 are smaller than respective variation rates of shift-down graph D032 and U023, and variation rates of shift-down graph D032 and shift-up graph U023 are smaller than respective variation rates of shift-down graph D043 and U034. Therefore, the traveling speed of vehicle 1 can be smoothly reduced automatically in correspondence to the optional kick (shift) down by a driver, or to reduction of the actual traveling speed of vehicle 1 by increase of load onto drive wheels 26 and 37.

A lubrication structure in transmission casing 8 incorporating multi-speed transmission 19 will now be described with reference to FIGS. 6 and 9. Inside transmission casing 8, a horizontal plate-like partition 160 is extended from a lower wall portion of transmission casing 8 so as to vertically partition the inside space of transmission casing 8 into upper and lower chambers 161 and 162. Upper chamber 161 above partition 160 incorporates multi-speed transmission 19, and lower chamber 162 below partition 160 serves as a fluid sump for collecting fluid falling from multi-speed transmission 19.

An opening 169 is provided sidewise (leftward) from an (left) end of partition 160 and vertically downward from traveling PTO shaft 56. Therefore, hydraulic pressure fluid leaked from hydraulic devices such as hydraulic cylinders 71, 72, 126, 127 and 128 and electromagnetic valves 67, 68, 119, 120, 121, 122 and 123 through passages 145 and 147, and fluid after lubricating lubricated section 159 and clutches 58 and 59 (hydraulic cylinders 71 and 72) fall down along the inside wall surface of transmission casing 8, and are collected into the fluid sump in chamber 162 through only opening 169.

Further, a drain port 164 provided with a strainer is opened at a side wall of fluid sump chamber 162 in transmission casing 8, and connected to pump 213 through a pipe 165. Pump 213 is connected through a pipe 166 to an inlet 201a provided at a top portion of tank 201. Tank 201 is provided at a bottom portion thereof with an outwardly (downward) opened outlet 201b covered with an oil filter 220 disposed inside tank 201. Outlet 201b is connected to pump 214 through a pipe 167. Pump 214 is connected through passages 154 and 155 to various hydraulic devices such as hydraulic cylinders 71, 72, 126, 127, 128 and electromagnetic valves 67, 68, 119, 120, 121, 122 and 123.

Due to this structure, during traveling of vehicle 1, pump 213 sucks fluid from the fluid sump in chamber 162, so as to forcibly drain the fluid through passage 166 into tank 201 disposed outside transmission casing 8. Therefore, even while engine 5 is driven for traveling of vehicle 1, tank 201 absorbs fluid from the inside of transmission casing 8 so as to keep a level of fluid surface 163 in transmission casing 8 lower than the lowest end of considerably high-speed rotated gears of multi-speed transmission 19. Pump 214 absorbs fluid from tank 201 through passage 167, and supplies the fluid through passages 154 and 155 to multi-speed transmission 19 in transmission casing 8, thereby driving the hydraulic devices and lubricating various components and portions.

In this way, tank 201 is fluidly connected to transmission casing 8 so as to store fluid serving as lube for first and second clutches 58 and 59 and multi-speed transmission 19. Tank 201 absorbs fluid from transmission casing 8 so that the level of fluid in transmission casing 8 becomes lower than a predetermined height during activation of engine 5. Due to such a lowered level of fluid surface 163, power loss caused by resistance of fluid agitated by a high-speed rotating gear is reduced so as to ensure efficient and economic high-speed traveling of vehicle 1.

The fluid stored in tank 201 also serves as hydraulic pressure fluid for hydraulically controlled first and second clutches 58 and shifter shafts 116, 117 and 118, so as to require no additional device for supplying fluid to such hydraulic devices, thereby simplifying vehicle 1.

Here, even while traveling vehicle 1 is laterally tilted by a wrong ground condition, partition 160 prevents the high-speed rotating gears from being submerged into the fluid accumulated in chamber 162 which is tilted laterally following the tilt of vehicle 1, thereby reducing the resistance of fluid against the agitation by the gears. Incidentally, since traveling PTO shaft 56 is rotated slowly, opening 169 is disposed vertically downward ((just below) traveling PTO shaft 56 so that, even if fluid overflows from chamber 162 through opening 169, only slowly rotating traveling PTO shaft 56 is submerged into the overflowing fluid so as to reduce the resistance of fluid against its agitation.

As mentioned above, pumps 213 and 214 are driven together by input shaft 18. Consequently, the quantity of fluid recovered from transmission casing 8 to tank 201 is proportional to the rotary speed of engine 5. Accordingly, even if the rotary speed of engine 5 is increased so as to increase fluid delivered from pump 214 into transmission casing 8, pump 213 increases the quantity of fluid recovered from transmission casing 8 into tank 201.

In this way, the quantity of fluid recovered from transmission casing 8 into tank 201 is increased according to increase of the rotary speed of engine 5, and larger than the quantity of fluid supplied from tank 201 into transmission casing 8 such as to serve as the lube and the hydraulic pressure fluid. Therefore, the level of fluid surface 163 in transmission casing is kept at a predetermined height for satisfactory reduction of power loss by the resistance of fluid against agitation.

Tank 201 is disposed sidewise from transmission casing 8, and a substantially horizontal pipe 168 is extended from a vertically intermediate side wall of tank 201 and opened into transmission casing 8 through an opening 168a above partition 160, so that excessive fluid stored in tank 201 overflows from tank 201 into transmission casing 8 through pipe 168 so as to lubricate gears of multi-speed transmission 19. Pipe 168 is considerably lower than inlet 201a so as to prevent fluid in tank 201 from closing (overflowing from) inlet 201a. Therefore, even if fluid drained from drain port 164 involves much air caused by the lowering of fluid level in transmission casing 8 during traveling of vehicle 1, fluid delivered from pump 213 is necessarily dropped down from inlet 201a to the fluid sump in tank 201, thereby separating the air from the dropped fluid. Consequently, the fluid supplied from tank 201 into transmission casing 8 involves no air so as to properly function as lube and hydraulic pressure fluid for multi-speed transmission 19. Alternatively, tank 201 may be formed in transmission casing 8 by partitioning the inside space of transmission casing 8.

Figure 10:
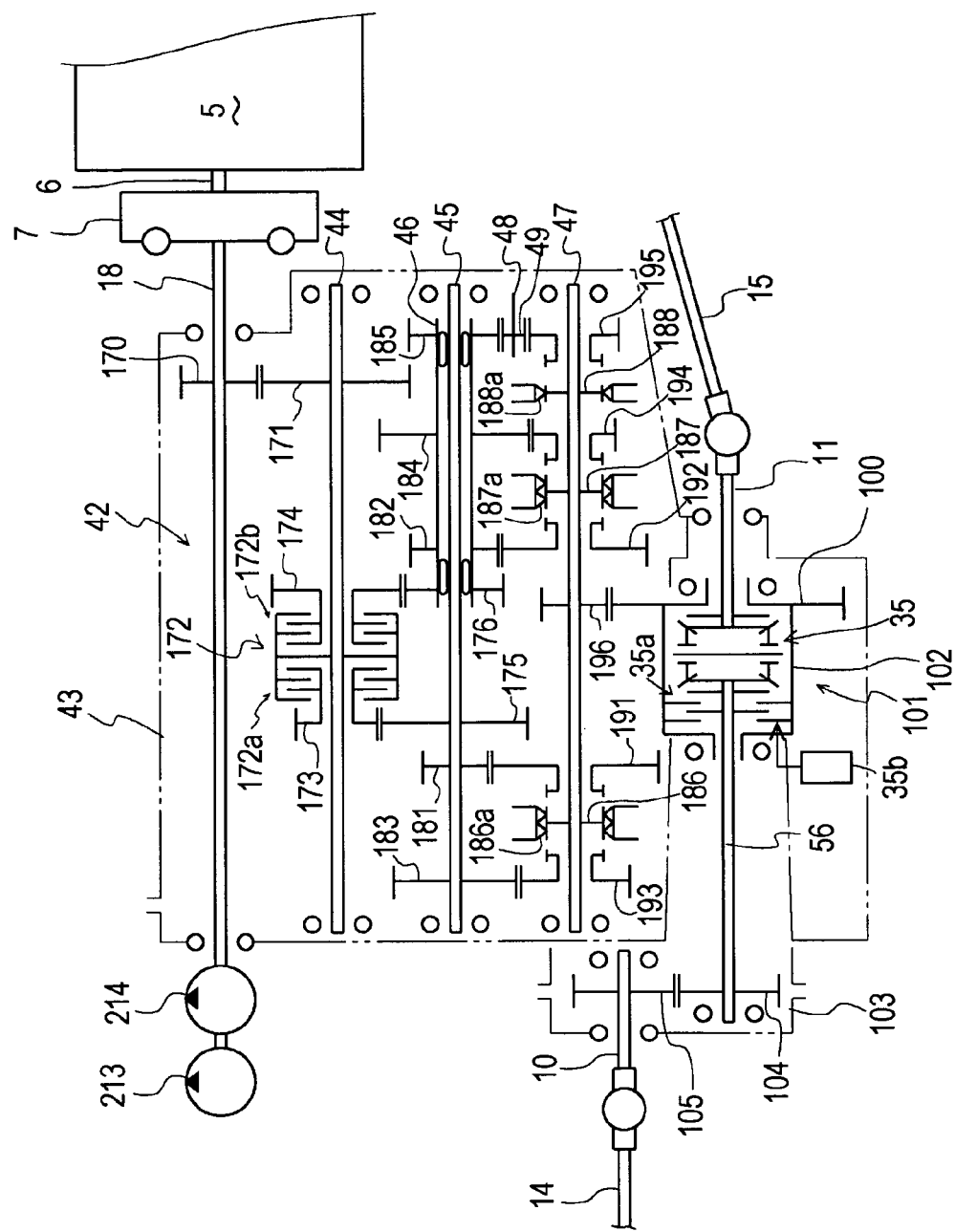
FIG. 10 is a skeleton diagram of an alternative multi-speed transmission according to a second embodiment.

A multi-speed transmission 42 shown in FIG. 10, serving as a second embodiment of the multi-speed transmission, will be described. The same components and portions as those in the first embodiment are designated by the same reference numbers. A transmission casing 43 incorporates multi-speed transmission 42, including input shaft 18, a clutch input shaft 44, a first traveling gearshift shaft 45, a second traveling gearshift shaft 46, a traveling output shaft 47, a counter shaft 48 and traveling PTO shaft 56. Shafts 18, 44, 45, 46, 47, 48 and 56 are disposed in parallel in transmission casing 8 and extended horizontally in the fore-and-aft horizontal direction of vehicle 1.

A gear 170 is fixed on input shaft 18, a gear 171 is fixed on clutch input shaft 44, and gears 170 and 171 constantly mesh with each other so as to transmit power from input shaft 18 to clutch input shaft 44. A first clutch 172a and a second clutch 172b are integrally assembled together so as to constitute a clutch 172 disposed on clutch input shaft 44 in front of gear 171.

A first clutch output gear 173 is relatively rotatably provided on clutch input shaft 44 in front of first clutch 172a. When first clutch 172a is engaged, first clutch output gear 173 is relatively unrotatably engaged with clutch input shaft 44 through engaged first clutch 172a. A second clutch output gear 174 is relatively rotatably provided on clutch input shaft 44 behind second clutch 172b. When second clutch 172b is engaged, second clutch output gear 174 is relatively unrotatably engaged with clutch input shaft 44 through engaged second clutch 172b.

First traveling gearshift shaft 45 is fixedly provided on a front portion thereof with an input gear 175, a first speed normal drive gear 181 disposed in front of input gear 175, and a third speed normal drive gear 183 disposed in front of first speed normal drive gear 181. Gear 175 meshes with first clutch output gear 173 so as to transmit power from clutch input shaft 44 to first traveling gearshift shaft 45 through engaged first clutch 172a.

First traveling gearshift shaft 45 is relatively rotatably provided on a rear portion thereof with a cylindrical second traveling gearshift shaft 46. Second traveling gearshift shaft 46 is fixed thereon with a reverse drive gear 185, a four speed normal drive gear 184 disposed in front of reverse drive gear 185, a second speed normal drive gear 182 disposed in front of fourth speed normal drive gear 184, and an input gear 176 disposed in front of second speed normal drive gear 182. Gear 176 meshes with second clutch output gear 174 so as to transmit power from clutch input shaft 44 to second traveling gearshift shaft 46 through engaged second clutch 172b.

Due to the coaxial arrangement of cylindrical second traveling gearshift shaft 46 on the rear portion of first traveling gearshift shaft 45, the number of transmission shafts of multi-speed transmission 42 is reduced so as to minimize transmission casing 43, thereby lightening and minimizing vehicle 1. Transmission casing 43 is especially vertically minimized (vertically thinned) so as to be easily disposed under cargo 4 without reduction of the ground clearance of vehicle 1 or heightening of vehicle 1.

Traveling output shaft 47 is relatively rotatably provided thereon with a reverse driven gear 195, a fourth speed normal driven gear 194 disposed in front of reverse driven gear 195, a second speed normal driven gear 192 disposed in front of fourth speed normal driven gear 194, a first speed normal driven gear 191 disposed in front of second normal driven gear 192, and a third speed normal driven gear 193 disposed in front of first speed normal driven gear 191. First and third speed normal driven gears 191 and 193 mesh with respective first and third speed normal drive gears 181 and 183 fixed on first traveling gearshift shaft 45. Second and fourth speed normal driven gears 192 and 194 mesh with respective second and fourth speed normal drive gears 182 and 184 fixed on second traveling gearshift shaft 46. Counter shaft 48 is extended in the fore-and-aft direction of vehicle 1 between second traveling gearshift shaft 46 and traveling output shaft 47, and an idle gear 49 is provided on counter shaft 48 so as to mesh with reverse drive and driven gears 185 and 195.

In this way, gears 181 and 191 constitute a first speed normal (forward traveling) gear train, gears 182 and 192 constitute a second speed normal (forward traveling) gear train, gears 183 and 193 constitute a third speed normal (forward traveling) gear train, gears 184 and 194 constitute a fourth speed normal (forward traveling) gear train, and gears 185, 49 and 195 constitute a reverse (backward traveling) gear train.

Traveling output shaft 47 is relatively unrotatably fitted thereon with a splined hub 186 disposed between first and third speed normal driven gears 191 and 193, a splined hub 187 disposed between second and fourth speed normal driven gears 192 and 194, and a splined hub 188 disposed in front of reverse driven gear 195 and behind fourth speed normal driven gear 194. Shifters 186a, 187a and 188a are axially slidably and relatively unrotatably fitted on respective splined hubs 186, 187 and 188.

The same shifter control mechanism as the above is provided for selectively engage any of shifters 186a, 187a and 188a with any of driven gear 191, 192, 193, 194 and 195, so as to relatively unrotatably connect the corresponding driven gear 191, 192, 193, 194 or 195 to traveling output shaft 47, thereby transmitting the rotary force of first or second traveling gearshift shaft 45 or 46 to traveling output shaft 47 through the selected gear train.

During the clutch-shift between first and second clutches 172a and 172b, both the first speed normal gear train and the reverse gear train can be simultaneously drivingly connected to traveling output shaft 47 because the first speed normal gear train, i.e., gears 181 and 191, is essentially connected to first clutch 172a, and the reverse gear train, i.e., gears 185, 49 and 195, is essentially connected to second clutch 172b.

In other words, before starting vehicle 1, the reverse (backward traveling) gear train can be drivingly connected to traveling output shaft 47 while one of the first and third speed normal (forward traveling) gear trains is drivingly connected to traveling output shaft 47. In this precondition, one of clutches 172a and 172b is selectively engaged so as to drivingly connect either the reverse (backward traveling) gear train or the one of the first and third speed normal (forward traveling) gear train to corresponding traveling gearshift shaft 45 or 46. Namely, first and second clutches 172a and 172b serve as a start-up clutch to be engaged for the starting of vehicle 1. When second clutch 172b is engaged, vehicle 1 starts backward traveling. When first clutch 172a is engaged, vehicle 1 starts forward traveling at the first or third speed.

Multi-speed transmission 42 is advantageous for vehicle 1 traveling for work requiring frequent change of traveling direction between forward and backward, because it requires only the easy clutch-shift between first and second clutches 172a and 172b for changing the traveling direction of vehicle 1.

Referring to FIGS. 11 to 24, some clutch amendment control patterns based on some parameters (especially, a tilt angle of vehicle 1 and a weight of vehicle 1 (i.e., weight of load on vehicle 1)) for the multi-speed transmission will be described.

Figure 3:
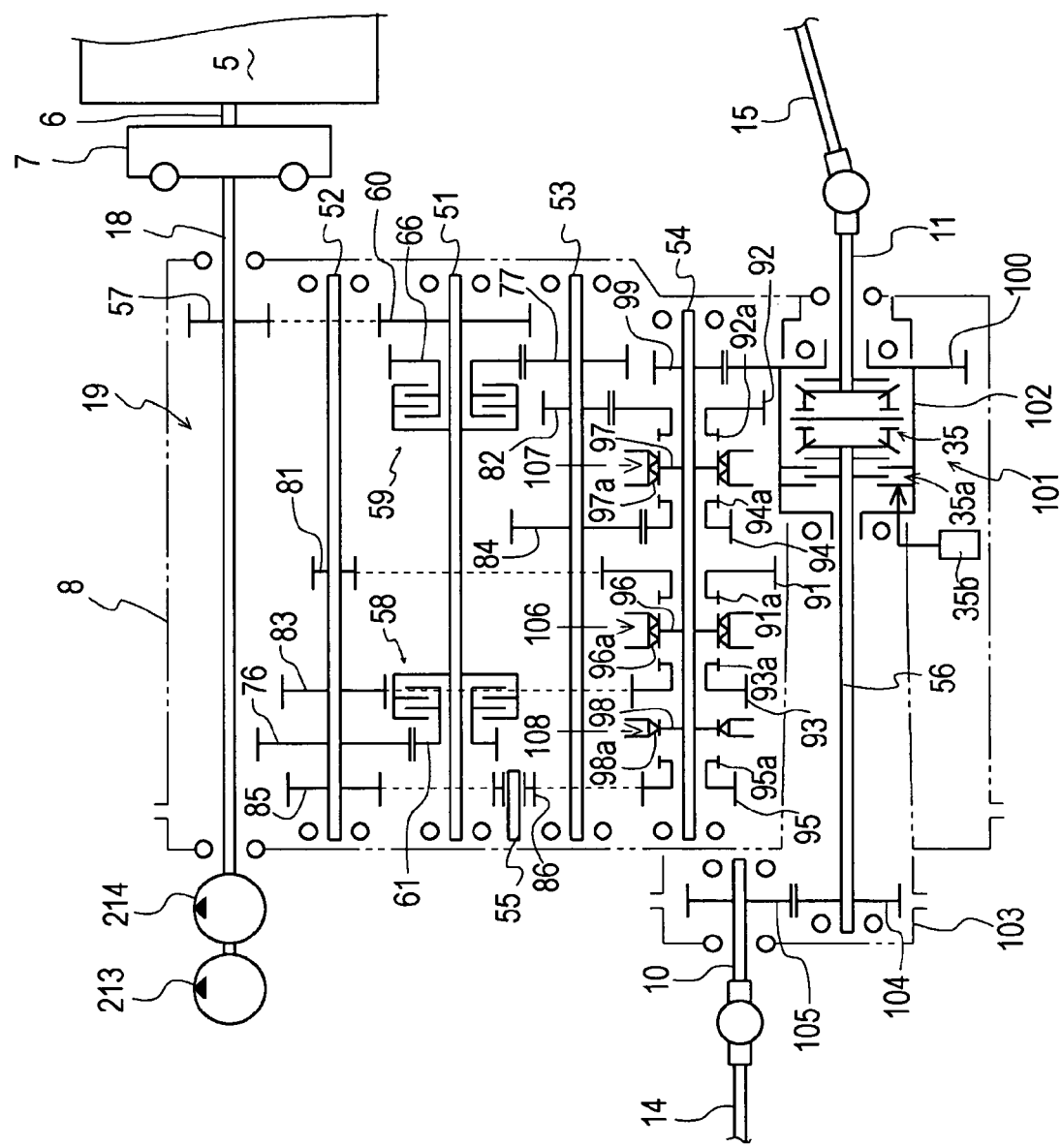
FIG. 3 is a skeleton diagram of a multi-speed transmission according to the first embodiment.

Detailed description of a basic structure of multi-speed transmission 19 adapted to the following control patterns will be omitted because it is the same as that best shown in FIG. 3. Basically, multi-speed transmission 19 includes the first clutch for the odd-numbered (i.e., first and third) speed gear trains and the second clutch for the even-numbered (i.e., second and fourth) speed gear trains. Description of a hydraulic circuit structure adapted to the following control patterns will also be omitted because it is the same as that shown in FIG. 6. The following control patterns can be provided for multi-speed transmission 42 shown in FIG. 10 as far as it is adaptable.

Figure 11:
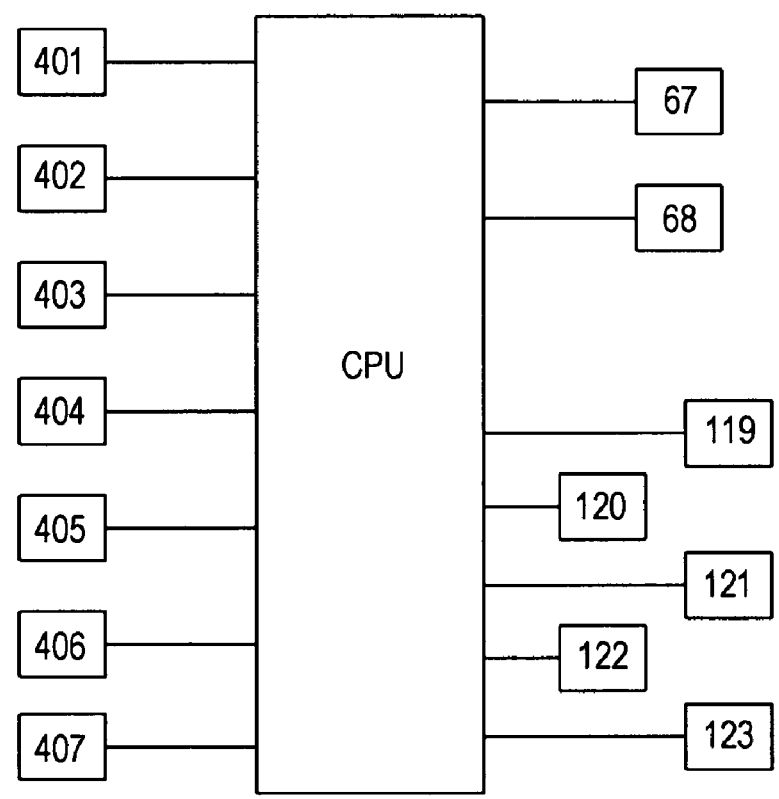
FIG. 11 is a block diagram of a control system for controlling clutches of the multi-speed transmission.

A control system for controlling the clutches will be described with reference to FIG. 11. With respect to parameters for controlling the clutches, inputted engine rotary speed detection means 401, such as an accelerator pedal angle sensor or a throttle valve opening sensor, issues a detection signal of inputted (set) engine rotary speed (or throttle valve opening degree). Outputted engine rotary speed detection means 402 issues a detection signal of engine output rotary speed (actual engine rotary speed). Accelerator pedal depression speed detection means 403 issues a detection signal of depression speed of the accelerator pedal. Engine load (axle torque) detection means 404 issues a detection signal of engine load (axle torque). Vehicle tilt angle detection means 405 issues a detection signal of tilt angle of vehicle 1. Vehicle weight detection means 406 issues a detection signal of weight of vehicle 1 (i.e., weight of load on vehicle 1). Brake pedal depression detection means 407 issues a detection signal about whether a brake pedal is depressed or not. These detection signals are inputted into a CPU. The CPU determines a timing for shifting the clutches among other things based on the detection signals, and issues command signals to electromagnetic valves 119, 120, 121, 122 and 123 for controlling shifters 96a, 97a and 98a, and to electromagnetic valves 67 and 68 for the respective first and second clutches.

Vehicle 1 is provided with detection means 401 to 407, including a vehicle tilt sensor for detecting a tilt angle of vehicle 1 in the traveling direction thereof, serving as vehicle tilt angle detection means 405, and a vehicle weight sensor for detecting a weight of load on vehicle 1, serving as vehicle weight detection means 406. At least one of the vehicle tilt angle sensor and the vehicle weight sensor may be assembled into multi-speed transmission 19 (or 42).

Control of a gearshift clutch (first clutch 58 or second clutch 59) serving as a start-up clutch to be engaged for starring of vehicle 1 will be described with reference to FIGS. 12 to 17. To start vehicle 1, a series of operations for starting vehicle 1: previous depression of the brake pedal; engine-starting operation such as switching on of an ignition key; and releasing of the depressed brake pedal, are performed. The following clutch control is directed to control of the start-up clutch (and depression of the accelerator pedal) to be engaged in association with the releasing of the brake pedal.

A start-up clutch control shown in FIGS. 12 and 13 based on detection of vehicle tilt angle will be described. A clutch pressure increasing pattern is changed on the basis of detection of a vehicle tilt angle by the vehicle tilt angle sensor. Therefore, whether the ground is sloped or not (whether vehicle 1 ascends or descends a slope), vehicle 1 surely creeps on its traveling start, and the vehicle traveling speed change in reply to accelerator operation is kept substantially constant.

Figure 12:
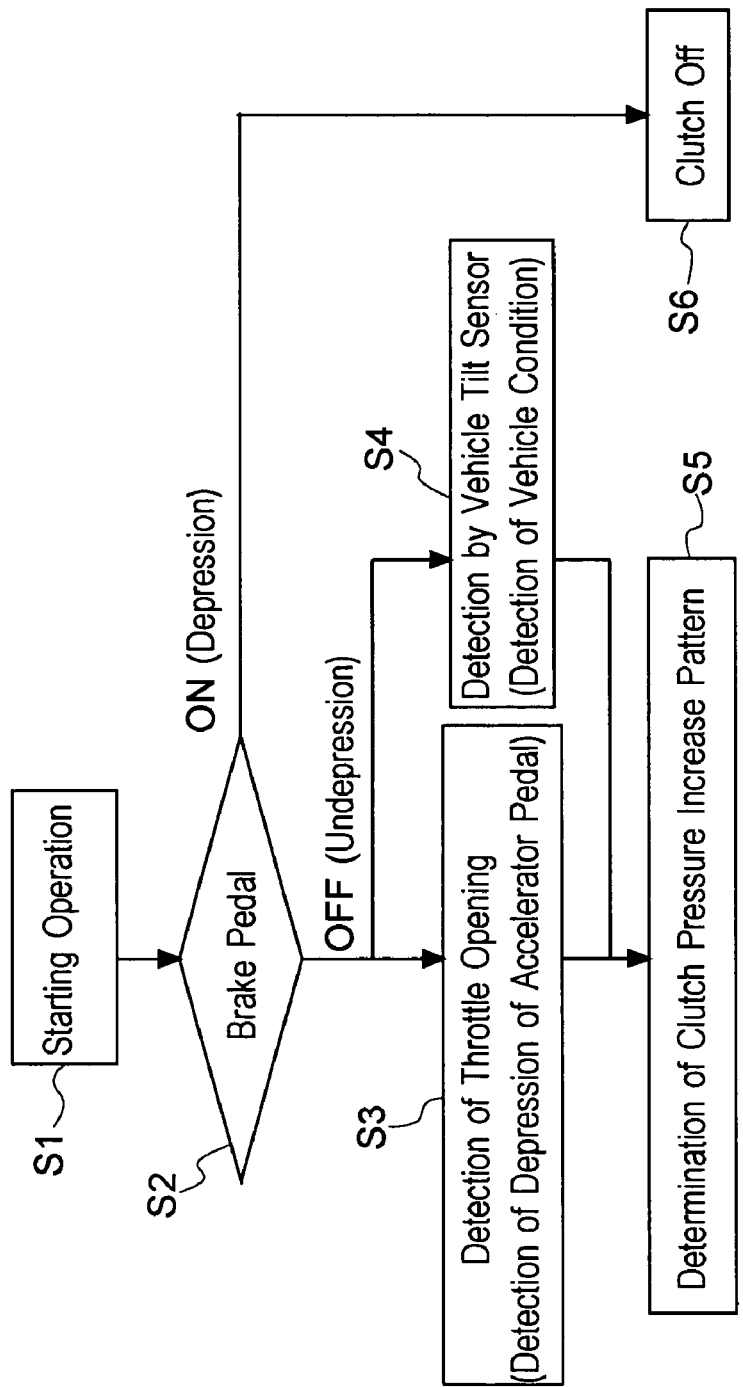
FIG. 12 is a flow chart for determining an increasing pattern of clutch pressure for start of the vehicle depending on detection by a tilt sensor.

As shown in FIG. 12, when an operation for starting vehicle 1, such as switching on of an ignition key switch, is performed (at a step S1), brake pedal depression detection means 407 detects whether the brake pedal is depressed or not (at a step S2). While depression of the brake pedal is detected, disengagement of the start-up clutch is kept (at a step S6) so as to prevent start of vehicle 1. If release of the depressed brake pedal is detected, detection signals from the throttle valve opening sensor and the vehicle tilt angle sensor are determined (at steps S3 and S4) so as to determine a clutch pressure condition of the start-up clutch (at a step S5).

Figure 13:
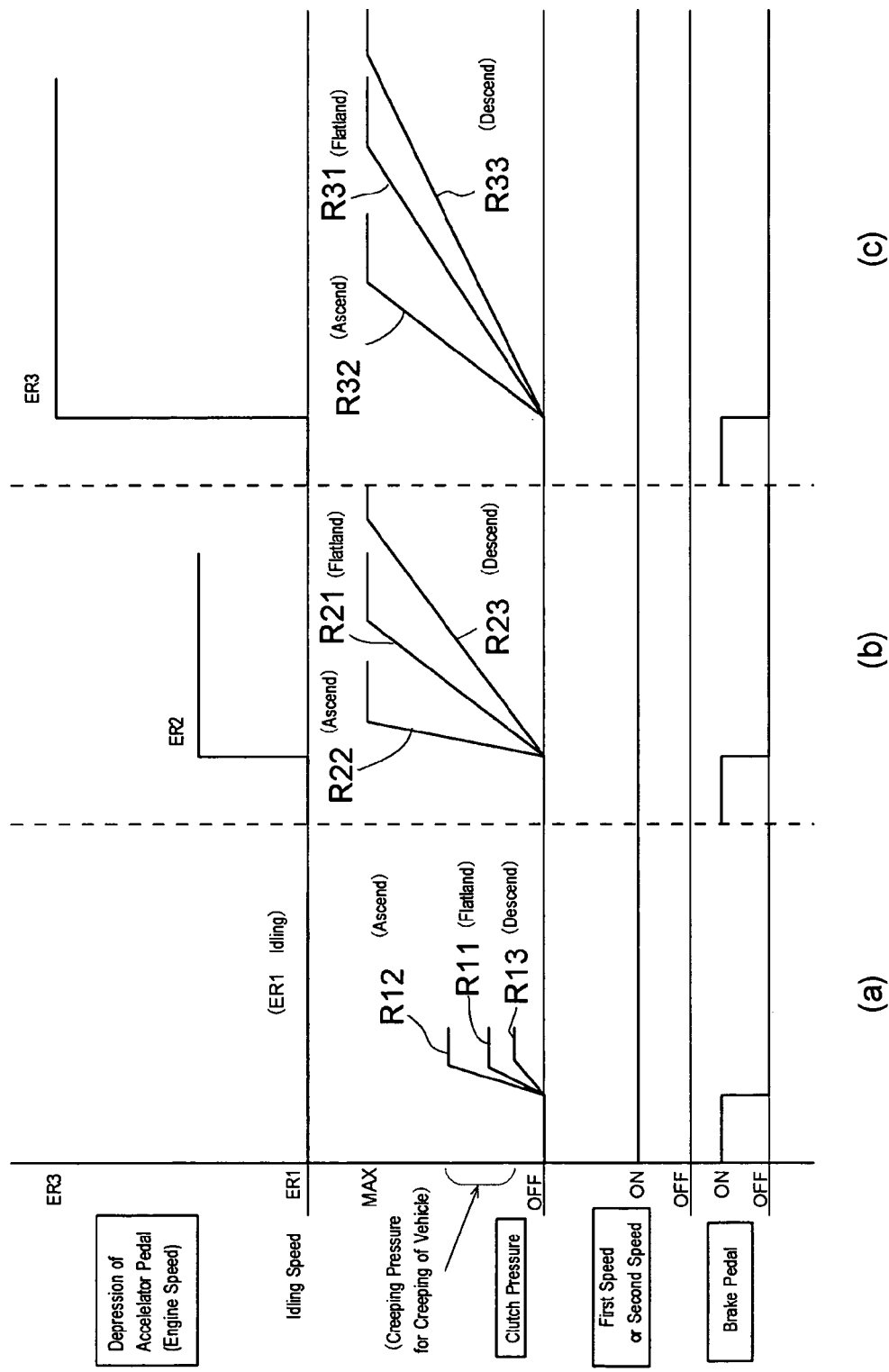
FIG. 13 is a timing chart for the starting of the vehicle depending on the detection by the tilt sensor.

FIG. 13 illustrates a simultaneous time chart of depression variation of the accelerator pedal, clutch pressure variation of the start-up clutch, selection of speed level, and depression variation of the brake pedal according to the control flow of FIG. 12. Three patterns shown respectively in FIGS. 13(*a*), 13(*b*) and 13(*c*) are classified by difference of depression of the accelerator pedal after the detection of the releasing of the depressed brake pedal.

FIG. 13(*a*) illustrates patterns of increase of clutch pressure of the start-up clutch without depression of the accelerator pedal after the depressed brake pedal in stationary vehicle 1 is released. An idling engine rotary speed ER1 is kept, and either the first or second forward traveling speed is preset, i.e., either the first or second normal driven gear 91 or 92 is previously drivingly connected to traveling output shaft through corresponding shifter 96a or 97a. If the first forward traveling speed is preset, first clutch 58 serves as the start-up clutch to be engaged for starting of vehicle 1. If the second forward traveling speed is preset, second clutch 59 serves as the start-up clutch to be engaged for starting of vehicle 1. While the brake pedal is depressed, the clutch pressure of the start-up clutch is zero, i.e., the start-up clutch is disengaged.

A clutch pressure increase pattern R11 of the start-up clutch is established when vehicle 1 starts traveling on a flatland. The clutch pressure of the start-up clutch starts rising immediately after the release of the depressed brake pedal. Then, the clutch pressure reaches a predetermined creeping pressure for ensuring the creepage of vehicle 1, and afterward, the creeping pressure is kept so that vehicle 1 creeps on a flatland.

A clutch pressure increase pattern R12 of the start-up clutch is established when the vehicle tilt angle sensor detects that vehicle 1 is on an ascending slope. An inclination of pattern R12 is steeper than that of pattern R11, i.e., the increase of clutch pressure according to pattern R12 while vehicle 1 ascends a slope is quicker than that according to pattern R11 while vehicle 1 travels on a flatland. In pattern R12, the increased clutch pressure reaches a creeping pressure predetermined to be larger than the creeping pressure in pattern R11 for traveling on a flatland, and afterward, the larger creeping pressure is kept while vehicle 1 ascends a slope.

A clutch pressure increase pattern R13 of the start-up clutch is established when the vehicle tilt angle sensor detects that vehicle 1 is on a descending slope. An inclination of pattern R13 is gentler than that of pattern R11, i.e., the increase of clutch pressure according to pattern R13 while vehicle 1 descends a slope is slower than that according to pattern R11 while vehicle 1 travels on a flatland. In pattern R13, the increased clutch pressure reaches a creeping pressure predetermined to be smaller than the creeping pressure in pattern R11 for traveling on a flatland, and afterward, the smaller creeping pressure is kept while vehicle 1 descends a slope.

FIG. 13(b) illustrates patterns of increase of clutch pressure of the start-up clutch when the accelerator pedal is depressed so as to establish an engine rotary speed ER2 (e.g., 2300 rpm) immediately after the depressed brake pedal in stationary vehicle 1 is released. Each of patterns R21, R22 and R23 indicates that the increased clutch pressure reaches a fixed maximum (proper) clutch pressure of the start-up clutch beyond the larger creeping pressure. An inclination of clutch pressure increase pattern R22 for ascending a slope is steeper than that of clutch pressure increase pattern R21 for traveling on a flatland, and an inclination of clutch pressure increase pattern R23 for descending a slope is gentler than that of clutch pressure increase pattern R21 for traveling on a flatland. Consequently, the increase of clutch pressure according to pattern R22 while vehicle 1 ascends a slope is quicker than that according to pattern R21 while vehicle 1 travels on a flatland, and the increase of clutch pressure according to pattern R23 while vehicle 1 descends a slope is slower than that according to pattern R21 while vehicle 1 travels on a flatland.

FIG. 13(c) illustrates patterns of increase of clutch pressure of the start-up clutch when the accelerator pedal is depressed so as to establish an engine rotary speed ER3 (e.g., 3600 rpm) larger than engine rotary speed ER2 immediately after the depressed brake pedal in stationary vehicle 1 is released. Each of patterns R31, R32 and R33 indicates that the increased clutch pressure reaches the maximum clutch pressure of the start-up clutch. An inclination of each of clutch pressure increase patterns R31, R32 and R33 for getting engine rotary speed ER3 is gentler than that of each of clutch pressure increase patterns R21, R22 and R23 for getting lower engine rotary speed ER2. Consequently, the higher the set engine rotary speed on starting of vehicle 1 is, the slower the increase of clutch pressure of the start-up clutch becomes, so as to prevent unexpectedly sudden acceleration of vehicle 1.

Strictly referring to the depression of the accelerator pedal, the control patterns of FIG. 13(b) are established by a momentary small depression immediately after releasing of the brake pedal, and the control patterns of FIG. 13(c) are established by a momentary large depression immediately after releasing of the brake pedal. More strictly, the momentary small and large depressions are referred to as small and large depression degrees of the accelerator pedal for the same period. In this regard, the difference between the patterns of FIG. 13(a) and the patterns of FIG. 13(b) can be also associated with the difference of depression speed of the accelerator pedal. Therefore, the recognition of the throttle valve opening degree at step S3 may be replaced with recognition of depression speed of the accelerator pedal. The same can be told about a later-discussed control shown in FIGS. 14 and 15 and a later-discussed control shown in FIGS. 16 and 17.

A start-up clutch control shown in FIGS. 14 and 15 based on detection of vehicle weight will be described. A clutch pressure increasing pattern is changed on the basis of detection of a vehicle weight by the vehicle weight sensor. Therefore, even if vehicle 1 is heavily loaded, vehicle 1 surely creeps on its traveling start, and the vehicle traveling speed change in reply to accelerator operation is kept substantially the same as that when vehicle 1 is light-loaded.

Figure 14:
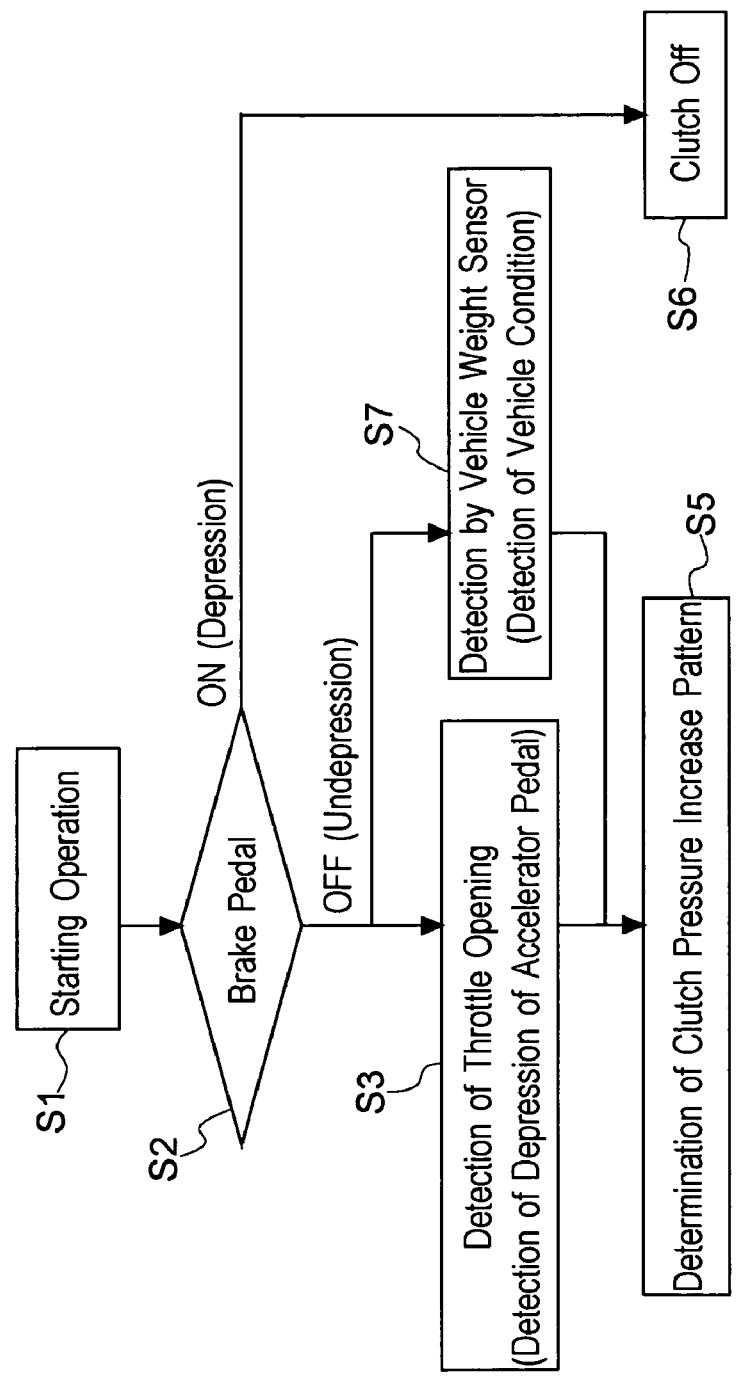
FIG. 14 is a flow chart for determining an increasing pattern of clutch pressure for the starting of the vehicle depending on detection by a weight sensor.

As shown in FIG. 14, when an operation for starting vehicle 1, such as switching on of an ignition key switch, is performed (at a step S1), brake pedal depression detection means 407 detects whether the brake pedal is depressed or not (at a step S2). While depression of the brake pedal is detected, disengagement of the start-up clutch is kept (at a step S6) so as to prevent start of vehicle 1. If release of the depressed brake pedal is detected, detection signals from the throttle valve opening sensor and the vehicle weight sensor are determined (at steps S3 and S7) so as to determine a clutch pressure condition of the start-up clutch (at a step S5).

Figure 15:
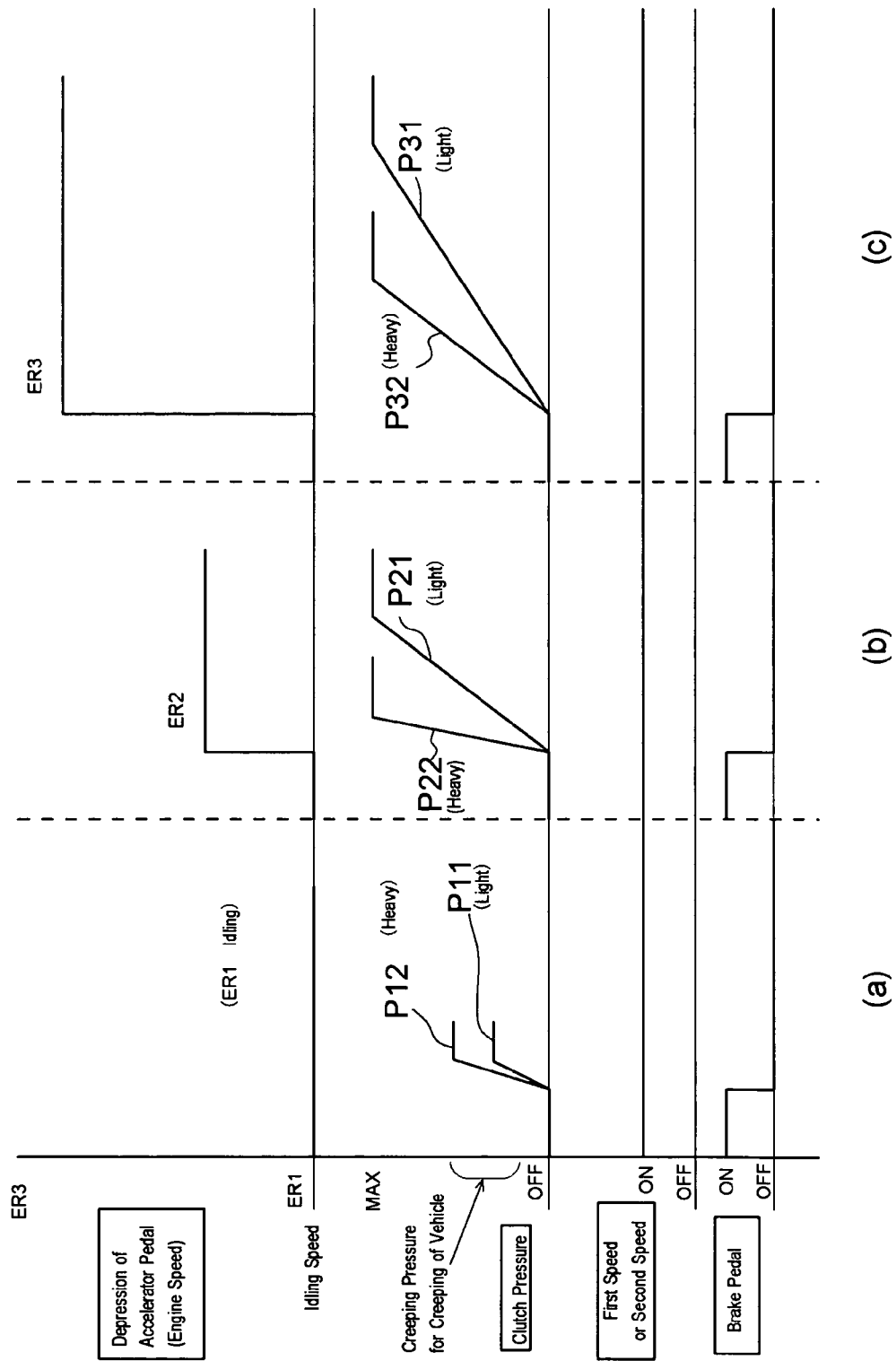
FIG. 15 is a timing chart for the starting of the vehicle depending on the detection by the vehicle sensor.

FIG. 15 illustrates a simultaneous time chart of depression variation of the accelerator pedal, clutch pressure variation of the start-up clutch, selection of speed level, and depression variation of the brake pedal according to the control flow of FIG. 14. Three patterns shown respectively in FIGS. 15(a), 15(b) and 15(c) are classified by the difference of depression of the accelerator pedal after the detection of the releasing of the depressed brake pedal.

FIG. 15(a) illustrates patterns of increase of clutch pressure of the start-up clutch without depression of the accelerator pedal after the depressed brake pedal in stationary vehicle 1 is released. An idling engine rotary speed ER1 is kept, and either the first or second forward traveling speed is preset, i.e., either the first or second normal driven gear 91 or 92 is previously drivingly connected to traveling output shaft through corresponding shifter 96a or 97a. If the first forward traveling speed is preset, first clutch 58 serves as the start-up clutch to be engaged for starting of vehicle 1. If the second forward traveling speed is preset, second clutch 59 serves as the start-up clutch to be engaged for starting of vehicle 1. While the brake pedal is depressed, the clutch pressure of the start-up clutch is zero, i.e., the start-up clutch is disengaged.

A clutch pressure increase pattern P11 of the start-up clutch is established when light-weighed (light-loaded) vehicle 1 starts traveling. The clutch pressure of the start-up clutch starts rising immediately after the release of the depressed brake pedal. Then, the clutch pressure reaches a predetermined creeping pressure for ensuring the creepage of vehicle 1, and afterward, the creeping pressure is kept so that light-loaded vehicle 1 creeps.

A clutch pressure increase pattern P12 of the start-up clutch is established when the vehicle weight sensor detects that a weight of vehicle 1 is large (i.e., vehicle 1 is heavily weighed (loaded)). An inclination of pattern P12 is steeper than that of pattern P11, i.e., the increase of clutch pressure according to pattern P12 when heavy-loaded vehicle 1 starts is quicker than that according to pattern P11 when light-loaded vehicle 1 starts. In pattern P12, the increased clutch pressure reaches a creeping pressure predetermined to be larger than the creeping pressure in pattern P11 for starting of light-loaded vehicle 1, and afterward, the larger creeping pressure is kept while heavy-loaded vehicle 1 creeps.

FIG. 15(b) illustrates patterns of increase of clutch pressure of the start-up clutch when the accelerator pedal is depressed so as to establish an engine rotary speed ER2 (e.g., 2300 rpm) immediately after the depressed brake pedal in stationary vehicle 1 is released. Each of patterns P21 and P22 indicates that the increased clutch pressure reaches a fixed maximum (proper) clutch pressure of the start-up clutch beyond the larger creeping pressure. An inclination of clutch pressure increase pattern P22 for heavy-loaded vehicle 1 is steeper than that of clutch pressure increase pattern P21 for light-loaded vehicle 1. Consequently, the increase of clutch pressure according to pattern P22 when heavy-loaded vehicle 1 starts and accelerates is quicker than that according to pattern P21 when light-loaded vehicle 1 starts and accelerates.

FIG. 15(c) illustrates patterns of increase of clutch pressure of the start-up clutch when the accelerator pedal is depressed so as to establish an engine rotary speed ER3 (e.g., 3600 rpm) larger than engine rotary speed ER2 immediately after the depressed brake pedal in stationary vehicle 1 is released. Each of patterns P31 and P32 indicates that the increased clutch pressure reaches the maximum clutch pressure of the start-up clutch. An inclination of each of clutch pressure increase patterns P31 and R32 for getting engine rotary speed ER3 is gentler than that of each of clutch pressure increase patterns P21 and P22 for getting lower engine rotary speed ER2. Consequently, the higher the set engine rotary speed on starting of vehicle 1 is, the slower the increase of clutch pressure of the start-up clutch becomes, so as to prevent unexpectedly sudden acceleration of vehicle 1.

A start-up clutch control shown in FIGS. 16 and 17 based on detection of vehicle tilt angle and vehicle weight will be described. A clutch pressure increasing pattern is changed on the basis of detection of a vehicle tilt angle by the vehicle tilt angle sensor and detection of a vehicle weight by the vehicle weight sensor. Therefore, whether the ground is sloped or not (whether vehicle 1 ascend or descends a slope), and whether load on vehicle 1 is light or heavy, vehicle 1 surely creeps on its traveling start, and the vehicle traveling speed change in reply to accelerator operation is kept substantially constant.

Figure 16:
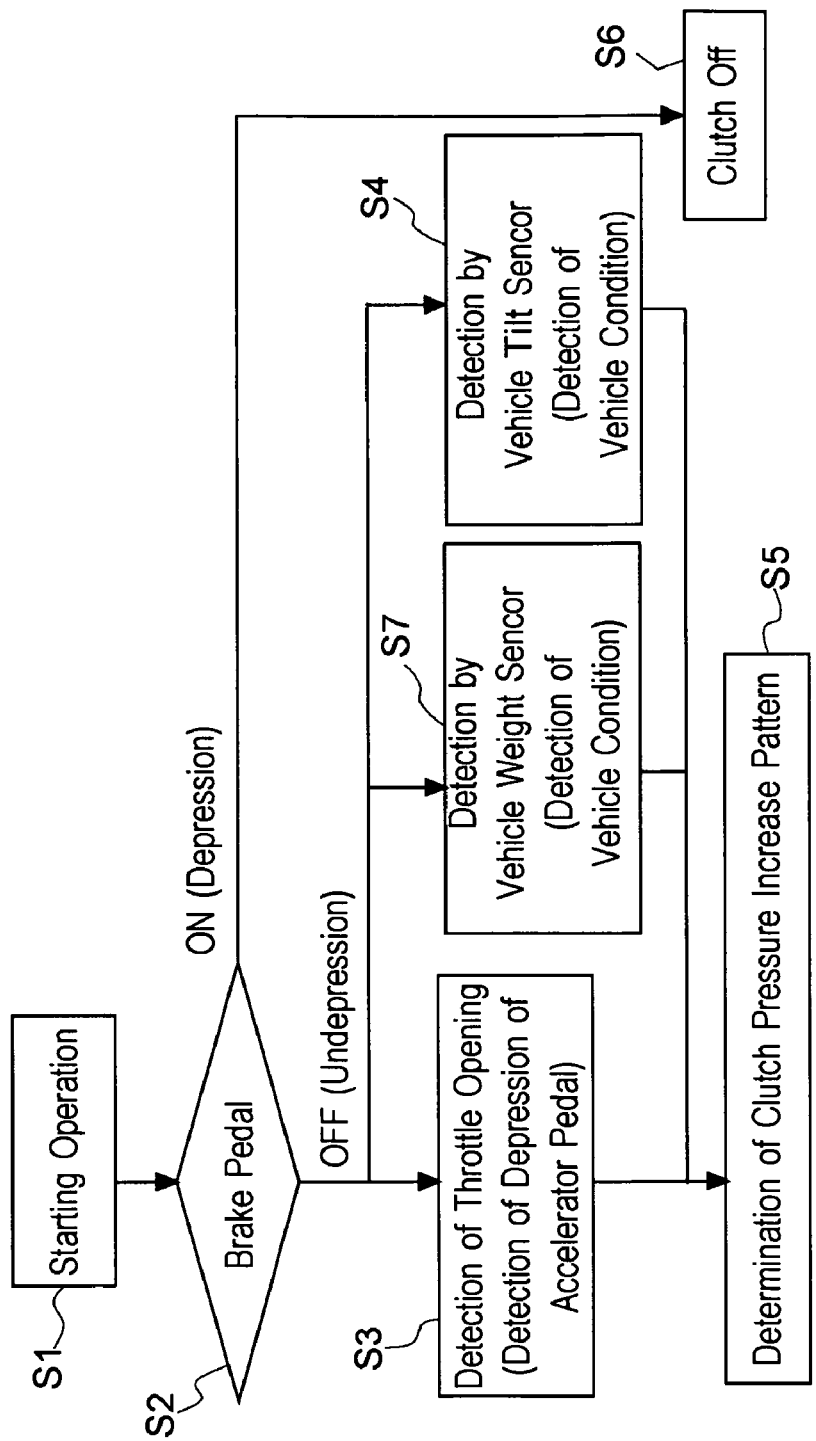
FIG. 16 is a flow chart for determining an increasing pattern of clutch pressure for the starting of the vehicle depending on detection by a tilt sensor and a weight sensor.

As shown in FIG. 16, when an operation for starting vehicle 1, such as switching on of an ignition key switch, is performed (at a step S1), brake pedal depression detection means 407 detects whether the brake pedal is depressed or not (at a step S2). While depression of the brake pedal is detected, disengagement of the start-up clutch is kept (at a step S6) so as to prevent start of vehicle 1. If release of the depressed brake pedal is detected, detection signals from the throttle valve opening sensor, the vehicle tilt angle sensor and the vehicle weight sensor are recognized (at steps S3, S4 and S7) so as to determine a clutch pressure condition of the start-up clutch (at a step S5).

Figure 17:
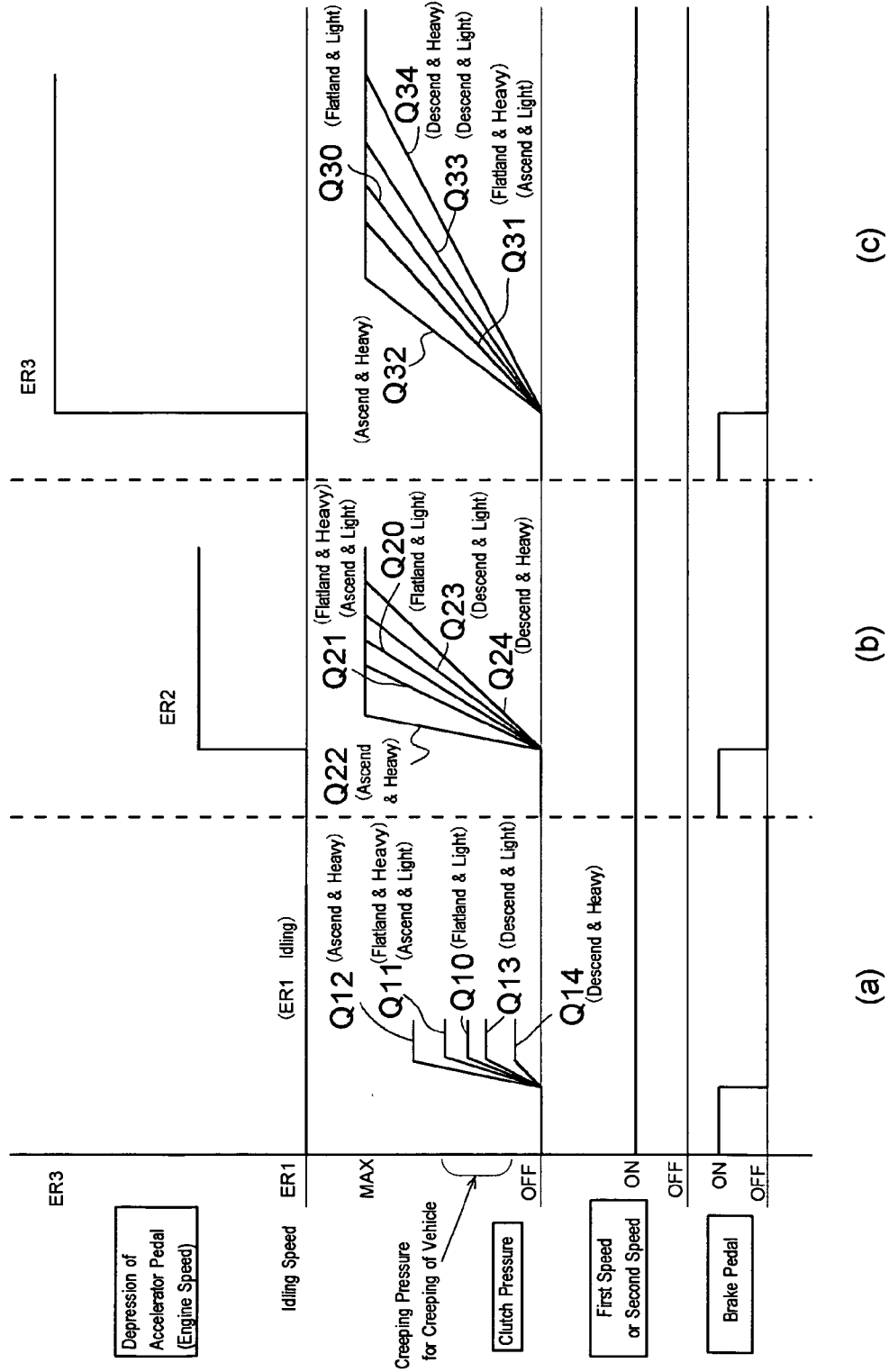
FIG. 17 is a timing chart for the starting of the vehicle depending on the detection by the tilt sensor and the weight sensor.

FIG. 17 illustrates a simultaneous time chart of depression variation of the accelerator pedal, clutch pressure variation of the start-up clutch, selection of speed level, and depression variation of the brake pedal according to the control flow of FIG. 16. Three patterns shown respective FIGS. 17(*a*), 17(*b*) and 17(*c*) are classified by difference of depression of the accelerator pedal after the detection of the releasing of the depressed brake pedal.

FIG. 17(*a*) illustrates patterns of increase of clutch pressure of the start-up clutch without depression of the accelerator pedal after the depressed brake pedal in stationary vehicle 1 is released. An idling engine rotary speed ER1 is kept, and either the first or second forward traveling speed is preset, i.e., either the first or second normal driven gear 91 or 92 is previously drivingly connected to traveling output shaft through corresponding shifter 96*a* or 97*a*. If the first forward traveling speed is preset, first clutch 58 serves as the start-up clutch to be engaged for starting of vehicle 1. If the second forward traveling speed is preset, second clutch 59 serves as the start-up clutch to be engaged for starting of vehicle 1. While the brake pedal is depressed, the clutch pressure of the start-up clutch is zero, i.e., the start-up clutch is disengaged.

A clutch pressure increase pattern Q10 of the start-up clutch is established when light-weighed (light-loaded) vehicle 1 starts traveling on a flatland. The clutch pressure of the start-up clutch starts rising immediately after the release of the depressed brake pedal. Then, the clutch pressure reaches a predetermined creeping pressure for ensuring the creepage of vehicle 1, and afterward, the creeping pressure is kept so that light-loaded vehicle 1 creeps on a flatland.

A clutch pressure increase pattern Q11 of the start-up clutch is established when it is detected that heavy-loaded vehicle 1 is on a flatland or that light-loaded vehicle 1 is on an ascending slope. An inclination of pattern Q11 is steeper than that of pattern Q10, i.e., the increase of clutch pressure according to pattern Q11 while light-loaded vehicle 1 ascends a slope or heavy-loaded vehicle 1 travels on a flatland is quicker than that according to pattern Q10 while light-loaded vehicle 1 travels on a flatland. In pattern Q11, the increased clutch pressure reaches a creeping pressure predetermined to be larger than the creeping pressure in pattern Q10 for traveling on a flatland, and afterward, the larger creeping pressure is kept while light-loaded vehicle 1 ascends a slope or heavy-loaded vehicle 1 travels on a flatland.

A clutch pressure increase pattern Q12 of the start-up clutch is established when it is detected that heavy-loaded vehicle 1 is on an ascending slope. An inclination of pattern Q12 is steeper than that of pattern Q11, i.e., the increase of clutch pressure according to pattern Q12 while heavy-loaded vehicle 1 ascends a slope is quicker than that according to pattern Q11 while light-loaded vehicle 1 ascends a slope or heavy-loaded vehicle 1 travels on a flatland. In pattern Q12, the increased clutch pressure reaches a creeping pressure predetermined to be larger than the creeping pressure in pattern Q11, and afterward, the further larger creeping pressure is kept while heavy-loaded vehicle 1 ascends a slope.

A clutch pressure increase pattern Q13 of the start-up clutch is established when it is detected that light-loaded vehicle 1 is on a descending slope. An inclination of pattern Q13 is gentler than that of pattern Q10, i.e., the increase of clutch pressure according to pattern Q13 while light-loaded vehicle 1 descends a slope is slower than that according to pattern Q10 while light-loaded vehicle 1 travels on a flatland. In pattern Q13, the increased clutch pressure reaches a creeping pressure predetermined to be smaller than the creeping pressure in pattern Q10, and afterward, the smaller creeping pressure is kept while light-loaded vehicle 1 descends a slope.

A clutch pressure increase pattern Q14 of the start-up clutch is established when it is detected that heavy-loaded vehicle 1 is on a descending slope. An inclination of pattern Q14 is gentler than that of pattern Q13, i.e., the increase of clutch pressure according to pattern Q14 while heavy-loaded vehicle 1 descends a slope is slower than that according to pattern Q10 while light-loaded vehicle 1 descends a slope. In pattern Q14, the increased clutch pressure reaches a creeping pressure predetermined to be smaller than the creeping pressure in pattern Q13, and afterward, the further smaller creeping pressure is kept while heavy-loaded vehicle 1 descends a slope.

FIG. 17(*b*) illustrates patterns of increase of clutch pressure of the start-up clutch when the accelerator pedal is depressed so as to establish an engine rotary speed ER2 (e.g., 2300 rpm) immediately after the depressed brake pedal in stationary vehicle 1 is released. Each of patterns Q20, Q21, Q22, Q23 and Q24 indicates that the increased clutch pressure reaches a fixed maximum (proper) clutch pressure of the start-up clutch beyond the further larger creeping pressure. An inclination of clutch pressure increase pattern Q21 for light-loaded vehicle 1 to ascend a slope or for heavy-loaded vehicle 1 to travel on a flatland is steeper than that of clutch pressure increase pattern Q20 for light-loaded vehicle 1 to travel on a flatland, and an inclination of clutch pressure increase pattern Q22 for heavy-loaded vehicle 1 to ascend a slope is steeper than that of clutch pressure increase pattern Q21 for light-loaded vehicle 1 to ascend a slope or for heavy-loaded vehicle 1 to travel on a flatland. An inclination of clutch pressure increase pattern Q23 for light-loaded vehicle 1 to descend a slope is gentler than that of clutch pressure increase pattern Q20 for light-loaded vehicle 1 to travel on a flatland, and an inclination of clutch pressure increase pattern Q24 for heavy-loaded vehicle 1 to descend a slope is gentler than that of clutch pressure increase pattern Q23 for light-loaded vehicle 1 to descend a slope. Consequently, in comparison with the increase of clutch pressure according to pattern Q20 while light-loaded vehicle 1 travels on a flatland, the increase of clutch pressure according to pattern Q21 while heavy-loaded vehicle 1 travels on a flatland or light-loaded vehicle 1 ascends a slope is quicker, and the increase of clutch pressure according to pattern Q22 while heavy-loaded vehicle 1 ascends a slope is further quicker. On the other hand, in comparison with the increase of clutch pressure according to pattern Q20 while light-loaded vehicle 1 travels on a flatland, the increase of clutch pressure according to pattern Q23 while light-loaded vehicle 1 descends a slope is slower, and the increase of clutch pressure according to pattern Q24 while heavy-loaded vehicle 1 descends a slope is further slower.

FIG. 17(c) illustrates patterns of increase of clutch pressure of the start-up clutch when the accelerator pedal is depressed so as to establish an engine rotary speed ER3 (e.g., 3600 rpm) larger than engine rotary speed ER2 immediately after the depressed brake pedal in stationary vehicle 1 is released. Each of patterns Q30, Q31, Q32, Q33 and Q34 indicates that the increased clutch pressure reaches the maximum clutch pressure of the start-up clutch. An inclination of each of clutch pressure increase patterns Q30, Q31, Q32, Q33 and Q34 for getting engine rotary speed ER3 is gentler than that of each of clutch pressure increase patterns Q20, Q21, Q22, Q23 and Q24 for getting lower engine rotary speed ER2. Consequently, the higher the set engine rotary speed on starting of vehicle 1 is, the slower the increase of clutch pressure of the start-up clutch becomes, so as to prevent unexpectedly sudden acceleration of vehicle 1.

Clutch control patterns for gearshift between an odd-numbered speed and an even-numbered speed performed in multi-speed transmission 19 will now be described.

Figure 18:
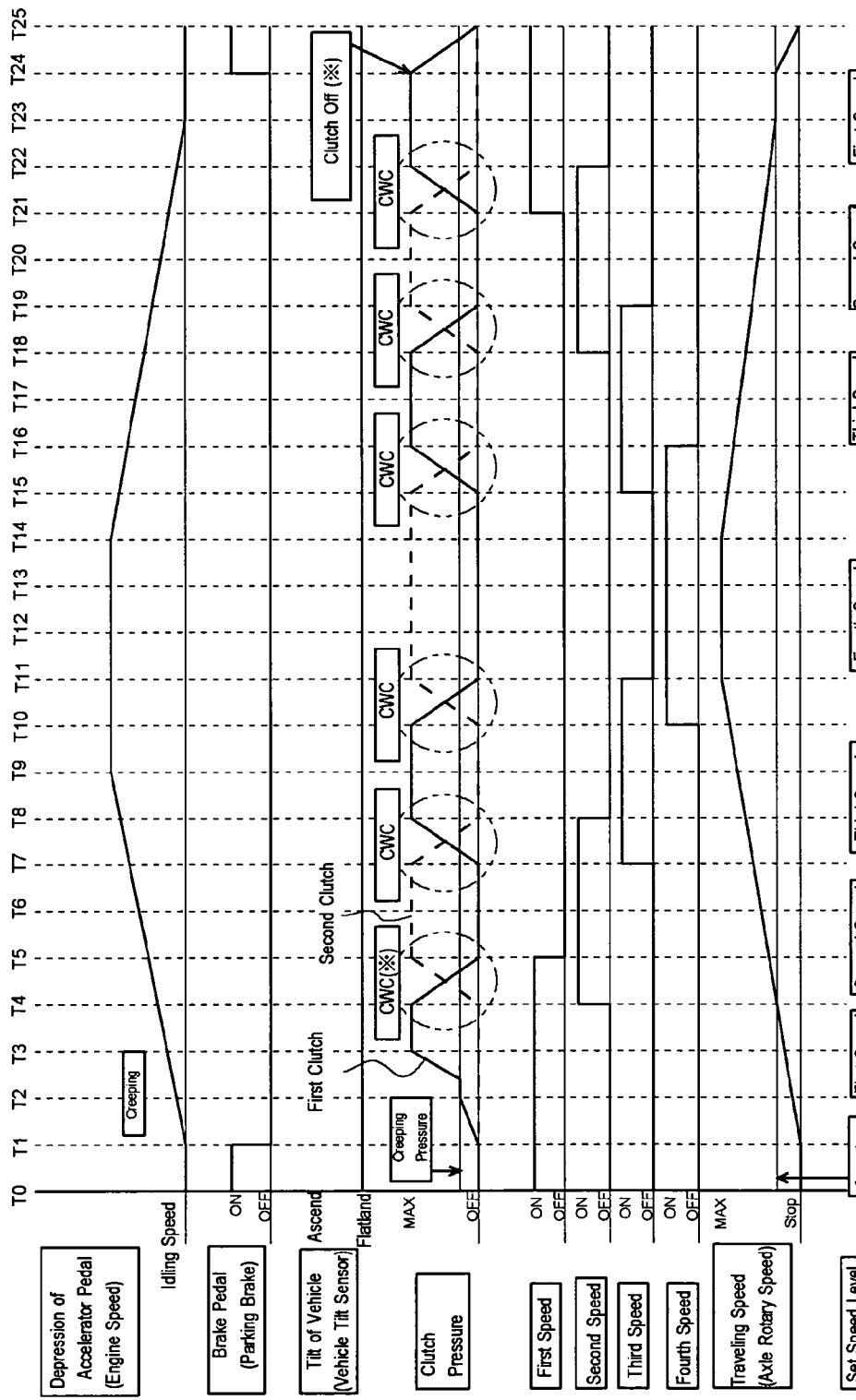
FIG. 18 is a timing chart of clutch control relative to accelerator operation (vehicle speed changing operation).

FIG. 18 is a time chart representing a series of gearshift processes of vehicle 1 traveling on a flatland. During the series of gearshift processes, first, vehicle 1 is stationary with the depressed brake pedal, then, the depressed brake pedal is released and the accelerator pedal is depressed for accelerating vehicle 1, i.e., for shift-up from the first forward traveling speed to the fourth forward traveling speed, and then, the depression of the accelerator pedal is loosened for decelerating vehicle 1, i.e., for shift-down from the fourth speed to the first speed, and finally, the brake pedal is depressed to stop vehicle 1.

The shift-up (increasing the speed level by one) or the shift-down (reducing the speed level by one) is performed according to the above-mentioned gearshift pattern (the map of characteristic curves for gearshift) for vehicle 1 traveling on a flatland as shown in FIG. 8.

The time chart of FIG. 18 will be described. First, a timing TO when vehicle 1 is stationary with the depressed brake pedal is a start point of the time chart.

For a period between timing TO and a timing T2, the above-mentioned operations for starting vehicle 1 (see FIG. 13(a)) are performed so that the clutch pressure of first clutch 58 is increased to the creeping pressure (for ensuring creepage of vehicle 1) while the first speed normal gear train is drivingly connected to traveling output shaft 54. For a period between timing T2 and a timing T3, as the accelerator pedal is depressed (as the throttle valve opening is increased), the clutch pressure of first clutch 58 is kept to be the creeping pressure for a while, and then, the clutch pressure rises again and reaches the maximum clutch pressure. The maximum clutch pressure is kept until a timing T4. The vehicle traveling speed (the rotary speed of axles 25 and 36) is continuously increased between timing T2 and timing T4.

At timing T4, the shift-up signal is issued according to shift-up graph U012 in the map of FIG. 8, so that the disengagement of first clutch 58 and the engagement of second clutch 59 overlap each other (i.e., the cross wave control is performed), thereby performing shift-up from the first speed to the second speed. Between timing T4 and a timing T5, the shift-up from the first speed to the second speed is performed by the cross wave control of first and second clutches 58 and 59 according to shift-up graph U012 in the map of FIG. 8.

Afterward, the vehicle traveling speed is further increased according to increase of the depression of the accelerator pedal (or the throttle vale opening degree). Between a timing T7 and a timing T8, the shift-up from the second speed to the third speed is performed by the cross wave control of first and second clutches 58 and 59 according to shift-up graph U023 in the map of FIG. 8.

At a timing T9, the depression of the accelerator pedal (or the throttle valve opening degree) reaches the maximum. Afterward, the maximum depression is kept while the vehicle traveling speed is increased. Between a timing T10 and a timing T11, the shift-up from the third speed to the fourth speed is performed by the cross wave control of first and second clutches 58 and 59 according to shift-up graph U034 in the map of FIG. 8. The vehicle traveling speed reaches the maximum at timing T11. Afterward, the maximum speed in the fourth speed level is kept as far as the accelerator pedal is kept at the maximum depression.

At a timing T14, the maximum depression of the accelerator pedal starts being reduced (the throttle valve opening degree starts being reduced) so that the vehicle traveling speed starts being reduced.

At a timing T15, the shift-down signal according to shift-down graph D043 in the map of FIG. 8 is issued so as to perform the cross wave control of the first and second clutches 58 and 59, thereby shifting-down from the fourth speed to the third speed.

Afterward, the vehicle traveling speed is further reduced according to reduction of the depression of the accelerator pedal (or the throttle vale opening degree). Between a timing T18 and a timing T19, the shift-down from the third speed to the second speed is performed by the cross wave control of first and second clutches 58 and 59 according to shift-down graph D032 in the map of FIG. 8.

Between a timing T21 and a timing T22, the shift-down from the second speed to the first (lowest) speed is performed by the cross wave control of first and second clutches 58 and 59 according to shift-down graph D021 in the map of FIG. 8.

At a timing T23, the depression of the accelerator pedal (or the throttle valve opening degree) reaches zero, so that the vehicle traveling speed reaches the creeping speed. At a timing T24, the brake pedal is depressed, and engaged clutch 58 (for the first speed) is disengaged so as to further reduce the vehicle traveling speed. At a timing T25, vehicle 1 completely stops.

The above-mentioned gearshift clutch control of vehicle 1 traveling on a flatland based on the timing chart of FIG. 18 and the map of FIG. 8 is amended as follows according to detection of a vehicle tilt condition and/or detection of a vehicle weight (load) condition.

An amended gearshift clutch control based on detection of a vehicle tilt condition will be described. In this regard, the vehicle tilt angle sensor (i.e., vehicle tilt angle detection means 405) constantly detects a tilt angle of vehicle 1 in the forward or backward traveling direction thereof, and the gearshift patterns are changed based on the detected tilt angle.

Figure 19:
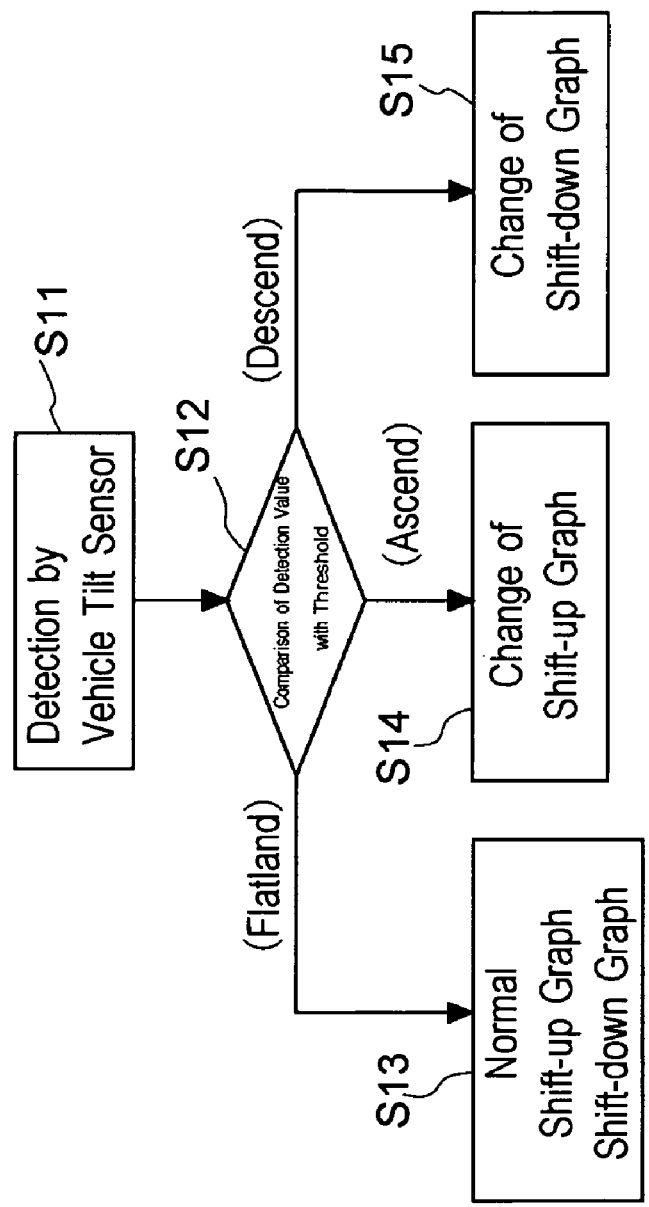
FIG. 19 is a flow chart for changing a gearshift pattern depending on detection by a tilt sensor.

As shown in FIG. 19, the vehicle tilt angle sensor detects a tilt angle of vehicle 1 in the forward or backward traveling direction (at a step S11), and the detected angle is compared with a predetermined tilt angle (at a step S12). As a result of the comparison, if vehicle 1 is determined to travel on a flatland, the normal shift-up and shift-down patterns (graphs in the map of FIG. 8) are maintained (at a step S13). If vehicle 1 is determined to ascend a slope, the normal shift-up patterns are automatically changed into amended shift-up patterns for recovery of lost traveling speed (at a step S14). If vehicle 1 is determined to descend a slope, the normal shift-down patterns are automatically changed into amended shift-down patterns for effecting engine braking (at a step S15).

Figure 20:
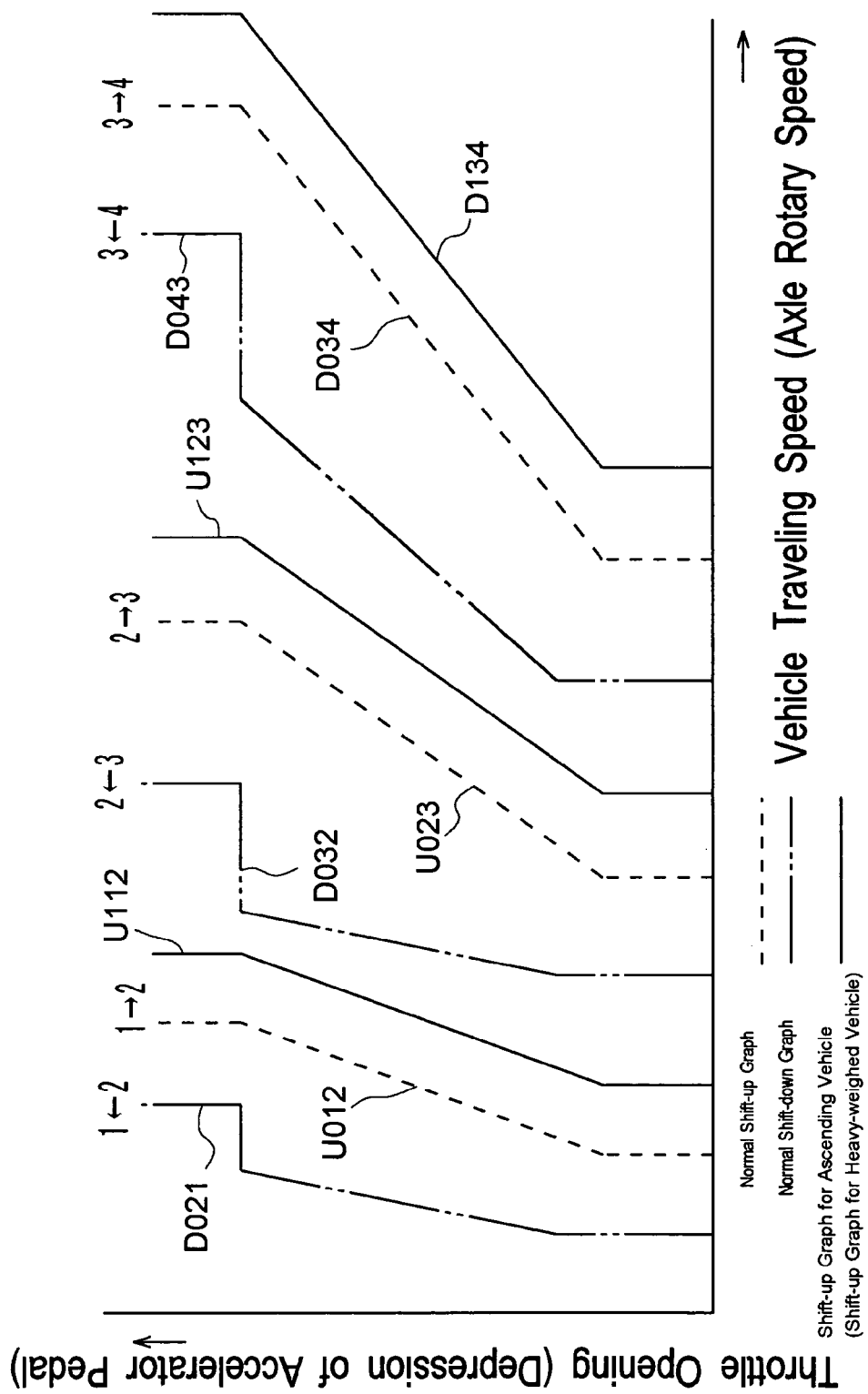
FIG. 20 is a map of characteristic curves showing change of a shift-up curve for the starting of the vehicle ascending a slope.

The amendment of shift-up patterns for vehicle 1 ascending a slope will be described with reference to FIG. 20. In FIG. 20, normal shift-up graphs U012 (first-to-second speed shift-up), U023 (second-to-third speed shift-up) and U034 (third-to-fourth speed shift-up) are the same as those in FIG. 8 adapted for vehicle 1 traveling on a flatland, and amended shift-up graphs U112 (first-to-second speed shift-up), U123 (second-to-third speed shift-up) and U134 (third-to-fourth speed shift-up) are adapted for vehicle 1 ascending a slope. When vehicle 1 ascends a slope, the normal shift-up graphs are changed into the amended shift-up graphs disposed rightward from the respective normal shift-up graphs in FIG. 20. In other words, each amended shift-up replies to an actual vehicle traveling speed which is higher than the actual vehicle traveling speed to which the corresponding normal shift-up replies. However, when vehicle 1 ascends a slope, the shift-down graphs are unchanged, i.e., normal shift-down graphs D021, D032 and D043 for vehicle 1 traveling on a flatland are used as they are.

As a result of the change of the shift-up graphs, in the timing chart of FIG. 18, the periods between timings T4 and T5 for the first-to-second speed shift-up, between timings T7 and T8 for the second-to-third speed shift-up and between timings T10 and T11 for the third-to-fourth speed shift-up are shifted rightward, i.e., to the side of higher vehicle traveling speed (larger depression of the accelerator pedal or larger degree of the throttle valve opening). Namely, the shift-up timings for accelerating vehicle 1 ascending on a slope are later than the respective shift-up timings for accelerating vehicle 1 traveling on a flatland. The periods between timings T15 and T16 for the fourth-to-third speed shift-down, between timings T18 and T19 for the third-to-second speed shift-down and between timings T21 and T22 for the second-to-first speed shift-down are left as the respective normal timings for traveling of vehicle 1 on a flatland.

Figure 21:
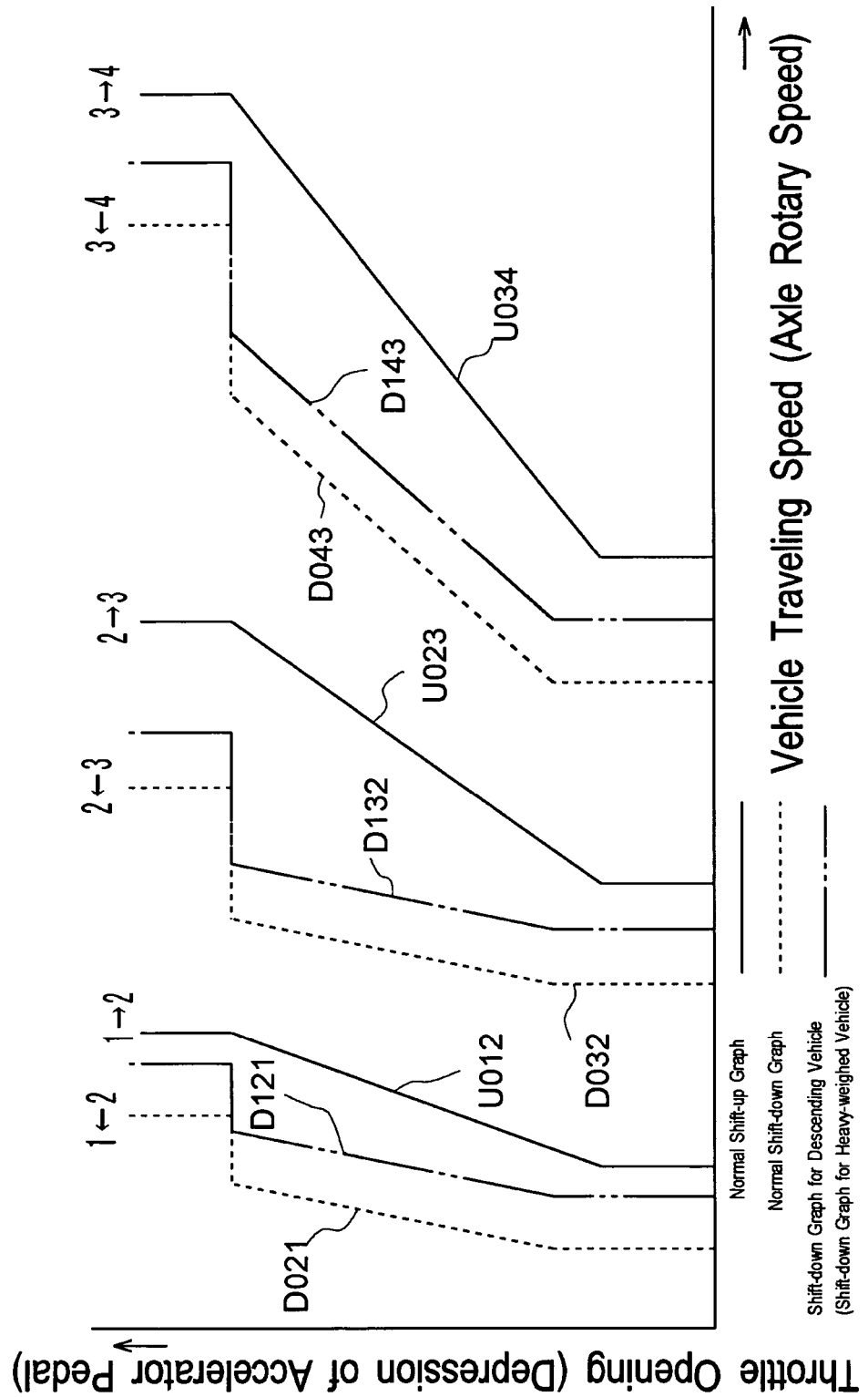
FIG. 21 is a map of characteristic curves showing change of a shift-down curve for the starting of the vehicle descending a slope.

The amendment of shift-down patterns for vehicle 1 descending a slope will be described with reference to FIG. 21. In FIG. 21, normal shift-down graphs D021 (second-to-first speed shift-down), D032 (third-to-second speed shift-down) and D043 (fourth-to-third speed shift-down) are the same as those in FIG. 8 adapted for vehicle 1 traveling on a flatland, and amended shift-down graphs D121 (second-to-first speed shift-down), D132 (third-to-second speed shift-down) and D143 (fourth-to-third speed shift-down) are adapted for vehicle 1 descending a slope. When vehicle 1 descends a slope, the normal shift-down graphs are changed into the amended shift-down graphs disposed rightward from the respective normal shift-down graphs in FIG. 21. In other words, each amended shift-down replies to an actual vehicle traveling speed which is higher than the actual vehicle traveling speed to which the corresponding normal shift-down replies. However, when vehicle 1 descends a slope, the shift-up graphs are unchanged, i.e., normal shift-up graphs U012, U023 and U034 for vehicle 1 traveling on a flatland are used as they are.

As a result of the change of the shift-up graphs, in the timing chart of FIG. 18, the periods between timings T15 and T16 for the fourth-to-third speed shift-down, between timings T18 and T19 for the third-to-second speed shift-down and between timings T21 and T22 for the second-to-first speed shift-down are shifted leftward, i.e., to the side of higher vehicle traveling speed (larger depression of the accelerator pedal or larger degree of the throttle valve opening). Namely, the shift-down timings for decelerating vehicle 1 descending on a slope are earlier than the respective shift-down timings for decelerating vehicle 1 traveling on a flatland. The periods between timings T4 and T5 for the first-to-second speed shift-up, between timings T7 and T8 for the second-to-third speed shift-up and between timings T10 and T11 for the third-to-fourth speed shift-up are left as the respective normal timings for traveling of vehicle 1 on a flatland.

An amended gearshift clutch control based on detection of a vehicle weight condition will be described. In this regard, the vehicle weight sensor (i.e., vehicle weight detection means 406) constantly detects a weight of vehicle 1 (i.e., load weight on vehicle 1), and the gearshift patterns are changed based on the detected vehicle weight.

Figure 22:
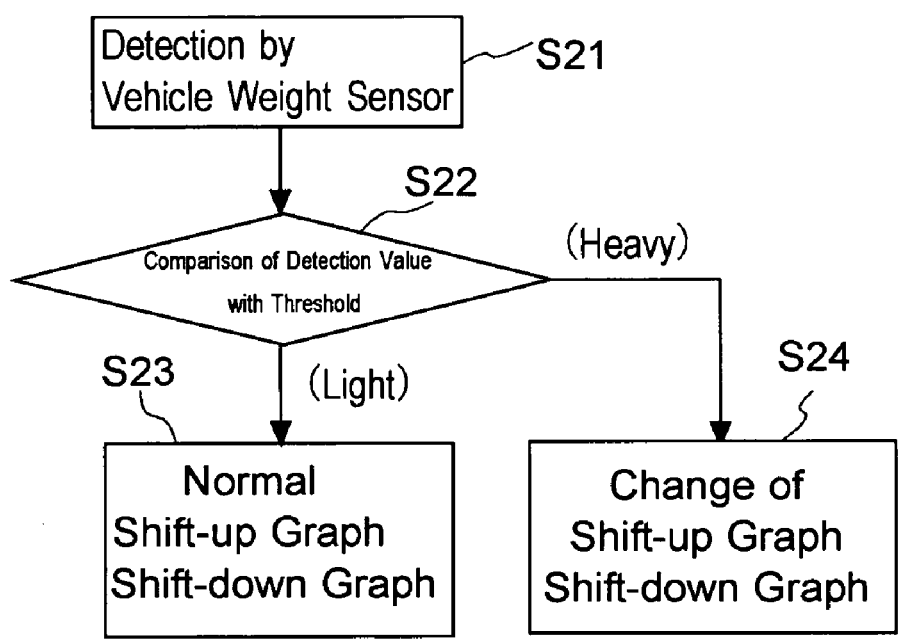
FIG. 22 is a flow chart for changing a gearshift pattern depending on detection by a weight sensor.

As shown in FIG. 22, the vehicle weight sensor detects a weight of vehicle 1 (weight of load on vehicle 1) (at a step S21), and the detected weight is compared with a predetermined weight (at a step S22). As a result of the comparison, if vehicle 1 is determined to be light weighed (loaded), the normal shift-up and shift-down patterns (graphs in the map of FIG. 8) are maintained (at a step S23). If vehicle 1 is determined to be heavily weighed (loaded), the normal shift-up patterns are automatically changed into amended shift-up patterns and amended shift-down patterns for recovery of lost traveling speed (at a step S24).

The amendments of gearshift patterns shown in FIGS. 21 and 22 are adapted as the amendment of gearshift pattern when vehicle 1 is heavily weighed. That is, when it is detected that vehicle 1 is heavily weighed, multi-speed transmission 19 (42) adapts amended shift-up graphs U112 (first-to-second speed shift-up), U123 (second-to-third speed shift-up) and U134 (third-to-fourth speed shift-up) shown in FIG. 20, replying to respective actual vehicle traveling speeds that are higher than the actual vehicle traveling speeds to which respective normal shift-up graphs U012, U023 and U034 reply, and also, multi-speed transmission 19 (42) adapts amended shift-down graphs D121 (second-to-first speed shift-down), D132 (third-to-second speed shift-down) and D143 (fourth-to-third speed shift-down) shown in FIG. 21, replying to respective actual vehicle traveling speeds that are higher than the actual vehicle traveling speeds to which respective normal shift-down graphs D021, D032 and D043 reply.

As a result of the change of the shift-up and shift-down graphs, in the timing chart of FIG. 18, the periods between timings T4 and T5 for the first-to-second speed shift-up, between timings T7 and T8 for the second-to-third speed shift-up and between timings T10 and T11 for the third-to-fourth speed shift-up are shifted rightward, i.e., to the side of higher vehicle traveling speed (larger depression of the accelerator pedal or larger degree of the throttle valve opening). Namely, the shift-up timings for accelerating heavily weighed vehicle 1 are later than the respective shift-up timings for accelerating light weighed vehicle 1. The periods between timings T15 and T16 for the fourth-to-third speed shift-down, between timings T18 and T19 for the third-to-second speed shift-down and between timings T21 and T22 for the second-to-first speed shift-down are shifted leftward, i.e., to the side of higher vehicle traveling speed (larger depression of the accelerator pedal or larger degree of the throttle valve opening). Namely, the shift-down timings for decelerating heavily weighed vehicle 1 are earlier than the respective shift-down timings for decelerating light weighed vehicle 1.

An amended gearshift clutch control based on detection of a vehicle tilt condition and detection of a vehicle weight condition will be described with reference to FIGS. 23, 24 and 25. In this regard, the vehicle tilt angle sensor (i.e., vehicle tilt angle detection means 405) and the vehicle weight sensor (i.e., vehicle weight detection means 406) constantly detect a tilt angle of vehicle 1 in the forward or backward traveling direction thereof and a weight of vehicle 1, and the gearshift patterns are changed based on the detected tilt angle and the detected weight.

Figure 23:
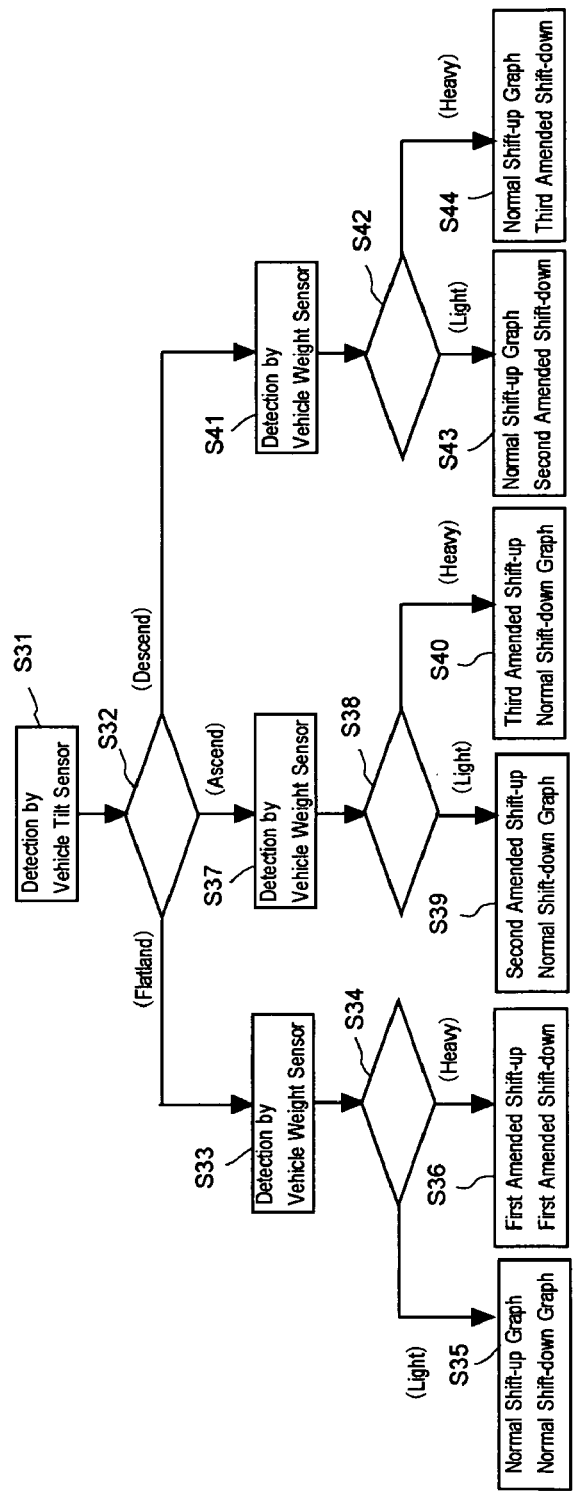
FIG. 23 is a flow chart for changing a gearshift pattern depending on detection by a tilt sensor and a weight sensor.

As shown in FIG. 23, the vehicle tilt angle sensor detects a tilt angle of vehicle 1 in the forward or backward traveling direction (at a step S31), and the detected angle is compared with a predetermined tilt angle (at a step S32), so as to determine on which of a flatland, an ascending slope and a descending slope vehicle 1 travels. After the determination of the slope state of vehicle 1, based on detection of a weight of vehicle 1 (load weight of vehicle 1) by the vehicle weight sensor (at a step S33, S37 or S41), the detected weight is compared with a predetermined weight (at a step S34, S38 or S42).

Figure 24:
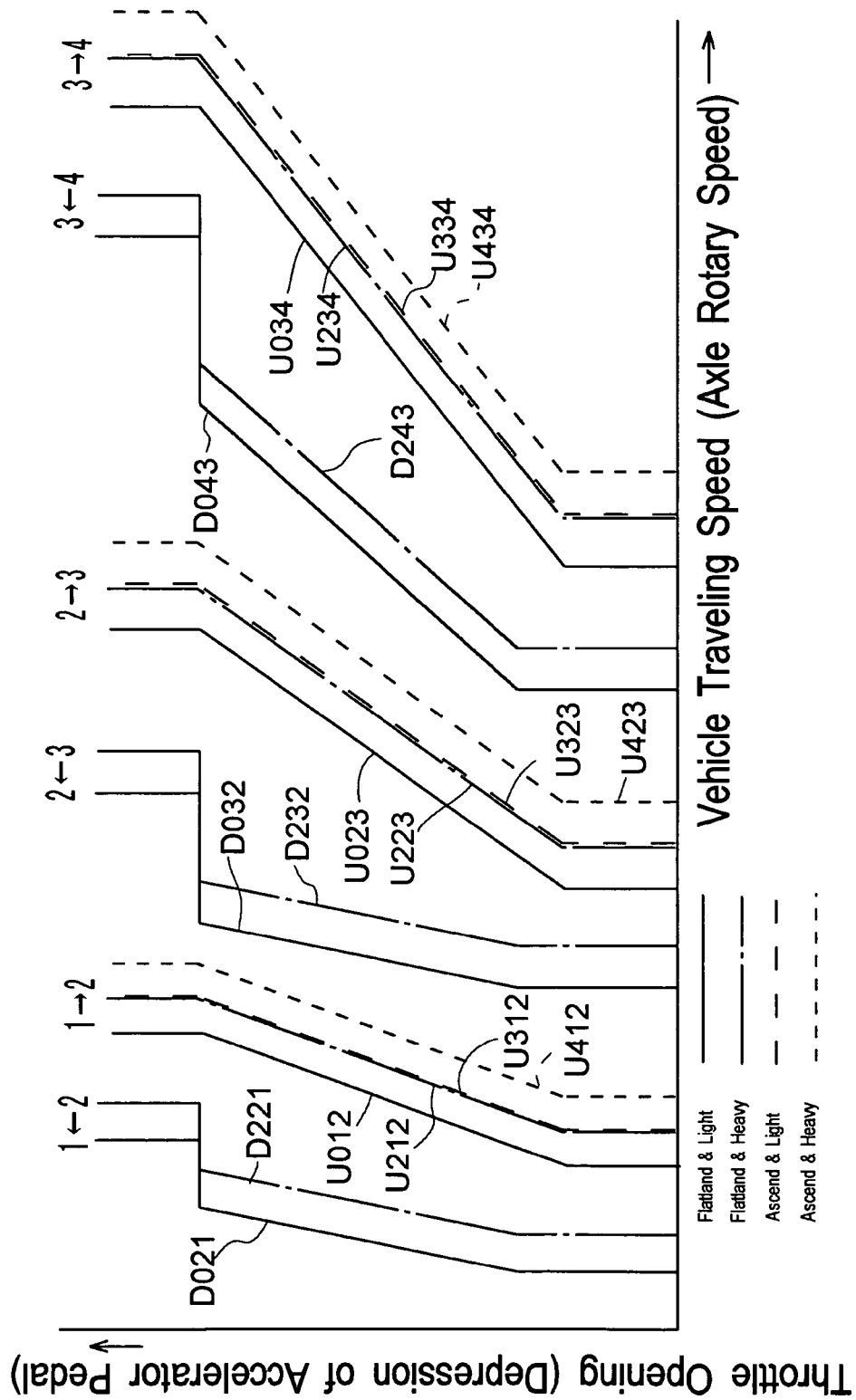
FIG. 24 is a map of characteristic curves showing change of gearshift patterns according to detection of the tilt sensor and the weight sensor between the state that the vehicle travels on a flat land and the state that the vehicle ascends a slope.
Figure 25:
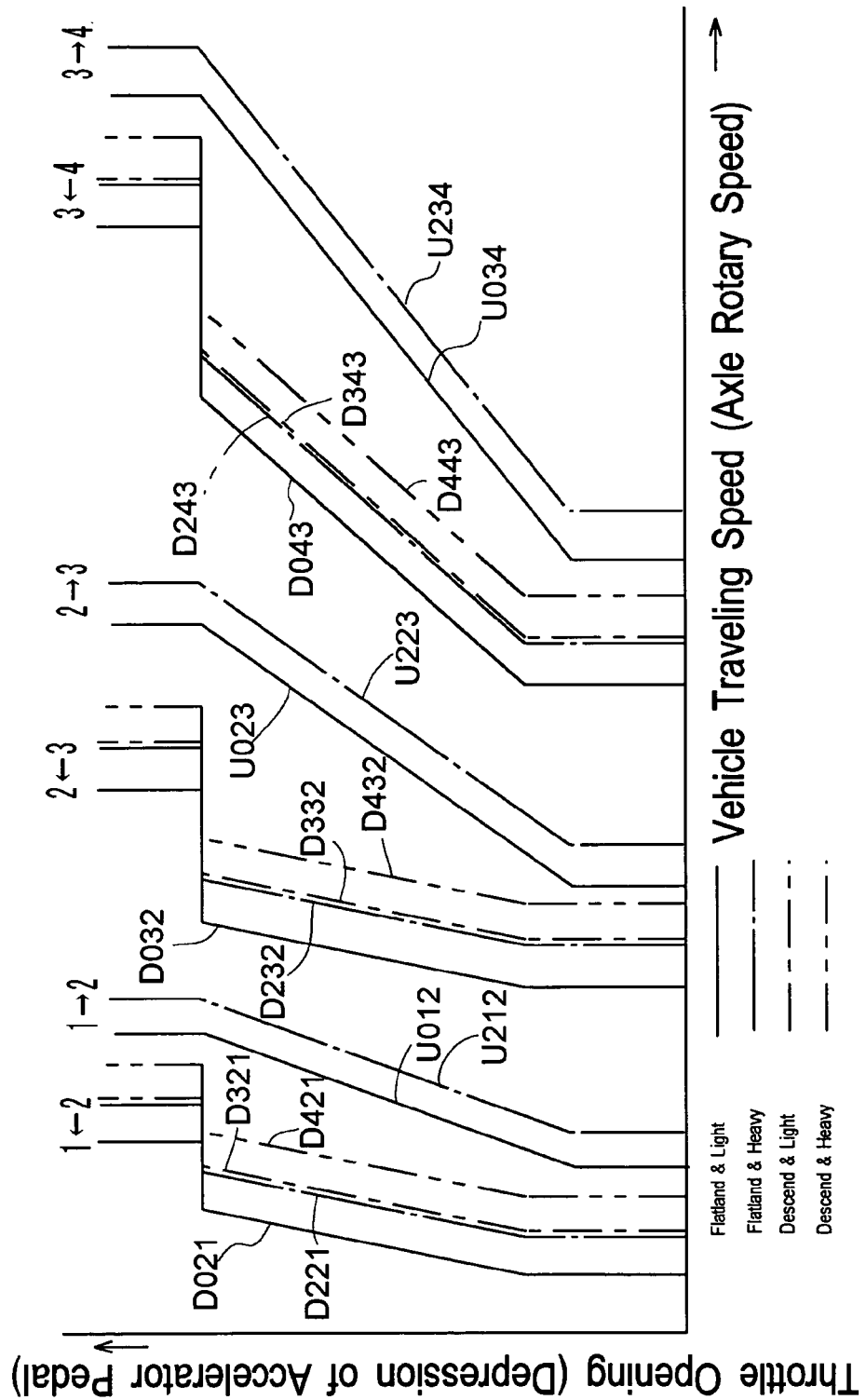
FIG. 25 is a map of characteristic curves showing change of gearshift patterns according to detection of the tilt sensor and the weight sensor between the state that vehicle travels on a flat land and the state that the vehicle descends a slope.

As a result of the comparison of the detected weight with the predetermined weight when vehicle 1 travels on a flatland (step S34), if vehicle 1 is determined to be light weighed (loaded), normal shift-up graphs U012, U023 and U034 and normal shift-down graphs D021, D032 and D043 shown in a map of FIG. 24 or 25 are adapted as they are (at a step S35).

Alternatively, if vehicle 1 traveling on a flatland is determined to be heavy weighed (loaded), multi-speed transmission 19 (42) adapts first amended shift-up graphs U212 (first-to-second speed shift-up), U223 (second-to-third speed shift-up) and U234 (third-to-fourth speed shift-up) shown in the map of FIG. 24 or 25, replying to respective actual vehicle traveling speeds that are higher than the actual vehicle traveling speeds to which respective normal shift-up graphs U012, U023 and U034 reply, and also, multi-speed transmission 19 (42) adapts first amended shift-down graphs D221 (second-to-first speed shift-down), D232 (third-to-second speed shift-down) and D243 (fourth-to-third speed shift-down) shown in FIG. 21, replying to respective actual vehicle traveling speeds that are higher than the actual vehicle traveling speeds to which respective normal shift-down graphs D021, D032 and D043 reply (at a step S36).

As a result of the change of the shift-up and shift-down graphs at step S36 in the control flow of FIG. 23, in the timing chart of FIG. 18, the shift-up periods between timings T4 and T5, between timings T7 and T8 and between timings T10 and T11 are shifted rightward, i.e., to the side of higher vehicle traveling speed (larger depression of the accelerator pedal or larger degree of the throttle valve opening) in comparison with the shift-up periods in the time chart caused by the gearshift pattern determined at step S 35 in the control flow of FIG. 23 when light weighed vehicle 1 travels on a flatland. Namely, the shift-up timings for accelerating heavily weighed vehicle 1 traveling on a flatland are later than the respective shift-up timings for accelerating light weighed vehicle 1 on a flatland. The shift-down periods between timings T15 and T16, between timings T18 and T19 and between timings T21 and T22 are shifted leftward, i.e., to the side of higher vehicle traveling speed (larger depression of the accelerator pedal or larger degree of the throttle valve opening) in comparison with the shift-down periods in the time chart caused by the gearshift pattern determined at step S 35 in the control flow of FIG. 23 when light weighed vehicle 1 travels on a flatland. Namely, the shift-down timings for decelerating heavily weighed vehicle 1 traveling on a flatland are earlier than the respective shift-down timings for decelerating light weighed vehicle 1 on a flatland. In this way, the shift-up timings are delayed, and the shift-down timings are advanced, similar to those in the timing chart changed by the flow chart of FIG. 22.

As a result of the comparison of the detected weight with the predetermined weight when vehicle 1 ascends a slope (step S38), if ascending vehicle 1 is determined to be light weighed (loaded), multi-speed transmission 19 (42) adapts second amended shift-up graphs U312 (first-to-second speed shift-up), U323 (second-to-third speed shift-up) and U334 (third-to-fourth speed shift-up) shown in the map of FIG. 24, replying to respective actual vehicle traveling speeds that are higher than the actual vehicle traveling speeds to which respective normal shift-up graphs U012, U023 and U034 reply, and also, multi-speed transmission 19 (42) adapts normal shift-down graphs D021, D032 and D043 shown in the map of FIG. 24 (at a step S39). As a result of the change of the shift-up graphs at step S39 in the control flow of FIG. 23, in the timing chart of FIG. 18, the shift-up periods between timings T4 and T5, between timings T7 and T8 and between timings T10 and T11 are shifted rightward, i.e., to the side of higher vehicle traveling speed (larger depression of the accelerator pedal or larger degree of the throttle valve opening) in comparison with the shift-up periods in the time chart caused by the gearshift pattern determined at step S35 in the control flow of FIG. 23 when light weighed vehicle 1 travels on a flatland. Namely, the shift-up timings for accelerating light weighed vehicle 1 ascending a slope are later than the respective shift-up timings for accelerating light weighed vehicle 1 on a flatland. The shift-down periods between timings T15 and T16, between timings T18 and T19 and between timings T21 and T22 are not shifted, i.e., remain as them shown in FIG. 18. In this way, the shift-up timings are delayed while the shift-down timings remain as normal, similar to those in the timing chart changed by the flow chart of FIGS. 19 and 20.

Alternatively, if ascending vehicle 1 is determined to be heavily weighed (loaded), multi-speed transmission 19 (42) adapts third amended shift-up graphs U412 (first-to-second speed shift-up), U423 (second-to-third speed shift-up) and U434 (third-to-fourth speed shift-up) shown in the map of FIG. 24, replying to respective actual vehicle traveling speeds that are higher than the actual vehicle traveling speeds to which respective second amended shift-up graphs U312, U323 and U334 reply, and also, multi-speed transmission 19 (42) adapts normal shift-down graphs D021, D032 and D043 shown in the map of FIG. 24 (at a step S40). As a result of the change of the shift-up graphs at step S40 in the control flow of FIG. 23, in the timing chart of FIG. 18, the shift-up periods between timings T4 and T5, between timings T7 and T8 and between timings T10 and T11 are shifted further rightward, i.e., to the side of higher vehicle traveling speed (larger depression of the accelerator pedal or larger degree of the throttle valve opening) in comparison with the shift-up periods in the time chart caused by the gearshift pattern determined at step S 39 in the control flow of FIG. 23 when light weighed vehicle 1 ascends a slope. Namely, the shift-up timings for accelerating heavily weighed vehicle 1 ascending a slope are further later than the respective shift-up timings for accelerating light weighed vehicle 1 on an ascending slope. The shift-down periods between timings T15 and T16, between timings T18 and T19 and between timings T21 and T22 are not shifted, i.e., remain as them shown in FIG. 18.

As a result of the comparison of the detected weight with the predetermined weight when vehicle 1 descends a slope (step S42), if descending vehicle 1 is determined to be light weighed (loaded), multi-speed transmission 19 (42) adapts second amended shift-down graphs D321 (second-to-first speed shift-down), D332 (third-to-second speed shift-down) and D343 (fourth-to-third speed shift-down) shown in the map of FIG. 25, replying to respective actual vehicle traveling speeds that are higher than the actual vehicle traveling speeds to which respective normal shift-down graphs D021, D032 and D043 reply, and also, multi-speed transmission 19 (42) adapts normal shift-up graphs U012, U023 and U034 shown in the map of FIG. 25 (at a step S43). As a result of the change of the shift-down graphs at step S43 in the control flow of FIG. 23, in the timing chart of FIG. 18, the shift-down periods between timings T15 and T16, between timings T18 and T19 and between timings T21 and T22 are shifted leftward, i.e., to the side of higher vehicle traveling speed (larger depression of the accelerator pedal or larger degree of the throttle valve opening) in comparison with the shift-down periods in the time chart caused by the gearshift pattern determined at step S35 in the control flow of FIG. 23 when light weighed vehicle 1 travels on a flatland. Namely, the shift-down timings for decelerating light weighed vehicle 1 on a flatland are earlier than the respective shift-down timings for decelerating light weighed vehicle 1 on a flatland. The shift-up periods between timings T4 and T5, between timings T7 and T8 and between timings T10 and T11 are not shifted, i.e., remain as them shown in FIG. 18. In this way, while the shift-up timings remains as normal, the shift-down timings is advanced.

Alternatively, if descending vehicle 1 is determined to be heavily weighed (loaded), multi-speed transmission 19 (42) adapts third amended shift-down graphs D421 (second-to-first speed shift-down), D432 (third-to-second speed shift-down) and D443 (fourth-to-third speed shift-down) shown in the map of FIG. 25, replying to respective actual vehicle traveling speeds that are higher than the actual vehicle traveling speeds to which respective second amended shift-down graphs D321, D332 and D343 reply, and also, multi-speed transmission 19 (42) adapts normal shift-up graphs U012, U023 and U034 shown in the map of FIG. 25 (at a step S44). As a result of the change of the shift-down graphs at step S44 in the control flow of FIG. 23, in the timing chart of FIG. 18, the shift-down periods between timings T15 and T16, between timings T18 and T19 and between timings T21 and T22 are shifted further leftward, i.e., to the side of higher vehicle traveling speed (larger depression of the accelerator pedal or larger degree of the throttle valve opening) in comparison with the shift-up periods in the time chart caused by the gearshift pattern determined at step S43 in the control flow of FIG. 23 when light weighed vehicle 1 descends a slope. Namely, the shift-down timings for decelerating heavily weighed vehicle 1 descending a slope are further earlier than the respective shift-down timings for decelerating light weighed vehicle 1 on the descending slope. The shift-up periods between timings T4 and T5, between timings T7 and T8 and between timings T10 and T11 are not shifted, i.e., remain as them shown in FIG. 18.

Control for decelerating vehicle 1 (shift-down control of multi-speed transmission 19) in association with a braking operation will now be described with reference to FIG. 26.

Basically, when the brake pedal is depressed in traveling vehicle 1 (while depression of the accelerator pedal is kept at a certain degree so as to keep a constant engine rotary speed ERf), the engaged one of the first and second clutches 58 and 59 is disengaged and the other of first and second clutches 58 and 59 is engaged for automatic shift-down. FIG. 26 illustrates three clutch pressure variation patterns for the shift-down.

In a timing chart of FIG. 26(a), according to a first clutch pressure variation pattern, the brake pedal is depressed in vehicle 1 traveling at the third speed so as to shift down to the second speed, then the depressed brake pedal is released, and vehicle 1 is accelerated to the third speed. In the first pattern, simultaneous with the depression of the brake pedal, the clutch pressure of first clutch 58 is reduced from the proper (maximum) clutch pressure to the predetermined creeping clutch pressure so as to half-engage first clutch 58, and the creeping clutch pressure is kept for a while so as to transmit power through half-engaged first clutch 58. After the while of keeping the creeping clutch pressure, the shift-down timing is reached, so that the clutch pressure of first clutch 58 starts being reduced, and simultaneously, the clutch pressure of second clutch 59 starts being increased from zero, thereby overlapping the reduction of clutch pressure of first clutch 58 with the increase of clutch pressure of second clutch 59 (i.e., performing the cross wave control). Then, the clutch pressure of second clutch 59 reaches a predetermined creeping clutch pressure so as to transmit power through half-engaged second clutch 59 instead of first clutch 58. In this way, according to the first pattern, the cross wave control of first and second clutches 58 and 59 is performed when both the clutch pressures of first and second clutches 58 and 59 are lower than the respective creeping clutch pressures.

While the brake pedal is depressed, the creeping clutch pressure of second clutch 59 is kept, i.e., second clutch 59 is kept half-engaged. After the depressed brake pedal is released, the clutch pressure of second clutch 59 is increased to the maximum (proper) clutch pressure. Then, disengaged first clutch 58 is engaged and engaged second clutch 59 is disengaged, i.e., the cross wave control of clutches 58 and 59 is performed so that the clutch pressure of first clutch 58 is increased to the maximum and the clutch pressure of second clutch 59 is reduced to zero, so as to shift up from the second speed to the third speed.

The control pattern of FIG. 26(a) establishes and keeps the half-engagement of first and second clutches 58 and 59 so as to prevent the engine torque from being directly applied onto the brake, thereby reducing load on the brake. The acceleration immediately after releasing the depressed brake pedal is gentle by increasing the clutch pressure of second clutch 59 from the creeping clutch pressure to the maximum (proper) clutch pressure, as noticed from the vehicle traveling speed variation shown in FIG. 26(a).

In a timing chart of FIG. 26(b), according to a second clutch pressure variation pattern, the brake pedal is depressed in vehicle 1 traveling at the third speed so as to shift down to the second speed, then the depressed brake pedal is released, and vehicle 1 is accelerated to the third speed. In the second pattern, the reduction of clutch pressure of first clutch 58 does not start immediately after the depression of the brake pedal, but it starts after the reduced actual vehicle traveling speed reaches a certain value. The clutch pressure of second clutch 59 starts to be increased from zero simultaneously to the start of reduction of clutch pressure of first clutch 58. In this way, the third-to-second shift-down is performed by the normal cross wave control of first and second clutches 58 and 59, wherein both the clutch pressures of first and second clutches 58 and 59 can be higher than respective creeping clutch pressures. The depressed brake pedal is kept until the increased clutch pressure of second clutch 59 by the shift-down reaches the maximum (proper) clutch pressure.

While the brake pedal is depressed after the shift-down, the maximum (proper) clutch pressure of second clutch 59 is kept so as to transmit power through properly engaged second clutch 59. In this state, the vehicle traveling speed starts immediately after the depressed brake pedal is released. Therefore, the traveling speed of unbraked vehicle 1 is quickly increased and reaches the proper value established by the second speed level gear soon. Afterward, according to an increase of the vehicle traveling speed, disengaged first clutch 58 is engaged and engaged second clutch 59 is disengaged, i.e., the cross wave control of clutches 58 and 59 is performed so that the clutch pressure of first clutch 58 is increased to the maximum and the clutch pressure of second clutch 59 is reduced to zero, so as to shift up from the second speed to the third speed.

Figure 26:
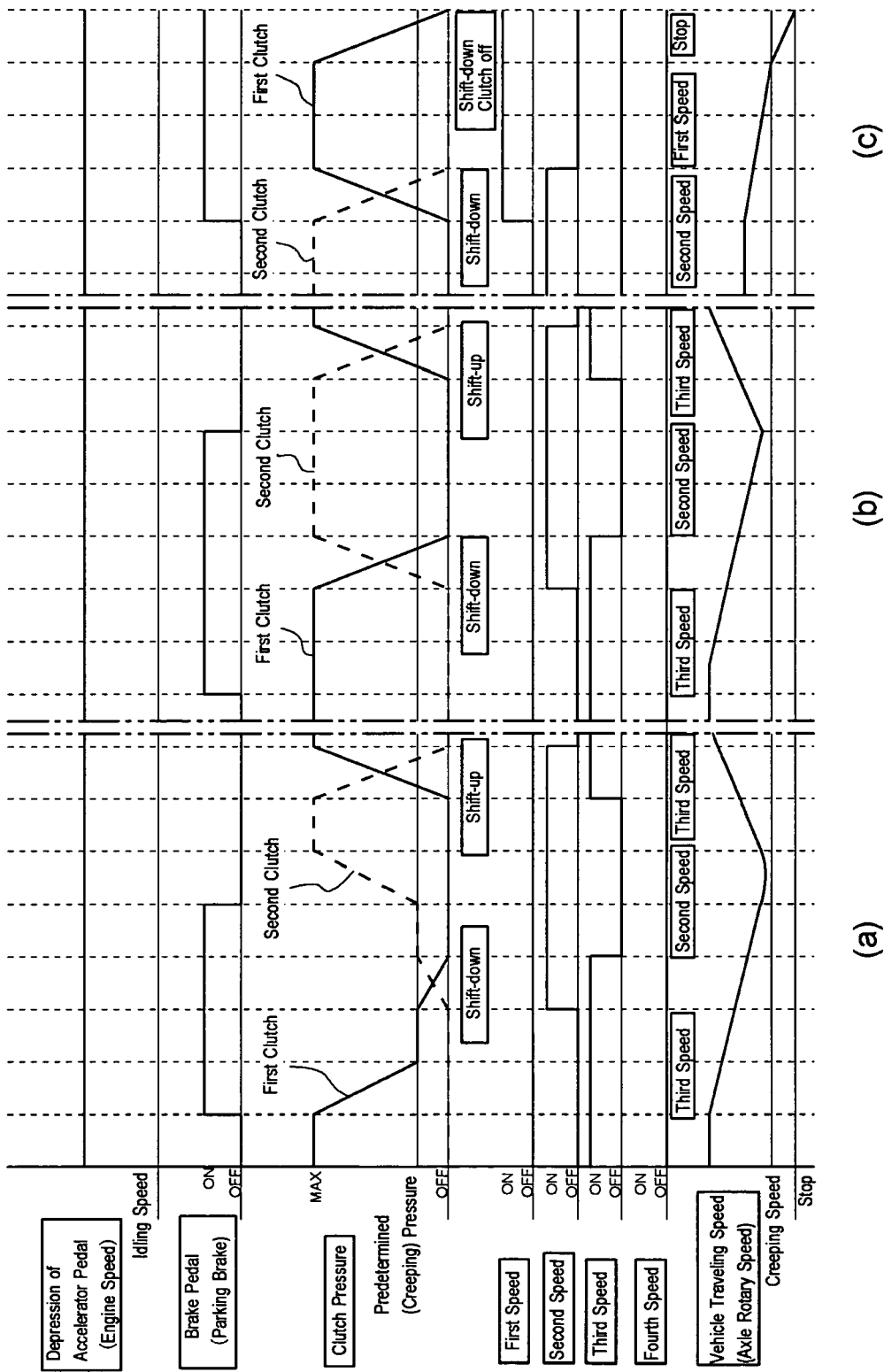
FIG. 26 is a timing chart of clutch control for reduction/stopping of the vehicle in association with operation of a brake.

In the control pattern of FIG. 26(*b*), both the clutch pressures of first and second clutches are not kept to be the respective creeping pressures while vehicle 1 is braked. Strictly, a state of half-engagement of both first and second clutches 58 and 59 exists for the braking period. However, the state takes a very short time. Therefore, the shift-down effects sufficient engine braking. The acceleration immediately after releasing the depressed brake pedal is swift by the cross wave control where the half-engagement of increasing the clutch pressure of second clutch 59 from the creeping (half-engaging) clutch pressure to the maximum (proper) clutch pressure, as noticed from the vehicle traveling speed variation shown in FIG. 26(*b*).

Vehicle 1 may be provided with operation means, such as a switch, for selecting either the first or second shift-down control pattern (from the third speed to the second speed) in association with the brake pedal operation.

In a timing chart of FIG. 26(*c*), vehicle 1 traveling at the second speed is completely stopped by depressing the brake pedal. When the brake pedal is depressed during the traveling of vehicle 1 at the second speed, reduction of the clutch pressure of second clutch 59 and increase of the clutch pressure of first clutch 58 start according to the corresponding shift-down graph, and the normal cross wave control of first and second clutches 58 and 59 is performed for shift-down from the second speed to the first speed.

After the first speed is established, the vehicle traveling speed becomes smaller and smaller as far as the brake pedal is kept depressed. Immediately after the reduced vehicle traveling speed reaches a predetermined stopping speed, the clutch pressure of first clutch 58 starts being reduced. Then, first clutch is disengaged, i.e., both first and second clutches are completely disengaged, thereby completely stopping vehicle 1.

Figure 27:
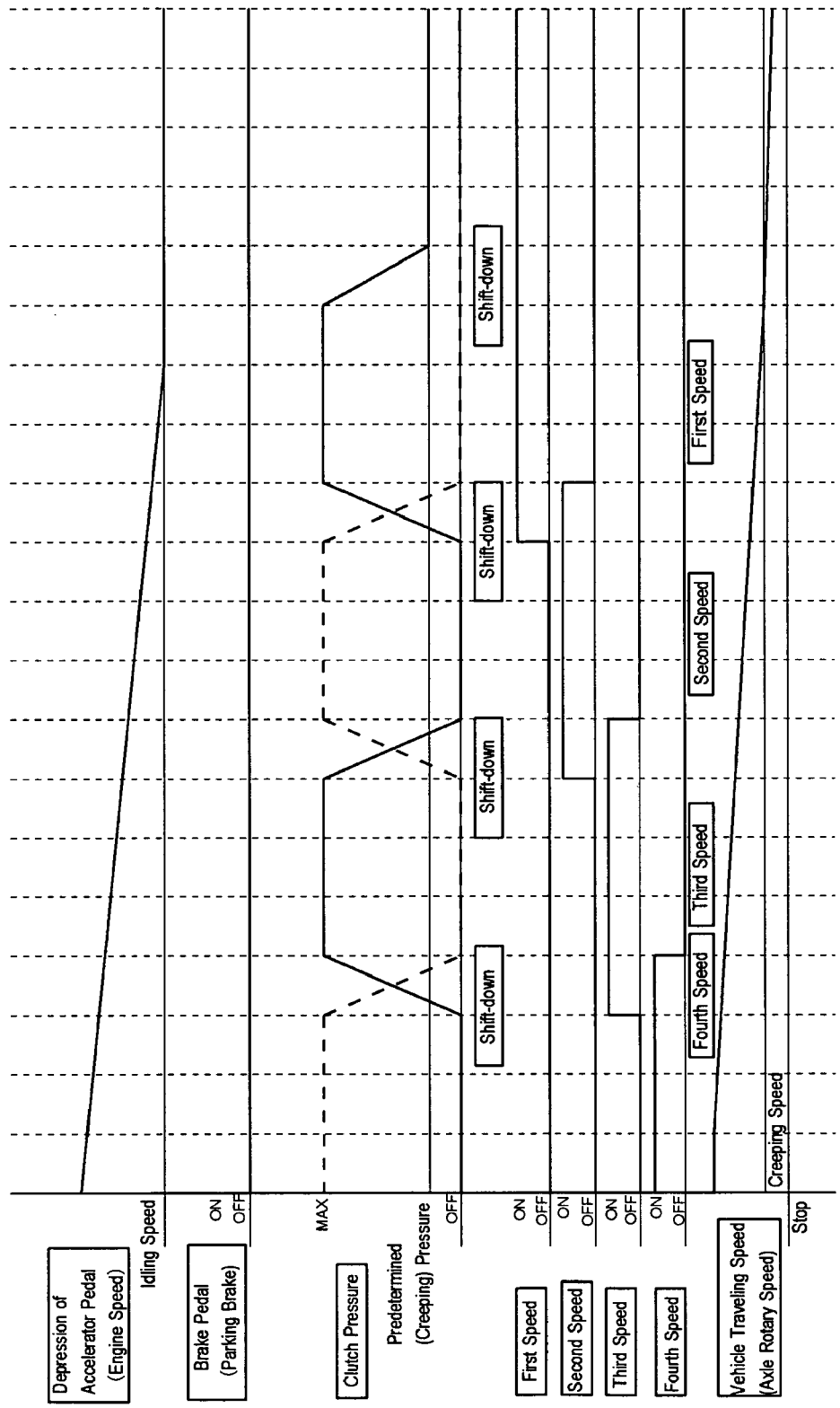
FIG. 27 is a timing chart of clutch control for reduction/stopping of the vehicle during inactivation of the brake.

Referring to FIG. 27, a shift-down control for natural deceleration of vehicle 1 by releasing the depressed accelerator pedal without depression of the brake pedal will be described.

In a timing chart of FIG. 27, the depression of the accelerator pedal in vehicle 1 traveling at the fourth speed is reduced. As the vehicle traveling speed is reduced, the normal cross wave controls of first and second clutches 58 and 59 are performed in series for respective shift-downs from the fourth speed to the third speed, from the third speed to the second speed, and from the second speed to the first speed.

When the vehicle traveling speed becomes lower than the predetermined stopping speed after the first speed level is established, the clutch pressure of first clutch 58 is reduced from the maximum (proper) pressure to the creeping pressure clutch, whereby the reduced vehicle traveling speed naturally reaches the creeping speed. The creeping pressure of first clutch 58 is kept after the depression of the accelerator pedal becomes zero (or the engine rotary speed becomes idling rotary speed ER1). In other words, while the engine idles, the half-engagement of first clutch 58 (the creeping clutch pressure of first clutch 58) is maintained as far as the brake pedal is undepressed. It is considerable that the half-engaged clutch is switched to be completely disengaged in association with depression of the brake pedal, for instance.

Two modifications of multi-speed transmission 19 with dual clutches adaptable for the cross wave control of clutch pressure of the first and second clutches will be described with reference to FIGS. 28 and 29. Each modification is adaptable to both multi-speed transmissions 19 and 42. Hereinafter, reference numerals are referred on the assumption that each modification is adapted to multi-speed transmission 19 as shown in FIG. 6.

Figure 28:
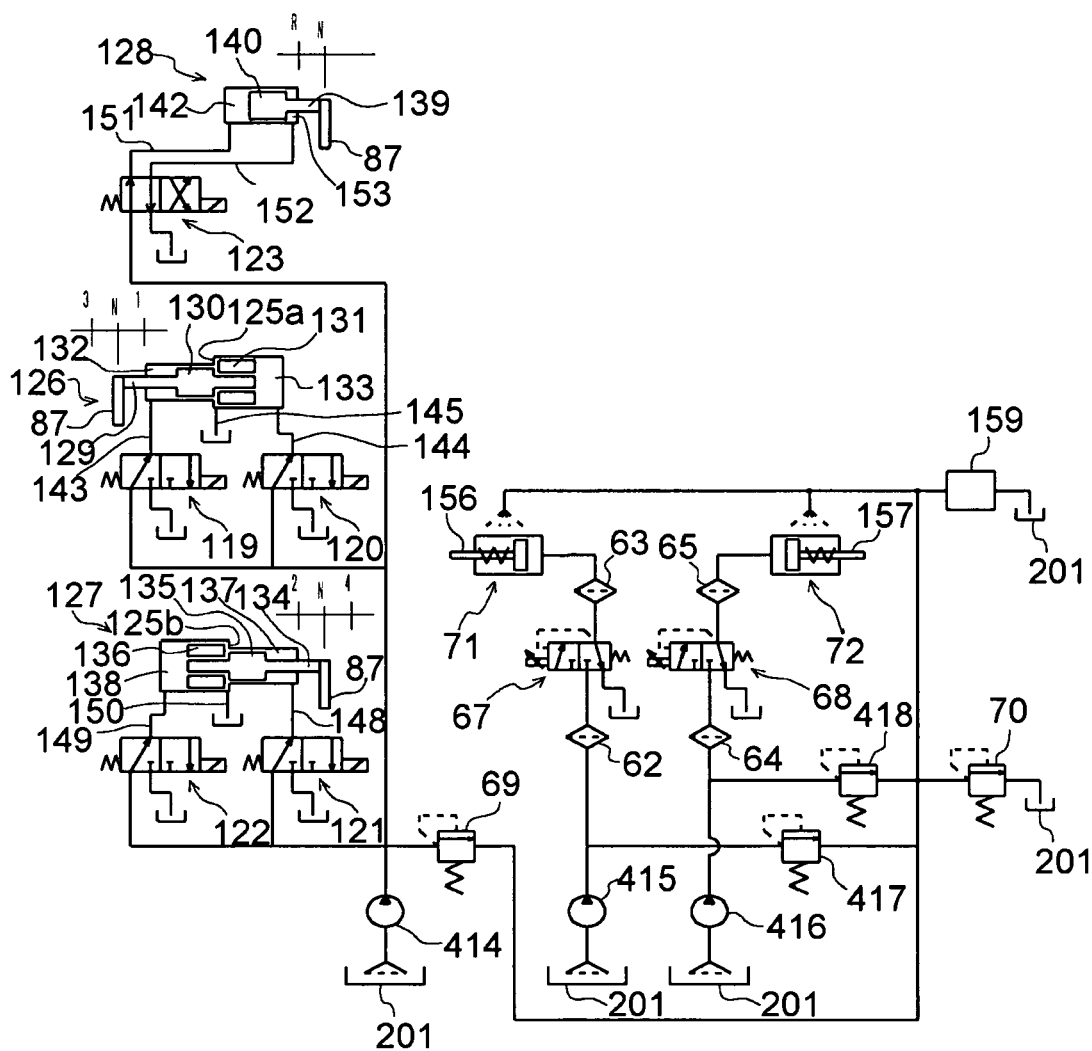
FIG. 28 is a hydraulic circuit diagram of the multi-speed transmission with the dual clutches, wherein a hydraulic circuit for gearshift is separated from another hydraulic circuit for operating clutches.

In a dual-clutch type multi-speed transmission shown in FIG. 28, a hydraulic circuit for supplying hydraulic pressure fluid for moving shifters 96*a*, 97*a* and 98*a* is separated from a hydraulic circuit for supplying hydraulic pressure fluid to hydraulic first and second clutches 58 and 59.

In the dual-clutch type multi-speed transmission shown in FIG. 28, separate hydraulic pressure fluid sources are provided for shifters 96*a*, 97*a* and 98*a* and for hydraulic clutches 58 and 59, respectively. Further, separate hydraulic pressure sources are provided for respective first and second clutches 58 and 59. In this regard, a pump 414 serves as the hydraulic pressure fluid source for the shifters. A relief valve 69 regulates hydraulic pressure supplied to the shifters. A pump 415 supplies fluid to electromagnetic valve 67 for controlling first clutch 58, and relief valve 417 regulates hydraulic pressure supplied to first clutch 58. A pump 416 supplies fluid to electromagnetic valve 68 for controlling second clutch 59, and relief valve 418 regulates hydraulic pressure supplied to second clutch 59.

Since hydraulic clutches 58 and 59 are supplied with fluid from the respective hydraulic pressure fluid sources which are separated from the hydraulic pressure fluid source to the shifters, the accuracy of cross wave control of first and second clutches 58 and 59 is improved.

Figure 29:
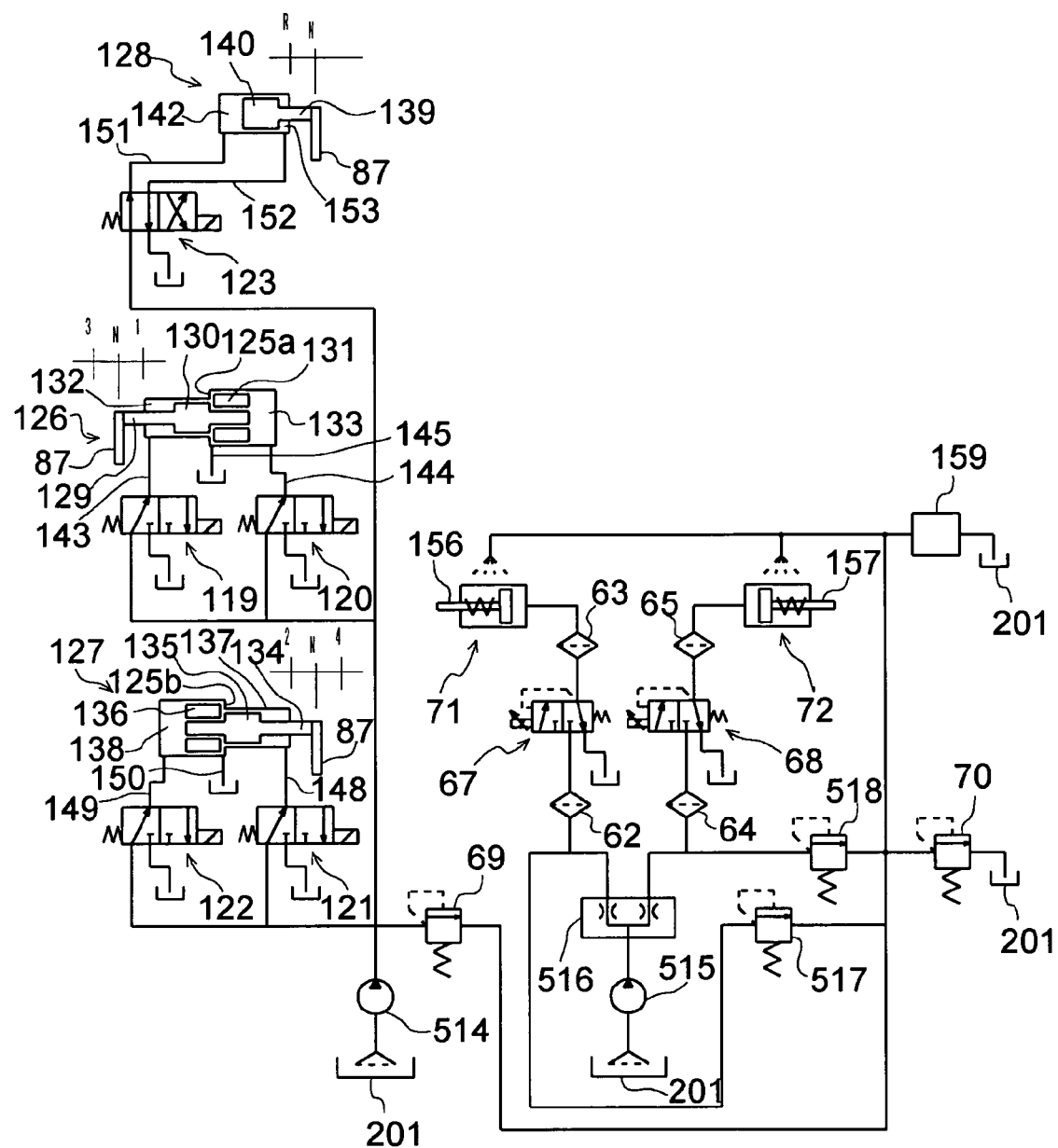
FIG. 29 is another hydraulic circuit diagram of the multi-speed transmission with the dual clutches, wherein a hydraulic circuit for gearshift is separated from another hydraulic circuit for operating clutches.

In a dual-clutch type multi-speed transmission shown in FIG. 29, a hydraulic circuit for supplying hydraulic pressure fluid for moving shifters 96*a*, 97*a* and 98*a* is separated from a hydraulic circuit for supplying hydraulic pressure fluid to hydraulic first and second clutches 58 and 59, similar to the multi-speed transmission of FIG. 28.

In the dual-clutch type multi-speed transmission shown in FIG. 29, separate hydraulic pressure fluid sources are provided for shifters 96*a*, 97*a* and 98*a* and for hydraulic clutches 58 and 59, respectively. In this regard, a pump 514 serves as the hydraulic pressure fluid source for the shifters. A relief valve 69 regulates hydraulic pressure supplied to the shifters. A distributing valve 516 distributes fluid from a common pump 515 between electromagnetic valves 67 and 68 for controlling respective first and second clutches 58 and 59. A relief valve 517 regulates hydraulic pressure supplied to first clutch 58, and a relief valve 518 regulates hydraulic pressure supplied to second clutch 59.

Since hydraulic clutches 58 and 59 are supplied with fluid from pump 515 independent of pump 514 for the shifters, the accuracy of cross wave control of first and second clutches 58 and 59 is improved.

A multi-speed transmission 199 according to a third embodiment will be described with reference to FIGS. 30 to 36. Transmission 199 includes a plurality of gearshift drive trains consisting of multi-speed (first to third speed) normal (forward traveling) gear trains, a reverse (backward traveling) gear train, a sub drive train, a main clutch 301 for the multi-speed gearshift drive trains and a sub clutch 302 for the sub drive train. Axles 25 and 36 are driven by one selected among the multi-speed drive trains by engaging main clutch 301. When a gearshift operation is performed, main clutch 301 is disengaged and simultaneously sub clutch 302 is engaged so as to select one of the multi-speed drive trains, thereby transmitting power of engine 5 to axles 25 and 36 through the sub drive train activated by engaging sub clutch 302.

Figure 30:
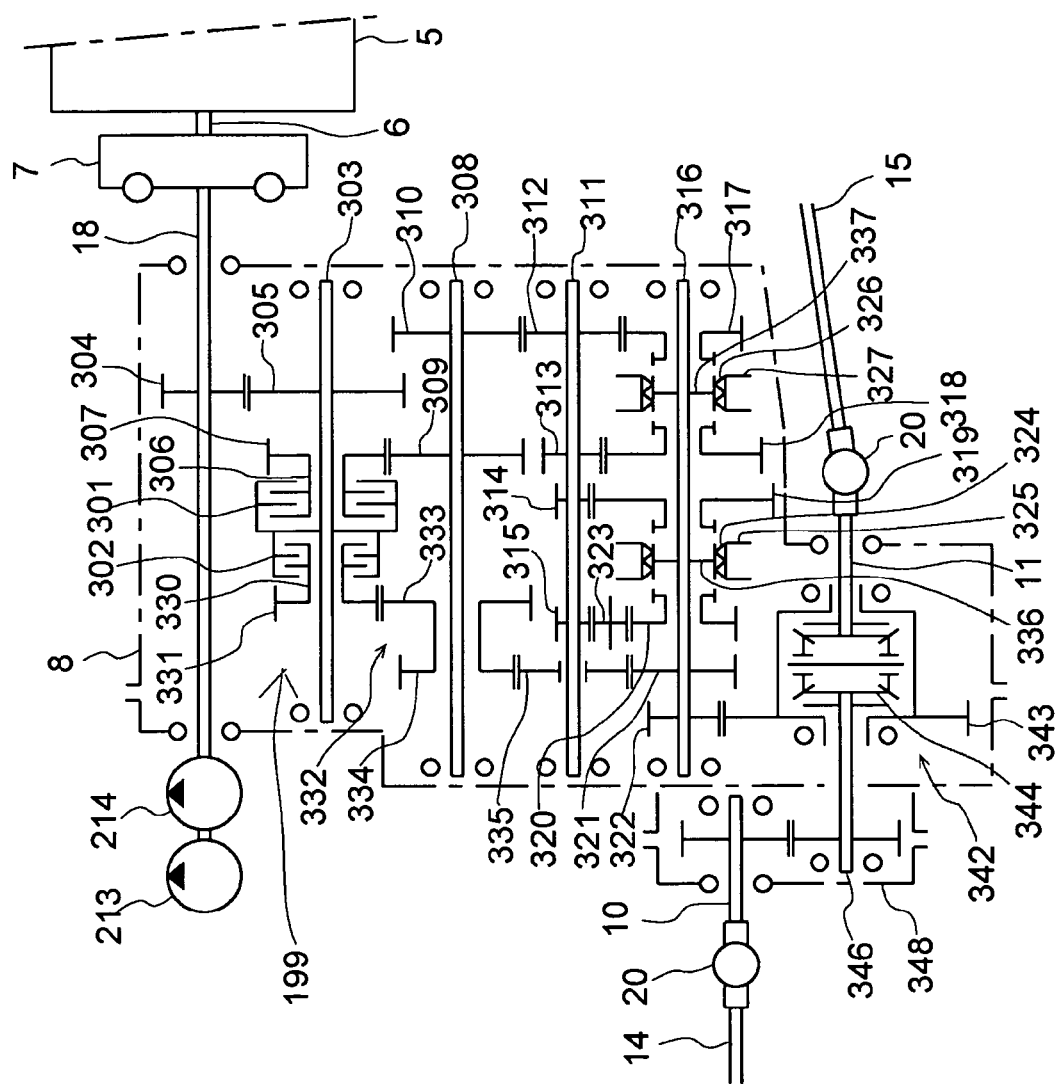
FIG. 30 is a skeleton diagram of a multi-speed transmission according to a third embodiment.

As shown in FIG. 30, transmission 199 is characteristic in having a sub clutch 302 and the sub drive train for transmitting an auxiliary driving force to a traveling gearshift drive shaft 316 during the gearshift operation, in addition to main clutch 301 and the multi-speed (main) drive train for transmitting power from input shaft 18 to traveling gearshift driven shat 316 when vehicle 1 normally travels.

Figure 2:
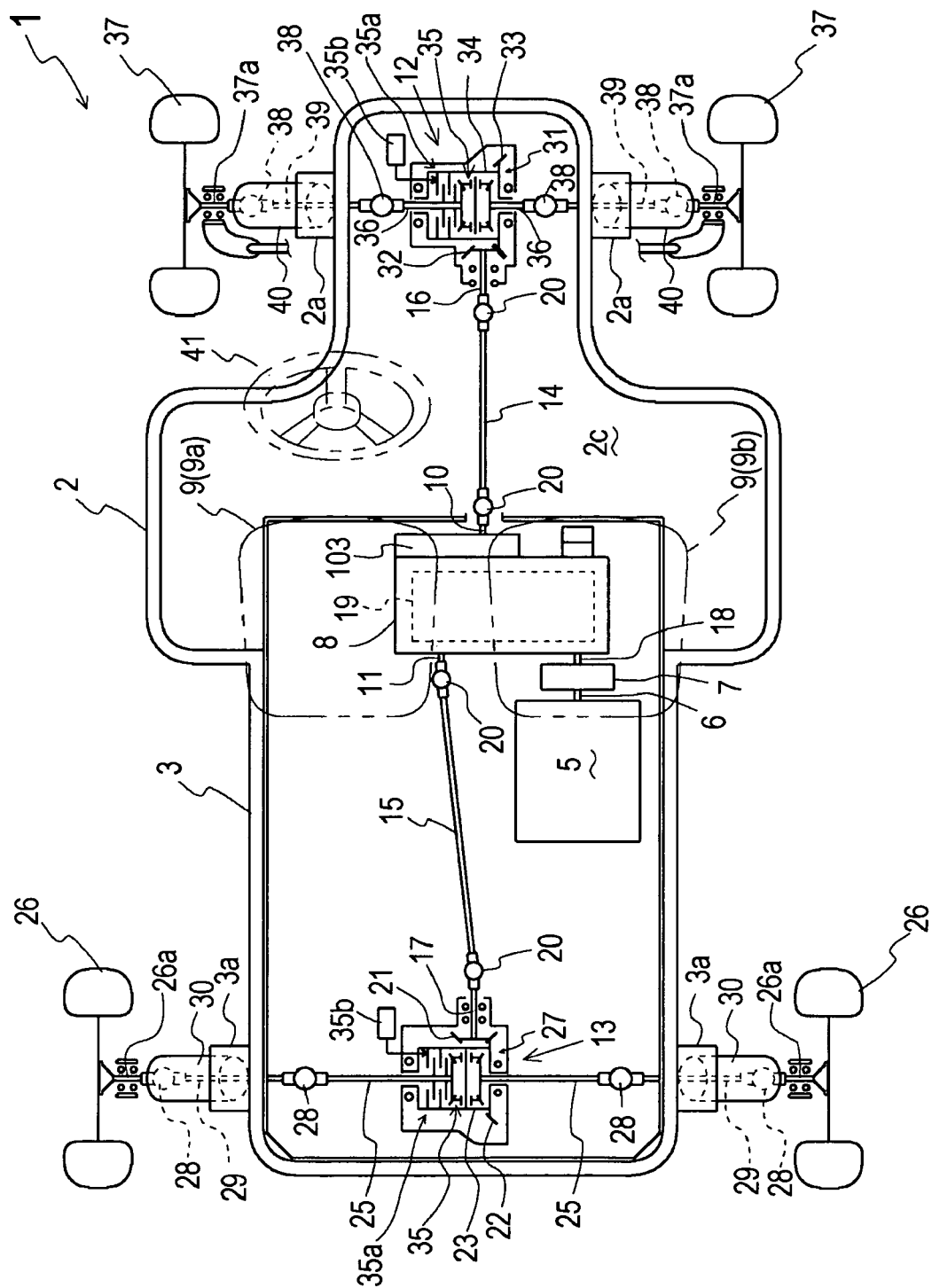
FIG. 2 is a schematic plan view of the utility vehicle.

In utility vehicle 1 as shown in FIGS. 1 and 2, engine 5 is disposed so as to orient its crankshaft in the fore-and-aft direction of vehicle 1. In transmission 199, input shaft 18 serves as an input portion for receiving power from engine 5, front and rear output shaft 346 and 11 serve as an output portion for transmitting power of engine 5 to axles 25 and 36, and transmission shafts are interposed between the input and output portions. The transmission shafts are a clutch input shaft 303, a counter shaft 308, a traveling gearshift drive shaft 311, and traveling gearshift driven shaft 316. Input shaft 18, front and rear output shafts 346 and 11, and transmission shafts 303, 308, 311 and 316 are fore-and-aft extended and disposed in parallel to one another.

Figure 31:
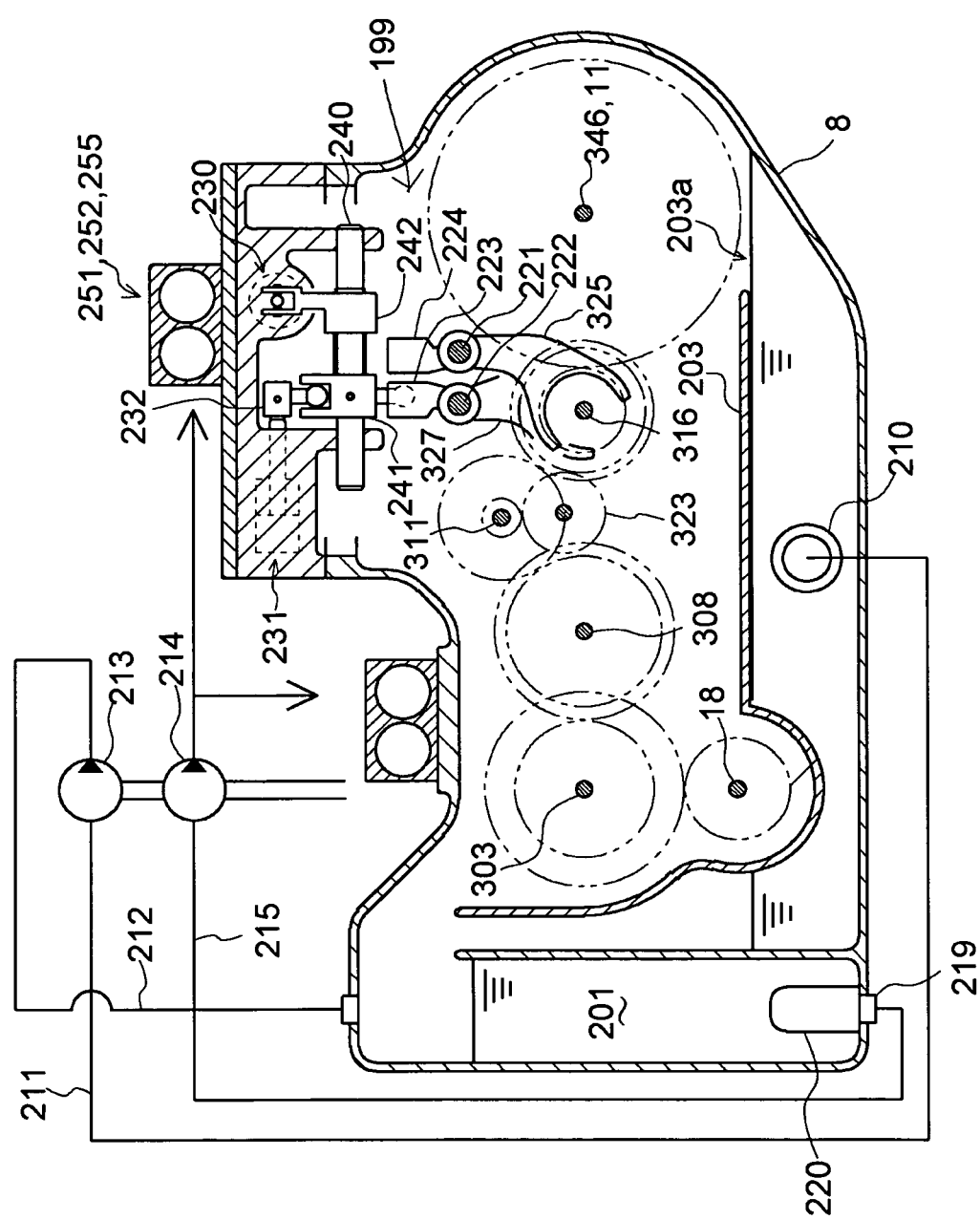
FIG. 31 is a sectional front view of the multi-speed transmission according to the third embodiment.

As shown in FIGS. 30 and 31, output shaft 6 of engine 5 is directly connected to input shaft 18 of transmission 199 through flywheel 7. A gear 304 is relatively unrotatably fitted on input shaft 18. Input shaft 18 projects forward from transmission casing 8 so as to also serve as a drive shaft for pumps 213 and 214.

Main clutch 301 is disposed above input shaft 18, and integrated with sub clutch 302 at a front portion thereof. Preferably, main and sub clutches 301 and 302 are wet type multi-disk clutches. Clutch housings of respective clutches 301 and 302 are fixed on common clutch input shaft 303. A gear 305 is fixed on clutch input shaft 303 and meshes with gear 304 fixed on input shaft 18, so as to transmit the rotary force of input shaft 18 to clutch input shaft 303.

During normal traveling of vehicle 1, power is transmitted from main clutch 301 to traveling gearshift driven shaft 316 through one of speed gear trains. In this regard, a cylindrical main clutch output shaft 306 is extended rearward from main clutch 301 and relatively rotatably fitted on clutch input shaft 303. A gear 307 is relatively unrotatably fitted on main clutch output shaft 306. Multi disks are aligned between the clutch housing of main clutch 301 and main clutch output shaft 306.

Counter shaft 308 is disposed leftward from clutch input shaft 303. A gear 309 is relatively unrotatably fitted on a rear portion of counter shaft 308, and meshes with gear 307 fixed on main clutch output shaft 306. A gear 310 is relatively unrotatably fitted on a rear end of counter shaft 308 so as to transmit power to traveling gearshift drive shaft 311.

Counter shaft 308 is disposed upwardly leftward from traveling gearshift drive shaft 311. A third speed normal drive gear 312 is relatively unrotatably fitted on a rear end of traveling gearshift drive shaft 311. Third speed normal drive gear 312 meshes with gear 310 fixed on counter shaft 308 so as to also serve as an input shaft for inputting power to traveling gearshift drive shaft 311. In this way, the rotary force of main clutch output shaft 306 is transmitted to traveling gearshift drive shaft 311 through gears 307, 309, 310 and 312.

Traveling gearshift drive shaft 311 is fixedly (relatively unrotatably) provided thereon with third speed normal drive gear 312, a second speed normal drive gear 313 disposed in front of third speed normal drive gear 312, a first speed normal drive gear 314 disposed in front of second speed normal drive gear 313, and a reverse drive gear 315 disposed in front of first speed normal drive gear 314.

Traveling gearshift driven shaft 316 is disposed downwardly rightward from traveling gearshift drive shaft 311, and relatively rotatably provided thereon with a third speed normal driven gear 317, a second speed normal driven gear 318 disposed in front of third speed normal driven gear 317, a first speed normal driven gear 319 disposed in front of second speed normal driven gear 318, and a reverse driven gear 320 disposed in front of first speed normal driven gear 319. Normal driven gears 319, 318 and 317 mesh with respective normal drive gears 314, 313 and 312 fixed on traveling gearshift drive shaft 311, and reverse driven gear 320 meshes with reverse drive gear 315 fixed on traveling gearshift drive shaft 311 through an idle gear 323.

Figure 32:
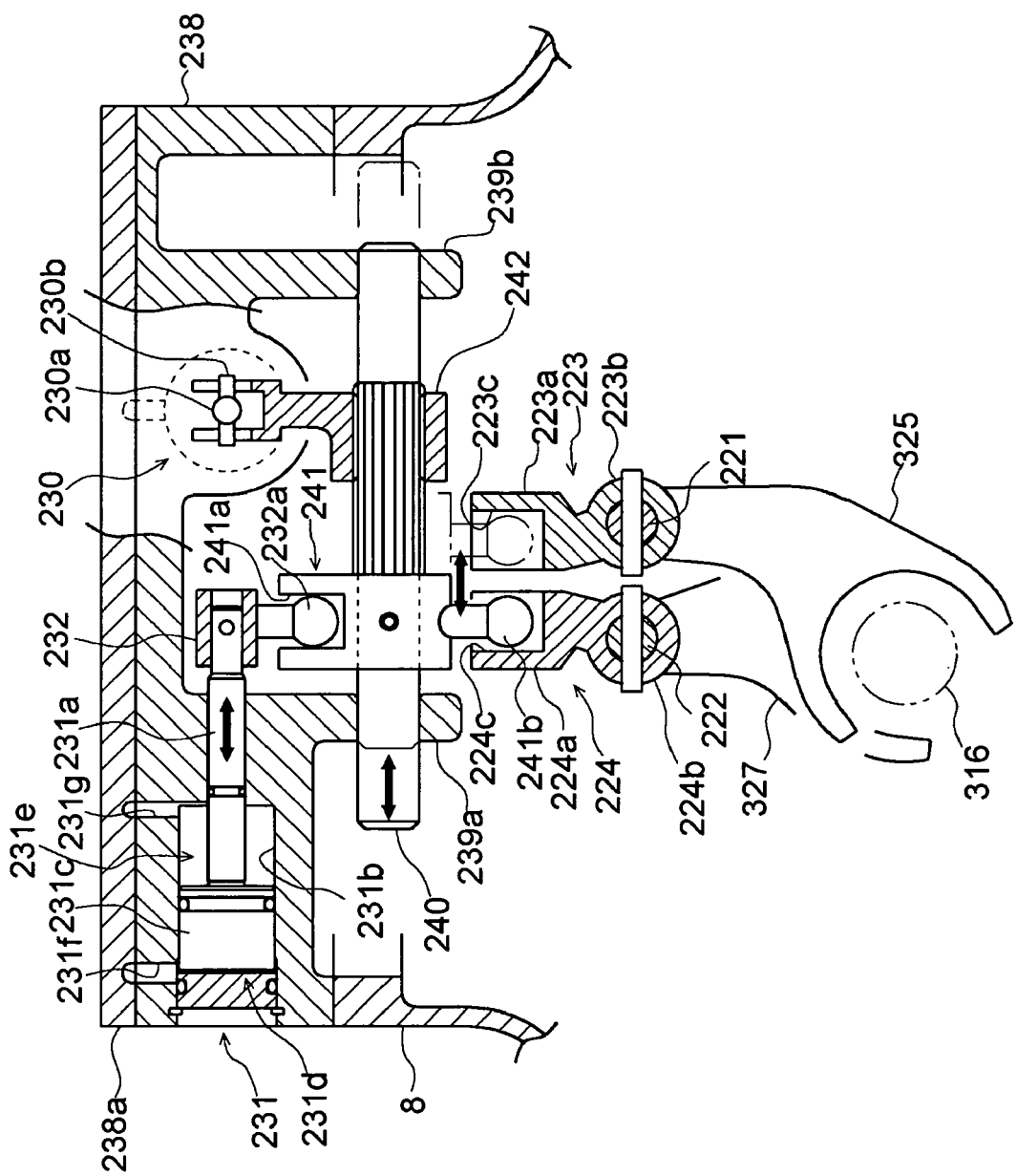
FIG. 32 is a sectional front view of a fork control mechanism in the multi-speed transmission according to the third embodiment.
Figure 33:
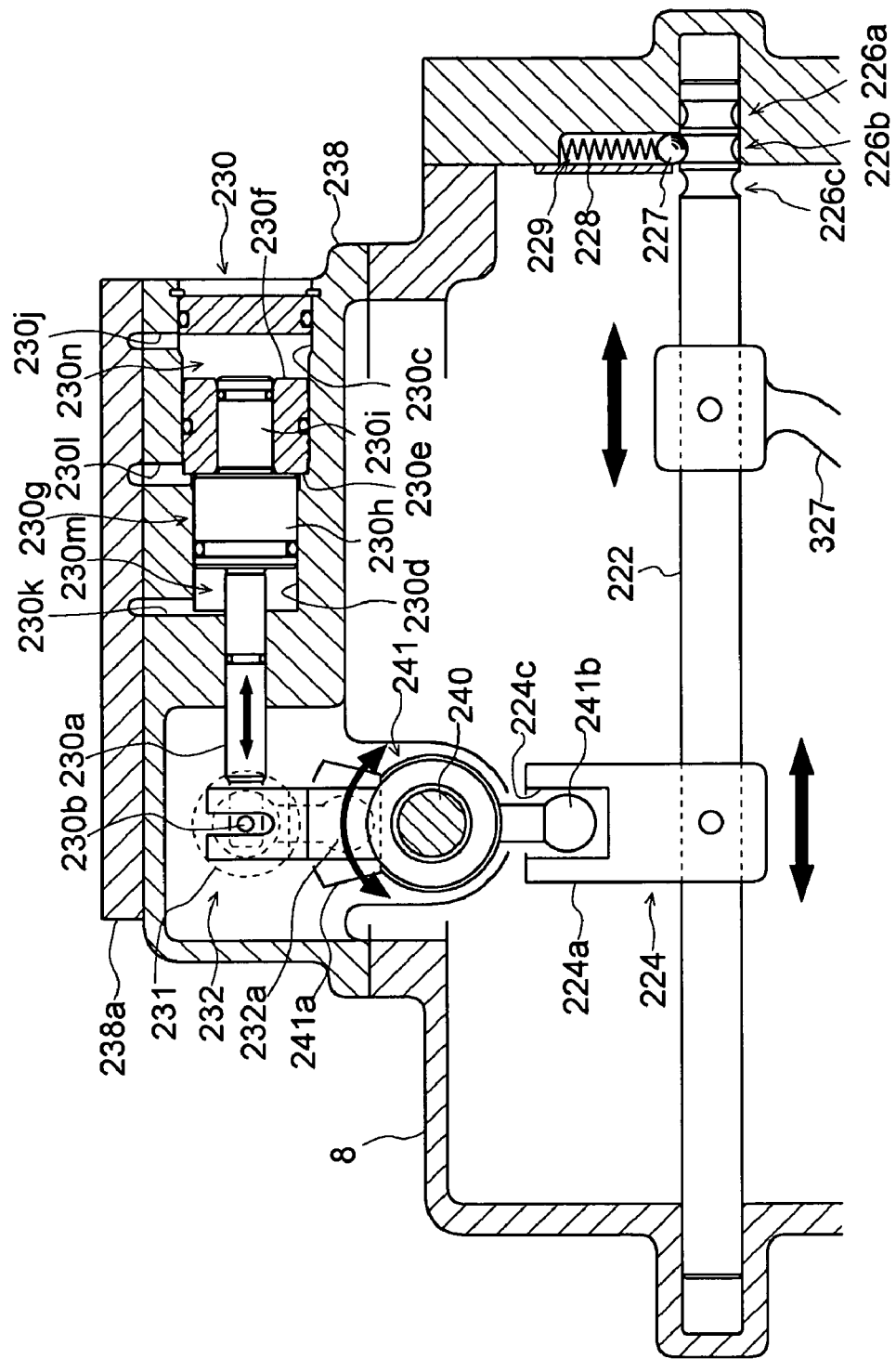
FIG. 33 is a sectional left side view of the fork control mechanism.

Traveling gearshift driven shaft 316 is fixedly provided thereon with a first splined hub 336 disposed between reverse driven gear 320 and first speed normal driven gear 319. A first shifter 324 is axially slidably fitted on first splined hub 336 and engaged with a first fork 325 so as to be selectively disposed at one of a reverse (backward traveling) position, a neutral position and a first speed normal (forward traveling) position, as shown in FIGS. 32 and 33. When first shifter 324 is disposed at the reverse position, first shifter 324 relatively unrotatably connects reverse driven gear 320 to traveling gearshift driven shaft 316 through a synchronizer and first splined hub 336. When first shifter 324 is disposed at the first speed normal position, first shifter 324 relatively unrotatably connects first speed normal driven gear 319 to traveling gearshift driven shaft 316 through a synchronizer and first splined hub 336. When first shifter 324 is disposed at the neutral position, both gears 319 and 320 remain relatively rotatably fitted to traveling gearshift driven shaft 316.

Traveling gearshift driven shaft 316 is also fixedly provided thereon with a second splined hub 337 disposed between second speed normal driven gear 318 and third speed normal driven gear 317. A second shifter 326 is axially slidably fitted on second splined hub 337 and engaged with a second fork 327 so as to be selectively disposed at one of a second speed normal (forward traveling) position, a neutral position and a third speed normal (forward traveling) position, as shown in FIGS. 32 and 33. When second shifter 326 is disposed at the second speed normal position, second shifter 326 relatively unrotatably connects second speed normal driven gear 318 to traveling gearshift driven shaft 316 through a synchronizer and second splined hub 337. When second shifter 326 is disposed at the third speed normal position, second shifter 326 relatively unrotatably connects first speed normal driven gear 317 to traveling gearshift driven shaft 316 through a synchronizer and second splined hub 337. When second shifter 326 is disposed at the neutral position, both gears 317 and 318 remain relatively rotatably fitted to traveling gearshift driven shaft 316.

During traveling of vehicle 1, either first or second fork 325 or 327 is shifted to selectively drivingly (relatively unrotatably) connect one of driven gears 317, 318, 319 and 320 to traveling gearshift driven shaft 316 through corresponding splined hub 336 or 337.

Traveling gearshift driven shaft 316 is further relatively unrotatably fitted thereon with a driven gear 321 of a sub drive train, and with a gear 322. Gear 322 meshes with a bull gear 343 of a center differential gear unit 342, so as to transmit the rotary force of traveling gearshift driven shaft 316 to a bevel gear train 344 in center differential gear unit 342. Bevel gear train 344 distributes the rotary force of bull gear 343 between rear output shaft 11 and front output shaft 346. Rear output shaft 11 projects rearward from transmission casing 8 and is drivingly connected to rear propeller shaft 15 through universal joint 20. A front-wheel driving gear casing 348 is attached onto a front end of transmission casing 8, and front output shaft 346 is extended from center differential gear unit 342 into front-wheel driving gear casing 348, so as to be drivingly connected to front output shaft 10 through a gear train in front-wheel driving gear casing 348. Fore-and-aft front output shaft 10 is disposed at a laterally middle portion of transmission casing 8, and projects forward from front-wheel driving gear casing 348 so as to be drivingly connected to front propeller shaft 14 through universal joint 20.

Description will be given of power transmission from sub clutch 302 with the sub drive train. Sub clutch 302 is provided for continuously (unintermittently) transmitting power to traveling gearshift driven shaft 316 even during the gearshift operation. Therefore, sub clutch 302 is engaged only when the power transmission from main clutch 301 is shut off, i.e., main clutch 301 is disengaged. Preferably, sub clutch 302 is a slippable hydraulic multi-disk clutch in which the number of friction disks and the diameter of a piston are considered so as to ensure a capacity of sub clutch 302 that is smaller than the capacity of main clutch 301.

As shown in FIG. 30 and as mentioned above, sub clutch 302 and main clutch 301 are integrated with each other, and share common clutch input shaft 303. A cylindrical sub clutch output shaft 330 is extended forward from sub clutch 302, and relatively rotatably fitted on clutch input shaft 303. A gear 331 is relatively unrotatably fitted on sub clutch output shaft 330. A double gear 332, including a diametrically larger gear 333 and a diametrically smaller gear 334, is relatively rotatably fitted on counter shaft 308. Diametrically larger gear 333 meshes with gear 331. A counter gear 335 is relatively rotatably fitted on traveling gearshift drive shaft 311 and meshes with diametrically smaller gear 334. Further, counter gear 335 meshes with driven gear 321 fixed on traveling gearshift driven shaft 316. In this way, the sub drive train comprises gear 331, double gear 332, gear 335 and driven gear 321, so as to transmit the rotary force of sub clutch output shaft 330 to traveling gearshift driven shaft 316.

Incidentally, the deceleration ratio of the sub drive train is set so as to substantially correspond to the third speed level which is the maximum speed level in this transmission 199.

A mechanism for controlling main clutch 301 and sub clutch 302 will be described. Reference to a hydraulic circuit of FIG. 34, a first hydraulic actuator 271 is provided for engaging and disengaging main clutch 301, and a second actuator 272 is provided for engaging and disengaging sub clutch 302.

An electromagnetic proportional pressure reduction valve 273 supplies or drains fluid to and from first hydraulic actuator 271 for main clutch 301. Due to the proportional pressure reduction effect of valve 273, the hydraulic clutch pressure of main clutch 301 is continuously (unintermittently) increased from zero to the maximum (proper) pressure determined by a relief valve 298, so as to completely engage main clutch 301. An electromagnetic switching valve 274 supplies or drains fluid to and from second hydraulic actuator 272 for sub clutch 302. Due to the switching of valve 274, the hydraulic clutch pressure of sub clutch 302 is selectively set to either zero or the maximum (proper) pressure. However, even when the maximum hydraulic clutch pressure is supplied to sub clutch 302, sub clutch 302 slips because its capacity is smaller than that of main clutch 301.

Pump 214 supplies fluid from a fluid sump in transmission casing 8 to actuators 271 and 272 and later-discussed cylinders 230 and 231. The clutch controlling hydraulic circuit including actuators 271 and 272 and a shifter controlling hydraulic circuit including cylinders 230 and 231 are connected in parallel to pump 214, and regulated in hydraulic pressure by a relief valve 298. A lubrication oil passage is extended downstream of relief valve 298 so as to supply excessive hydraulic pressure fluid serving as lube to first and second actuators 271 and 272, and regulated in pressure by a relief valve 299. In FIG. 30, an element 297 represents the gearshift drive trains, the sub drive train and the like to be lubricated by fluid from passage 295.

A mechanism for controlling first and second forks 325 and 327 will be described. Referring to FIGS. 32 and 33, as mentioned above, first and second forks 325 and 327 are engaged to respective first and second shifters 324 and 326. More specifically, as shown in FIG. 32, fork-like shaped portions of forks 325 and 327 are fitted into respective annular grooves of shifters 324 and 326.

First and second shifter shafts 221 and 222 are axially slidably extended in the fore-and-aft direction above traveling gearshift driven shaft 316, and laterally juxtaposed at the same height. First fork 325 is fixed onto first shifter shaft 221, and second fork 326 is fixed onto second shifter shaft 222.

As shown in FIG. 33, second shifter shaft 222 is axially slidably passed through front and rear walls of transmission casing 8. Second shifter shaft 222 is peripherally formed thereon with annular grooves 226a, 226b and 226c, one of which can be selectively opened to a bottom opening of a vertical hole 229 upwardly bored in the rear wall of transmission casing 8. A spring 228 and a detent ball 227 are fitted in hole 229 so as to constitute a detent mechanism for holding second shifter shaft 222 at selected one of a second speed normal (forward traveling) position, a neutral position and a third speed normal (forward traveling) position.

In this way, detent ball 227 pressed by spring 228 toward second shifter shaft 222 is selectively fitted into one of grooves 226a, 226b and 226c, in correspondence to the axial sliding position of second shifter shaft 222. When ball 227 is fitted into groove 226a, second shifter shaft 222 is held at the second speed normal position. When ball 227 is fitted into groove 226b, second shifter shaft 222 is held at the neutral position. When ball 227 is fitted into groove 226a, second shifter shaft 222 is held at the third speed normal position. First shifter shaft 221 is provided with a similar detent mechanism such as to be selectively held at one of a reverse (backward traveling) position, a neutral position and a first speed normal (forward traveling) position.

As shown in FIGS. 32 and 33, hydraulic cylinders 230 and 231 constitute a fork control mechanism for moving first and second forks 325 and 327.

In the fork control mechanism, cylinder 231 is activated for selectively sliding one of first and second shifter shafts 221 and 222, thereby locating fork 325 or 327 (with shifter 324 or 326) on selected shifter shaft 221 or 222. In this regard, when first shifter shaft 221 is selectively slid, first fork 325 (with first shifter 324) is located at one of the reverse position, the neutral position and the first speed normal position. When second shifter shaft 222 is selectively slid, second fork 327 (with second shifter 326) is located at one of the second speed normal position, the neutral position and the third speed normal position.

As shown in FIGS. 32 and 33, hydraulic cylinders 230 and 231 are disposed in a shifter casing 238 attached onto the top of transmission casing 8 so as to cover the top opening above first and second shifter shafts 221 and 222. Cylinder 231 serves as a drive power source to a selector for selecting one of first and second forks 325 and 327 to be slid. Cylinder 230 serves as a drive power source to a shift system for sliding first and second shifter shafts 221 and 222 with respective first and second forks 325 and 327 in the fore-and-aft direction.

Referring to FIG. 32, the selector for selecting a fork to be moved will be described. Hydraulic cylinder 231 includes a piston rod 231a which is extended horizontally leftward (rightward in FIG. 32) perpendicular to the axial direction of piston rod 230a of cylinder 230. On the assumption that the extension direction of piston rod 231a is forward, the position of piston rod 230a is shiftable between an illustrated rear position and a front position. An engaging member 232, formed with an engaging ball-shaped bottom portion 232a, is fixedly fitted on a tip of piston rod 231a.

As shown in FIGS. 32 and 33, a fork control shaft 240 is disposed below cylinder 231. Fork control shaft 240 is extended laterally in parallel to piston rod 231a, and axially slidably supported at opposite ends thereof by respective support legs 239a and 239b.

A lever 241 is fixed on fork control shaft 240. A basal portion 241c of lever 241 is relatively unrotatably and axially unslidably fitted on fork control shaft 240. An upward, forward and rearward opened engaging recess 241a is formed in a top portion of lever 241. Engaging ball-shaped portion 232a is engaged into engaging recess 241a. Lever 241 is formed with a substantially ball-shaped bottom portion 241b.

As shown in FIGS. 32 and 33, an engaging member 224 is fixed on second shifter shaft 222 in front of second fork 327. An engaging member 224 includes a basal portion 224b relatively unrotatably and axially (fore-and-aft) unslidably fitted on second shifter shaft 222. Engaging member 224 also includes an engaging portion 224a formed with an upward and leftward opened engaging recess 224c into which ball-shaped bottom portion 241b of lever 241.

As shown in FIG. 32, an engaging member 223 is fixed on first shifter shaft 221 in front of first fork 325, and adjoined leftward of engaging member 224. An upward and rightward opened engaging recess 223c is formed in engaging member 223. Therefore, adjoining engaging members 223 and 224 with respective recesses 223c and 224c are laterally symmetrically formed. When both shifter shafts 221 and 222 are disposed at the respective neutral positions, as show in FIG. 32, the rightward opening of recess 223c faces the leftward opening of recess 224c.

As shown in FIGS. 32 and 33, both shifter shafts 221 and 222 are disposed at the respective neutral positions, and the vertical openings of recesses 223c and 224c face each other. In this state, ball-shaped portion 241b of lever 241 is movable between mutually facing recesses 223c and 224c, and is selectively engaged into recess 223c for first shifter shaft 221 and recess 224c for second shifter shaft 224c.

Referring to FIGS. 32 and 33, the tip of piston rod 231a of cylinder 231 is disposed at the rear position where ball-shaped portion 241b of lever 241 is engaged in recess 224c on the side of second shifter shaft 222. When the tip of piston rod 231a is moved forward from the position illustrated in FIGS. 32 and 33, engaging member 232 pushes lever 241 leftward so as to slide fork control shaft 240 leftward. Consequently, ball-shaped portion 241b of lever 241 moves from recess 224c to recess 223c. Due to such a selector, either shifter shaft 221 or 222 to be moved is selected.

Referring to FIGS. 32 and 33, the shift system shifts the position of selected fork 325 or 327 by using hydraulic cylinder 230 serving as the hydraulic power source. In this regard, electromagnetic valves 251 and 252 (see FIG. 34) shifts the tip of piston rod 230a to one of three positions, i.e., a front position, a middle position and a rear position (on the assumption that the extension direction of piston rod 230a is forward).

An engaging pin 230b horizontally penetrates the tip of piston rod 230a and engages with a lever 242 for rotating fork control shaft 240. Lever 242 is spline-fitted at a bottom portion thereof onto fork control shaft 240 so as to convert the telescopic movement of piston rod 230a into the rotation of fork control shaft 240.

A representative forward movement of piston rod 230a from the position shown in FIGS. 32 and 33 will be described. In FIGS. 32 and 33, second shifter shaft 222 is selected so as to be moved by lever 241. The tip of piston rod 230a is disposed at the middle position so as to locate second fork 327 at the neutral position.

When electromagnetic valves 251 and 252 are controlled to move the tip of piston rod 230a from the middle position to the front position, lever 242 rotates fork control shaft 240 with lever 241 counterclockwise when viewed in left side. Due to the rotation of lever 241, ball-shaped bottom portion 241b of lever 241 in engaging portion 224a of engaging member 224 pushes second shifter shaft 222 with engaging member 224 rearward. Consequently, second fork 327 (second shifter 326) moves to the third speed normal position so as to relatively unrotatably connect third speed normal driven gear 317 to traveling gearshift driven shaft 316 through splined hub 337.

On the contrary, when the tip of piston rod 230a moves from the neutral position to the rear position, second shifter shaft 222 is pushed forward. Consequently, second fork 327 (second shifter 326) moves to the second speed normal position so as to relatively unrotatably connect second speed normal driven gear 318 to traveling gearshift driven shaft 316 through the synchronizer and second splined hub 337.

It is assumed that lever 241 is disposed so as to select first shifter shaft 221 to be shifted. When the tip of piston rod 230a is moved from the middle position to the front position, first fork 325 (first shifter 324) is pushed together with first shifter shaft 221 rearward to the first speed normal position so as to relatively unrotatably connect first speed normal driven gear 319 to traveling gearshift driven shaft 316 through first splined hub 336. When the tip of piston rod 230a is moved from the middle position to the rear position, first fork 325 (first shifter 324) is pushed together with first shifter shaft 221 forward to the reverse position so as to relatively unrotatably connect reverse driven gear 320 to traveling gearshift driven shaft 316 through first splined hub 336.

Construction and control manner of hydraulic cylinders 230 and 231 will be described. Referring to FIG. 33, three-positioned hydraulic cylinder 230 for shifting forks is formed in shift casing 238 so as to have a rear first chamber 230c and a front second chamber 230d which is diametrically smaller than first chamber 230c. Shift casing 238 is formed with a shoulder portion 230e caused by the diametric difference between first and second chambers 230c and 230d.

Cylinder 230 is provided with a first piton 230f and a second piston 230g. Second piston 230g includes a front diametrically large portion 230h and a rear diametrically small portion 230i. Ring-shaped first piston 230f is axially (fore-and-aft) slidably and fluid-tightly fitted on diametrically small portion 230i, and into first chamber 230c. Diametrically large portion 230h of second piston 230g is axially (fore-and-aft) slidably and fluid-tightly fitted into second chamber 230*d*. Piston rod 230*a* is extended forward from a front end surface of second piston 230*g*.

In first chamber 230*c*, a rear space behind first piston 230*f* filled with fluid is defined as a first fluid chamber 230*m*. In second chamber 230*d*, a front space in front of second piston 230*g* filled with fluid is defined as a second fluid chamber 230*n*.

A hydraulic pressure fluid suction-and-delivery port 230*j* is formed in a wall of shift casing 238 upward from a rear end portion of first chamber 230*c*, so that first fluid chamber 230*m* is fluidly connected to electromagnetic valve 251 through port 230*j* and a fluid duct formed in a duct plate 238*a* attached onto the top of shifter casing 238. In this way, electromagnetic valve 251 switches the hydraulic pressure of fluid in first fluid chamber 230*m* between a proper pressure determined by a relief valve 298 and a drain pressure (see FIG. 34).

A hydraulic pressure fluid suction-and-delivery port 230*k* is formed in a wall of shift casing 238 upward from a front end portion of second chamber 230*d*, so that second fluid chamber 230*n* is fluidly connected to electromagnetic valve 252 through port 230*k* and a fluid duct formed in duct plate 238*a*. In this way, electromagnetic valve 252 switches the hydraulic pressure of fluid in second fluid chamber 230*n* between a proper pressure determined by relief valve 298 and a drain pressure (see FIG. 34).

Further, shift casing 238 is formed in an upper portion of shoulder portion 230*e* with a hydraulic pressure fluid suction-and-delivery port 230*l* connected to the fluid sump in transmission casing 8 through a duct formed in duct plate 238*a*. The hydraulic pressure in port 230*l* is constantly kept low (the drain pressure).

Electromagnetic valves 251, 252 and 255 are mounted on the top surface of duct plate 238*a*. The ducts formed in duct plate 238*a* are grooves opened downward to the top surface of shift casing 238. When duct plate 238*a* is joined to shift casing 238, the grooves are closed by the top surface of shift casing 238 except for portions thereof opened to respective ports 230J, 230*k* and 230*l*, thereby fluidly connecting electromagnetic valves 251, 252 and 255 to hydraulic cylinders 230 and 231 formed in shift casing 238.

When electromagnetic valves 251 and 252 control so as to pressurize first fluid chamber 230*m* to the proper pressure and to depress second chamber 230*n* to the drain pressure, the tip of piston rod 230*a* is disposed at the front position. When electromagnetic valves 251 and 252 control so as to depress first fluid chamber 230*m* to the drain pressure and to pressurize second chamber 230*n* to the proper pressure, the tip of piston rod 230*a* is disposed at the rear position. When electromagnetic valves 251 and 252 control so as to pressurize both first and second fluid chambers 230*m* and 230*n* to the respective proper pressures, the tip of piston rod 230*a* is disposed at the middle position.

Referring to the movement of cylinder 230, when first fluid chamber 230*m* is properly pressurized and second fluid chamber 230*n* is depressed, the hydraulic pressure in first fluid chamber 230*m* for forwardly pushing diametrically small portion 230*i* of second piston 230*g* exceeds the hydraulic pressure in second fluid chamber 230*n* for rearwardly pushing diametrically large portion 230*h* of second piston 230*g*, so that second piston 230*g* is pressed against the front end of cylinder 230, thereby locating the tip of piston rod 230*a* at the front position.

When first fluid chamber 230*m* is depressed and second fluid chamber 230*n* is properly pressurized, the hydraulic pressure in second fluid chamber 230*n* for rearwardly pushing diametrically large portion 230*h* of second piston 230*g* exceeds the hydraulic pressure in first fluid chamber 230*m* for forwardly pushing diametrically small portion 230*i* of second piston 230*g*, so that second piston 230*g* is pressed against the rear end of cylinder 230, thereby locating the tip of piston rod 230*a* at the rear position.

When first and second fluid chambers 230*m* and 230*n* are evenly pressurized, the hydraulic pressure of fluid in first fluid chamber 230*m* presses first piston 230*f* forward. Second piston 230*g* receives the forward pressure from first fluid chamber 230*m* and the rearward pressure from second fluid chamber 230*n* so that the opposite pressures cancel each other. However, consequently, second piston 230*g* is pushed rearward because the area of diametrically large portion 230*h* facing second fluid chamber 230*n* is larger than the area of diametrically small portion 230*i* facing first fluid chamber 230*m*. Here, the area of first piston 230*f* receiving the rearward pressure from second fluid chamber 230*n* is set to be larger than a difference between the area of second piston 230*g* facing second fluid chamber 230*n* and the area of second piston 230*g* facing first fluid chamber 230*m*, so that the forward pressure onto first piston 230*f* exceeds the rearward pressure onto second piston 230*g*. Consequently, first piston 230*f* is pressed against shoulder portion 230*e*, and second piston 230*g* cannot push first piston 230*f* rearward, whereby first and second pistons 230*f* and 230*g* are retained by shoulder portion 230*e* so as to hold the tip of piston rod 230*a* at the middle position.

Hydraulic cylinder 231 for selecting the fork will be described with reference to FIG. 32. Two-position switched hydraulic cylinder 231 includes a horizontally axial cylinder chamber 231*b* formed in shift casing 238, and a piston 231*c* is axially (laterally) slidably and fluid-tightly fitted in cylinder chamber 231. Piston rod 231*a* is extended laterally from one end surface of piston 231*c*. In cylinder chamber 231*b*, a space on one side of piston 231*c* filled with fluid is defined as a first fluid chamber 231*d*, and a space on the other side of piston 231*c* filled with fluid is defined as a second fluid chamber 231*e*.

As shown in FIG. 32, hydraulic pressure fluid suction-and-delivery ports 231*f* and 213*g* are formed in a wall of shift casing 238 upward from respective left and right ends of cylinder chamber 231*b*. Port 231*f* is connected to a main hydraulic pressure fluid supply passage from pump 214 (see FIG. 34) through a duct formed in duct plate 238*a*, so as to keep the hydraulic pressure in second fluid chamber 231*e* determined by relief valve 298. First fluid chamber 231*d* is fluidly connected to electromagnetic valve 255 through port 231*f* and a duct formed in duct plate 238*a* so that electromagnetic valve 255 switches the hydraulic pressure of first fluid chamber 231*d* between a proper (high) pressure and a drain (low) pressure.

The area of piston 231*c* facing first fluid chamber 231*d* is larger than the area of piston 231*c* facing second fluid chamber 231*e* because piston rod 231*b* exists in second fluid chamber 231*e*. Due to the area difference of piston 231*c*, when first fluid chamber 231*d* is pressurized to the proper pressure equal to the pressure in second fluid chamber 231*e*, piston 231*c* is pressed against one end of cylinder 231 so as to extend piston rod 231*a* (locate the tip of piston rod 231*a* at the above-mentioned front position on the assumption that the extension direction of piston rod 231*a* is forward). When electromagnetic valve 255 drains fluid from first fluid chamber 231*d*, piston 231*c* is pressed against the other end of cylinder 231 so as to contract piston rod 231*a* (locate the tip of piston rod 231*a* at the rear position on the same assumption).

An automatic gearshift control by multi-speed transmission 119 will be described. Main clutch 301, sub clutch 302 and first and second forks 325 and 327 are automatically controlled for gearshift in correspondence to depression of the accelerator pedal (opening degree of the throttle valve of engine 5) and the actual vehicle traveling speed (rotary speed of axles 25 and 36). When engine 5 is started up, all electromagnetic valves 251, 252 and 255 are unexcited so that the selector selects second shifter shaft 222, and the shift mechanism holds shifter shaft 222 at the neutral position.

Figure 36:
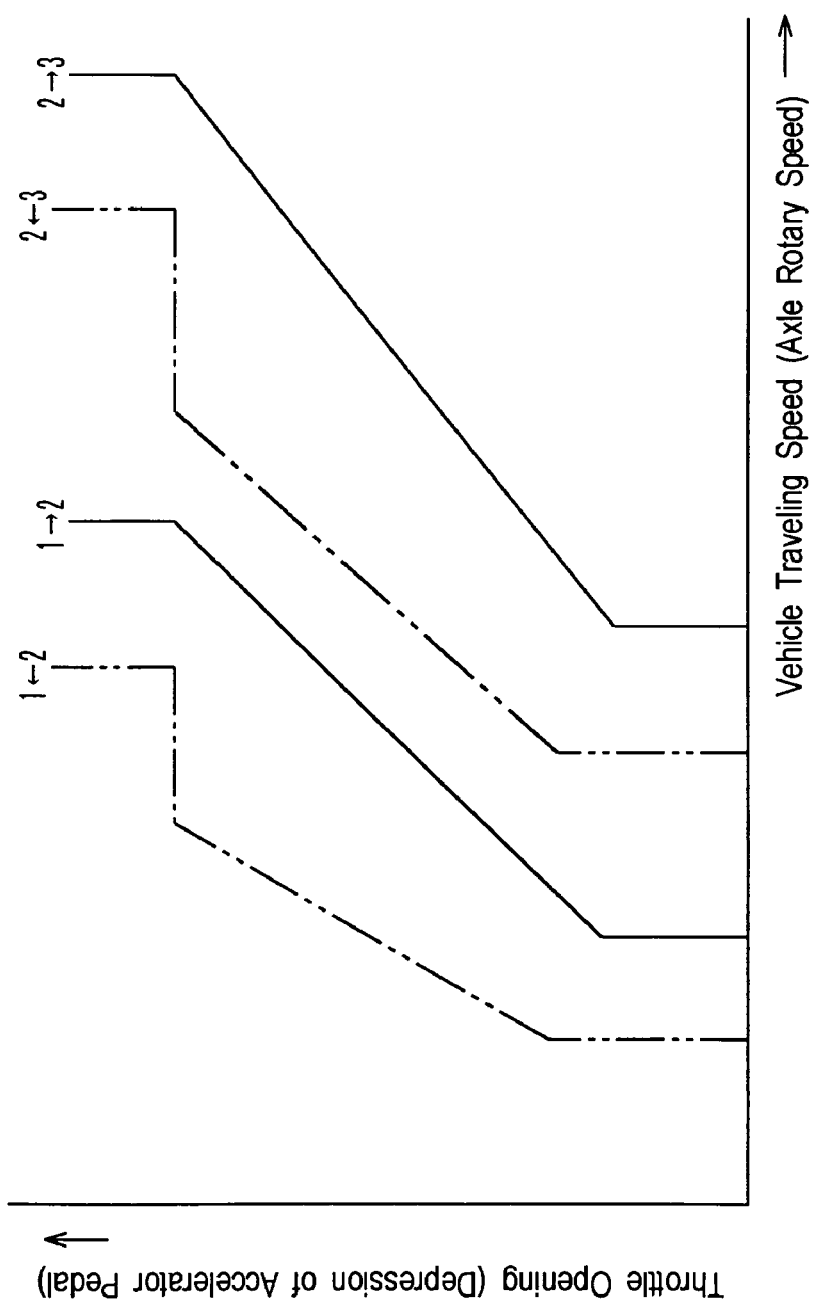
FIG. 36 is a map of characteristic curves according to the third embodiment.

A shift-up or shift-down signal is issued from the controller according to a map of FIG. 36 based on detection of the vehicle traveling speed by the vehicle traveling speed sensor and detection of the throttle valve opening by the throttle sensor. Similar to the gearshift by multi-speed transmission 19 (42), the change of throttle valve opening relative to vehicle traveling speed for shift-up is gentler than that for shift-down, and the change of throttle valve opening relative to vehicle traveling speed for high-speed shift-up or shift-down is gentler than that for low-speed shift-up or shift-down.

Figure 35:
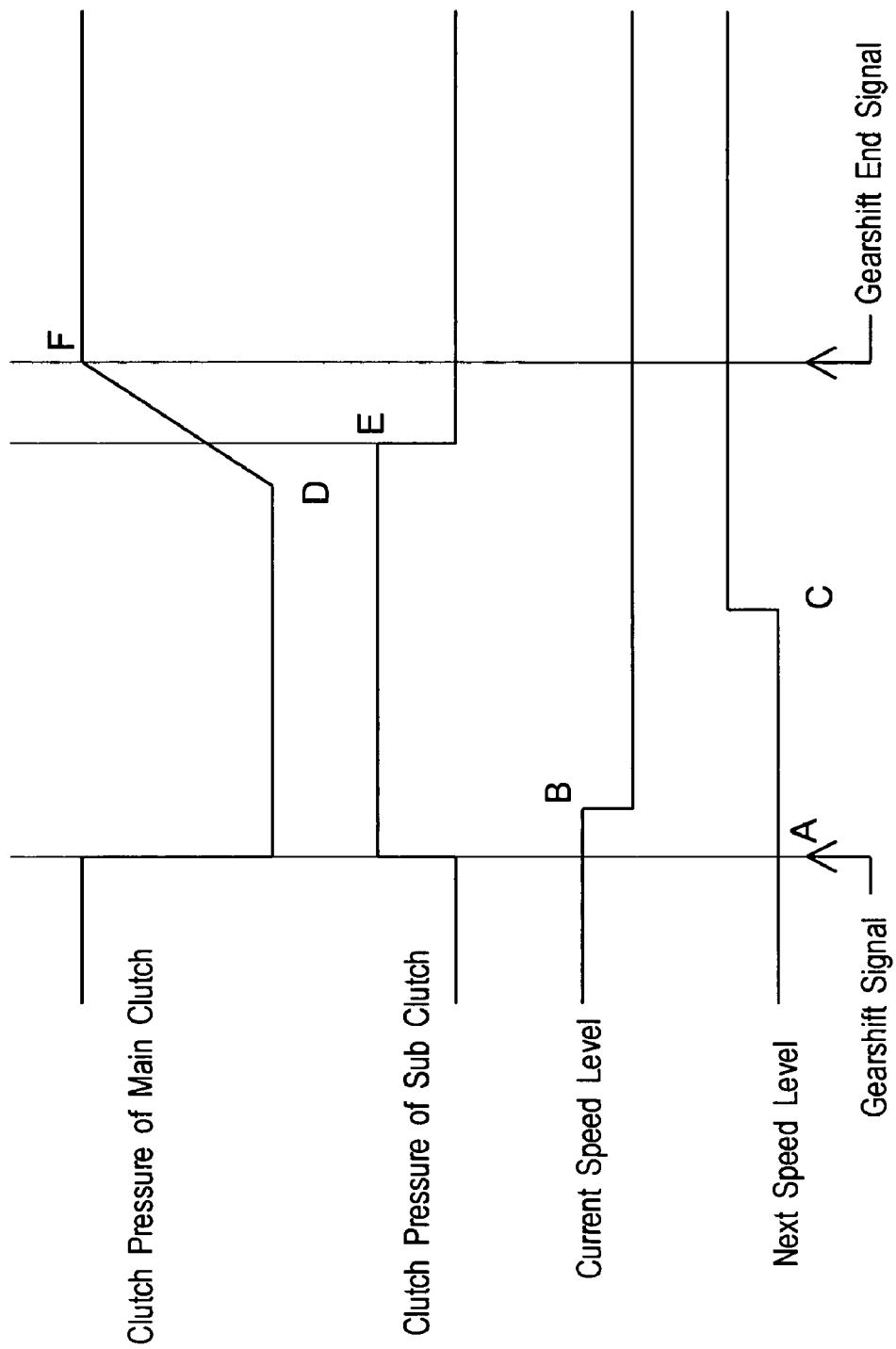
FIG. 35 is a diagram showing a gearshift control process according to the third embodiment.

Referring to FIG. 35, a representative gearshift control when the accelerator pedal is depressed for shift-up from the first speed to the second speed will be described. During the first speed traveling of vehicle 1, referring to FIG. 30, main clutch 301 is engaged, and sub clutch 302 is disengaged. First fork 325 is disposed at the rear first speed normal position, so that first speed normal driven gear 319 is drivingly connected to traveling gearshift driven shaft 316. Second fork 327 (second shifter 326) is disposed at the neutral position.

In FIG. 35, when the vehicle traveling speed is increased and the first-to-second speed shift-up signal is issued at a timing A, electromagnetic proportional pressure reduction valve 273 is switched for disengaging main clutch 301, and simultaneously, electromagnetic valve 274 is shifted to engage sub clutch 302. Consequently, while main clutch 301 transmits power to no gear train for gearshift, sub clutch 302 transmits power to the sub drive (gear) train.

As mentioned above, the speed ratio of the sub gear train between sub clutch output shaft 330 and traveling gearshift driven shaft 316 substantially corresponds to the third speed established by the third speed gear train. Accordingly, during the first-to-second speed shift-up, the rotary speed of sub clutch output shat 330 is different from that of clutch input shaft 303, i.e., sub clutch output shaft 330 rotates slower than clutch input shaft 303. However, sub clutch 302 slips because the capacity of sub clutch 302 is smaller than that of main clutch 301. Thus, the rotation of sub clutch output shaft 330 is not completely synchronized to that of clutch input shaft 303. In other words, sub clutch 302 and the sub drive train transmit only a supplementary power to traveling gearshift driven shaft 316 such as to keep a required traveling performance of vehicle 1 while main clutch 301 is disengaged.

As shown in FIG. 35, after a while from issue of the shift-up signal, the engagement of sub clutch 302 and disengagement of main clutch 301 are completed at a timing B. Next, the controller issues a signal for separating first speed normal driven gear 319 from traveling gearshift driven shaft 316 (see FIG. 30). In this regard, referring to FIG. 34, electromagnetic valves 251 and 252 are shifted so as to locate the tip of piston rod 230a at the middle position. Accordingly, first fork 325 (first shifter 324) moves from the first speed normal position to the neutral position so as to separate first speed normal driven gear 319 from traveling gearshift driven shaft 316.

Referring to FIG. 35, first speed normal driven gear 319 is completely disengaged from traveling gearshift driven shaft 316 at a timing C. Next, the controller issues a signal for drivingly connecting second speed normal driven gear 318 to traveling gearshift driven shaft 316 (see FIG. 30). In this regard, referring to FIG. 34, electromagnetic valves 255 is shifted so as to contract piston rod 231a of cylinder 231. Accordingly, ball-shaped portion 241b of lever 241 moves recess 223c on the side of first fork 325 to recess 224c on the side of second fork 327.

Figure 34:
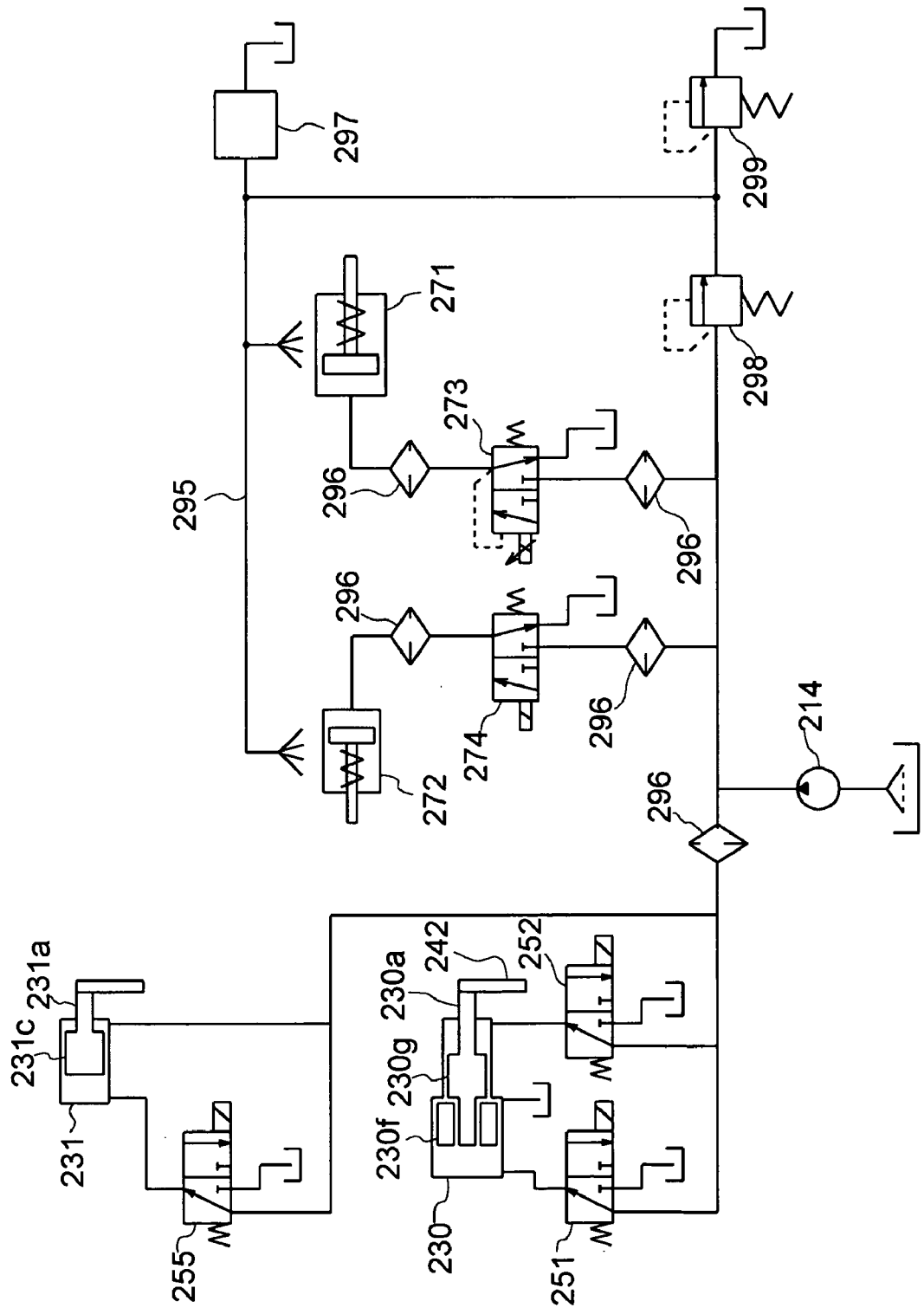
FIG. 34 is a hydraulic circuit diagram for gearshift or clutch operation according to the third embodiment.

As shown in FIG. 34, electromagnetic valves 251 and 252 are shifted so as to move the tip of piston rod 230a of cylinder 230 from the middle position to the front position. Accordingly, second fork 327 (second shifter 326) moves from the neutral position to the second speed normal position so as to relatively unrotatably connect second speed normal driven gear 318 to traveling gearshift driven shaft 316. Sub clutch 302 still transmits the supplementary power to traveling gearshift driven shaft 316.

In FIG. 35, a signal for engaging main clutch 301 is issued at a timing D after a while since the issue of the signal for moving second fork 327. Accordingly, electromagnetic proportional pressure reduction clutch 273 gradually increases the clutch pressure of main clutch 301.

The clutch pressure of main clutch 301 becomes substantially equal to the clutch pressure of sub clutch 302 at a timing E. Then, electromagnetic valve 274 is shifted to disengage sub clutch 302. Therefore, the power transmission by sub clutch 302 and the sub drive train is shifted into the power transmission by main clutch 301 and the selected speed gear train.

The clutch pressure of main clutch 301 is still increased, and reaches the maximum (proper) pressure at a timing F. At this time, second fork 327 (second shifter 326) completely reaches the second speed normal position, thereby completing the first-to-second speed shift-up.

The other speed shift-up and shift-down processes are similar to the above-mentioned first-to-second shift-up process. However, the gearshift (shift-up or shift-down) between the second speed and the third speed does not require movement of lever 241, i.e., shift of piston rod 231a of cylinder 231.

As mentioned above, mechanical gear type multi-speed transmission 199 ensures continuous (unintermittent) smooth power transmission by the automatic gearshift using sub clutch 302 and the sub drive train.

In transmission 199, main clutch 301 serves as a start-up clutch to be engaged for start of vehicle 1.

As mentioned above, while output shaft 6 of engine 5 is disposed fore-and-aft of vehicle 1, multi-speed transmission 199 has the same advantage of multi-speed transmission 19 that the transmission shafts interposed between input shaft 18 and front and rear output shafts 10 and 11 are extended fore-and-aft of vehicle 1 and juxtaposed laterally so as to vertically minimize transmission casing 8. The horizontal alignment of shifter shafts 221 and 222 also ensures the vertical minimization of transmission casing 8.

Transmission casing incorporating multi-speed transmission 199 is formed therein with a fluid tank 201 partitioned from a chamber incorporating multi-speed transmission 199 by a vertical wall, so as to absorb fluid from the chamber of multi-speed transmission 199, and lower the level of the fluid sump in the chamber of multi-speed transmission 119, thereby reducing the power loss caused by resistance of fluid against agitation of a gear of multi-speed transmission 199.

Pump 213 driven by input shaft 18 absorbs fluid from the chamber of multi-speed transmission 199 through a drain port 210 with a strainer to the outside of transmission casing 8, and into tank 201 formed in transmission casing 8 through pipes 211 and 212. In transmission casing 8, a top portion of tank 201 is opened to the chamber of multi-speed transmission 199 over the vertical partition, so as to overflow fluid from tank 201 into the chamber of multi-speed transmission 199.

Pump 214 driven by input shaft 18 drains fluid from tank 201 through an oil filter 220 and supplies it as lube into transmission casing 8 through a pipe 215. The control valves and hydraulic actuators for gearshift are supplied with a part of fluid stored in tank 201, or alternatively they may be supplied with fluid from another hydraulic pressure fluid source.

In this way, pump 213 forcibly drains fluid from the fluid sump in transmission casing 8, and pump 214 supplies fluid as lube and hydraulic pressure fluid into transmission casing 8. Consequently, the level of fluid sump in the chamber of multi-speed transmission 199 becomes sufficiently low so as to reduce the power loss caused by agitation resistance of fluid, thereby ensuring efficient high-speed traveling of vehicle 1.

The leak of lube and hydraulic pressure fluid is substantially proportionally increased according to increase of engine rotary speed. However, the rotary speed of pumps 213 and 214 driven by input shaft 18 is also substantially proportionally increased according to increase of engine rotary speed, thereby increasing the speed of absorbing leaked fluid in proportion to the increase of leaked fluid. Further, the delivery quantity of pump 213 is set to be considerably larger than that of pump 214 so as to constantly maintain the overflow from tank 201 to the chamber of multi-speed transmission 199. In this way, the optimally determined level of fluid sump in the chamber of multi-speed transmission 199 is kept so as to ensure the effect of reducing power loss caused by the agitation resistance of fluid.

A horizontal partition 203 is formed in a lower portion of the chamber of multi-speed transmission 199 below the gears of multi-speed transmission 199 so as to prevent left or right ones of the gears from being deeply submerged in the fluid sump when vehicle 1 is laterally tilted on a rough road.

The chamber above partition 203 is defined as a gear chamber, and the chamber below partition 203 is defined as a fluid sump chamber. The fluid sump chamber is opened to the gear chamber through an opening 203a formed just below partition 203 coaxial shafts 346 and 11 disposed at the left end in the gear chamber, so as to collect fluid leaked from the gears into the fluid sump chamber. The above-mentioned vertical wall partitioning tank 201 from the gear chamber is formed of vertically bent partition 203 opposite to opening 203a. An alternative external tank may be disposed outside transmission casing 8 instead of inner tank 201.

Shafts 346 and 11 are the slowest rotating shafts of the transmission shafts of multi-speed transmission 199. Even when fluid in the fluid sump chamber overflows into the gear chamber, low-speed rotating gears on shafts 346 and 11 are mainly submerged into the overflowing fluid, thereby preventing increase of power loss caused by the agitation resistance of fluid.

Alternatively, in multi-speed transmission 199, a proportional pressure reduction valve similar to that for controlling main clutch 301 may be provided for controlling sub clutch 302, instead of electromagnetic valve 274. Therefore, the clutch pressure, i.e., slip rate of sub clutch 302 can be optimized in correspondence to difference of speed level, or to whether the gearshift is shift-up or shift-down, so as to optimize the deceleration ratio of the sub drive train.

Alternatively, multi-speed transmission 199 may have other numbered speed levels than the three speed levels.

It is further understood by those skilled in the art that the foregoing descriptions are preferred embodiments of the disclosed apparatus and that various changes and modifications may be made in the invention without departing from the spirit and scope thereof defined by the following claims.

INDUSTRIAL APPLICABILITY

The present vehicle is provided with an economic and durable transmission which performs gearshift while continuously transmitting power from engine to axles, and ensures efficient high-speed traveling and efficient traveling start. Various vehicles, such as a utility vehicle having a cargo, a buggy, and an all-terrain vehicle, are applicable.

What is claimed is:

1. A vehicle comprising:
   an engine including a horizontal crankshaft extended in the fore-and-aft direction of the vehicle;
   an accelerator for controlling a rotary speed of the engine;
   an axle; and
   a multi-speed transmission for transmitting power from the engine to the axle, the multi-speed transmission including:
      a first clutch having an input portion and an output portion,
      a second clutch having an input portion and an output portion, wherein each of the first and second clutches is selectively engaged to transmit power from the input portion thereof to the output portion thereof, or disengaged to isolate the output portion thereof from power of the input portion thereof,
      a first transmission shaft on which the first and second clutches are provided coaxially to each other, wherein the first transmission shaft receives power from the engine, and the input portions of the respective first and second clutches are fitted to the first transmission shaft so as to be rotatable integrally with the first transmission shaft,
      a second transmission shaft extended parallel to the first transmission shaft,
      an odd-numbered speed drive train for an odd-numbered speed level interposed between the output portion of the first clutch and the second transmission shaft,
      a third transmission shaft extended parallel to the first and second clutches,
      an even-numbered speed drive train for an even-numbered speed level interposed between the output portion of the second clutch and the third transmission shaft, and
      a fourth transmission shaft extended parallel to the first, second and third transmission shafts so as to output power to the axle, wherein both the odd-numbered and even-numbered speed drive trains are further extended to the fourth transmission shaft so as to have respective output ends on the fourth transmission shaft,
   wherein, in correspondence to operation of the accelerator and an actual speed of the axle, one of the first and second clutches is engaged and the other of the first and second clutches is disengaged so as to select either the odd-numbered speed drive train or the even-numbered speed drive train to transmit power from the first transmission shaft to the fourth transmission shaft,
   wherein, while the speed level of the multi-speed transmission is shifted between the odd-numbered speed level and the even-numbered speed level, the engagement process of the one of the first and second clutches is timely overlapped with the disengagement process of the other of the first and second clutches
   wherein the first, second, third and fourth transmission shafts are extended in the fore-and-aft direction of the vehicle, wherein the first and fourth transmission shafts are juxtaposed in the lateral direction of the vehicle, and wherein the second and third transmission shafts are located between the first and fourth shafts in the lateral direction of the vehicle and are juxtaposed in the vertical direction of the vehicle.

2. The vehicle according to claim 1, wherein the odd-numbered speed drive train is split into a plurality of odd-numbered speed drive trains between the second transmission shaft and the fourth transmission shaft, wherein the plurality of odd-numbered speed drive trains have respective output ends provided on the fourth transmission shaft so as to be rotatable relative to the fourth transmission shaft, wherein a first shifter is provided on the fourth transmission shaft so as to selectively drivingly connect one of the respective output ends of the plurality of odd-numbered speed drive trains to the fourth transmission shaft, wherein an axially horizontal first shifter shaft engages with the first shifter and is axially movable to move the first shifter for selecting one of the plurality of odd-numbered speed drive trains to be drivingly connected to the fourth shaft, wherein the even-numbered speed drive train is split into a plurality of even-numbered speed drive trains between the third transmission shaft and the fourth transmission shaft, wherein an axially horizontal second shifter shaft engages with the second shifter and is axially movable to move the second shifter for selecting one of the plurality of even-numbered speed drive trains to be drivingly connected to the fourth shaft, and wherein the first and second shifter shafts are juxtaposed horizontally.

3. The vehicle according to claim 1, further comprising:

a transmission casing incorporating the multi-speed transmission; and a tank fluidly connected to the transmission casing so as to store fluid serving as lube for the first and second clutches and the multi-speed transmission, wherein the tank absorbs fluid from the transmission casing so that a level of fluid in the transmission casing becomes lower than a predetermined height during activation of the engine.

4. The vehicle according to claim 3, wherein the first and second clutches and the first and second shifter shafts are hydraulically controlled, and wherein the fluid stored in the tank also serves as hydraulic pressure fluid for the first and second clutches and the first and second shifter shafts.

5. The vehicle according to claim 4, wherein the quantity of fluid recovered from the transmission casing into the tank is increased according to an increase of the rotary speed of the engine, and larger than the quantity of fluid supplied from the tank into the transmission casing such as to serve as the lube and the hydraulic pressure fluid.

6. The vehicle according to claim 1, wherein either the first clutch or the second clutch also serves as a start-up clutch to be engaged during start of the vehicle.

7. The vehicle according to claim 1, wherein the multi-speed transmission further includes:

a reverse drive train interposed between the output portion of the second clutch and the fourth transmission shaft, wherein both the first and second clutches serve as a start-up clutch.

8. The vehicle according to claim 1, further comprising:

a final gear disposed coaxially to the axle and drivingly connected to the axle and the fourth transmission shaft;

an odd-numbered speed gear of the odd-numbered speed drive train, the odd-numbered speed gear being provided on the second transmission shaft; and an even-numbered speed gear of the even-numbered speed drive train, the even-numbered speed gear being provided on the third transmission shaft, wherein the highest position of the odd-numbered and even-numbered speed gears is not higher than a top end of the final gear, and wherein the lowest position of the odd-numbered and even-numbered speed gears is not lower than a bottom end of the final gear.

9. The vehicle according to claim 8, wherein the odd-numbered speed gear and the even-numbered speed gear vertically overlap each other when viewed in the axial direction of the first to fourth transmission shafts.

10. The vehicle according to claim 1, further comprising:

an odd-numbered speed gear of the odd-numbered speed drive train, the odd-numbered speed gear being provided on the second transmission shaft; and an even-numbered speed gear of the even-numbered speed drive train, the even-numbered speed gear being provided on the third transmission shaft, wherein the odd-numbered speed gear and the even-numbered speed gear vertically overlap each other when viewed in the axial direction of the first to fourth transmission shafts.

11. The vehicle according to claim 1, further comprising:

a final gear disposed coaxially to the axle and drivingly connected to the axle and the fourth transmission shaft; and gears of the multi-speed transmission disposed on the first to fourth transmission shafts, wherein the highest position of all the gears of the multi-speed transmission and the first and second clutches is not higher than a top end of the final gear, and wherein the lowest position of all the gears of the multi-speed transmission and the first and second clutches is not lower than a bottom end of the final gear.

\* \* \* \* \*